US007726684B2

(12) United States Patent
Breed

(10) Patent No.: US 7,726,684 B2
(45) Date of Patent: Jun. 1, 2010

(54) AIRBAG DEPLOYMENT TECHNIQUES

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

(21) Appl. No.: 11/927,813

(22) Filed: Oct. 30, 2007

(65) Prior Publication Data

US 2008/0054603 A1    Mar. 6, 2008

Related U.S. Application Data

(63) Continuation of application No. 11/418,517, filed on May 4, 2006, which is a continuation-in-part of application No. 11/131,623, filed on May 18, 2005, now Pat. No. 7,481,453, and a continuation-in-part of application No. 10/817,379, filed on Apr. 2, 2004, now abandoned, and a continuation-in-part of application No. 10/974,919, filed on Oct. 27, 2004, now Pat. No. 7,040,653.

(51) Int. Cl.
*B60R 21/16* (2006.01)

(52) U.S. Cl. .................. 280/729; 280/738; 280/743.1

(58) Field of Classification Search ................ 280/729, 280/735, 743.1, 738
See application file for complete search history.

(56) References Cited

U.S. PATENT DOCUMENTS

| 2,806,737 | A | * | 9/1957 | Maxwell ................. 280/734 |
| 2,834,606 | A | * | 5/1958 | Bertrand ................ 280/730.1 |
| 3,309,109 | A | | 3/1967 | Baughman |
| 3,614,127 | A | | 10/1971 | Glance |
| 3,643,971 | A | | 2/1972 | Kushnick |
| 3,764,160 | A | | 10/1973 | Fiala |
| 3,853,334 | A | | 12/1974 | Auman et al. |
| 3,861,710 | A | * | 1/1975 | Okubo ................... 280/735 |
| 3,909,037 | A | | 9/1975 | Stewart |
| 4,043,572 | A | * | 8/1977 | Hattori et al. ............. 280/738 |
| 5,302,432 | A | * | 4/1994 | Shigeta et al. ............ 428/36.1 |
| 5,338,061 | A | * | 8/1994 | Nelson et al. ............. 280/729 |
| 5,466,001 | A | * | 11/1995 | Gotomyo et al. .......... 280/730.1 |
| 5,505,485 | A | | 4/1996 | Breed |
| 5,586,782 | A | | 12/1996 | Zimmerman, II et al. |
| 5,649,466 | A | | 7/1997 | Genovese |
| 5,772,238 | A | * | 6/1998 | Breed et al. ............. 280/728.2 |
| 5,792,976 | A | | 8/1998 | Genovese |
| 6,149,194 | A | | 11/2000 | Breed et al. |

(Continued)

FOREIGN PATENT DOCUMENTS

JP          4244453          9/1992

*Primary Examiner*—Eric Culbreth
(74) *Attorney, Agent, or Firm*—Brian Roffe

(57) ABSTRACT

Airbag deployment system for a vehicle having a passenger compartment includes airbags arranged to substantially fill the passenger compartment upon deployment, an inflator system for inflating the airbags and a crash sensor system coupled to the inflator system for directing the inflator system to inflate the airbag. Multiple housings may be arranged around the passenger compartment, each including at least one airbag. Some of the airbags may be interconnected to provide a primary airbag and at least one secondary airbag extending from the primary airbag. The inflator system may be an aspirated inflator system. The crash sensor system may be an anticipatory sensor system. The airbags may be film airbags. One-way valves may be arranged between adjacent airbags.

27 Claims, 14 Drawing Sheets

U.S. PATENT DOCUMENTS

| | | |
|---|---|---|
| 6,213,499 B1 | 4/2001 | Khoudari et al. |
| 6,334,490 B1 | 1/2002 | Dille |
| 6,715,786 B1 | 4/2004 | Willibey |
| 7,338,069 B2 | 3/2008 | Breed |
| 2003/0085558 A1 | 5/2003 | Forssell et al. |

* cited by examiner

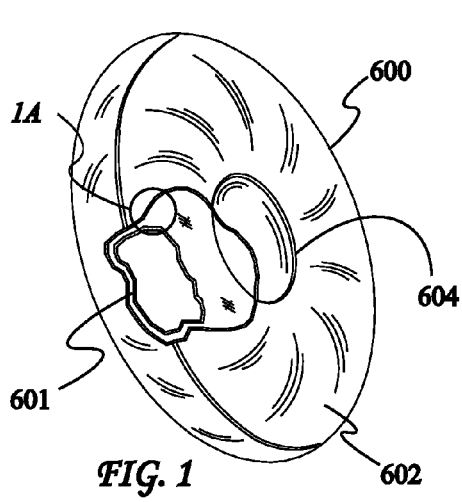
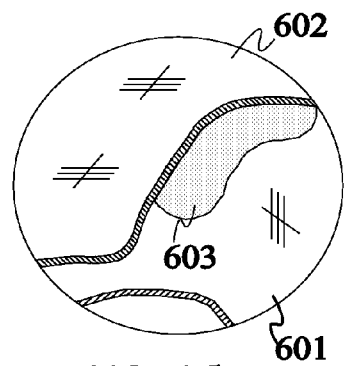
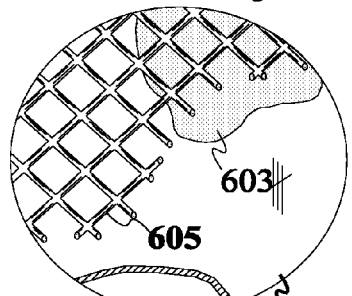
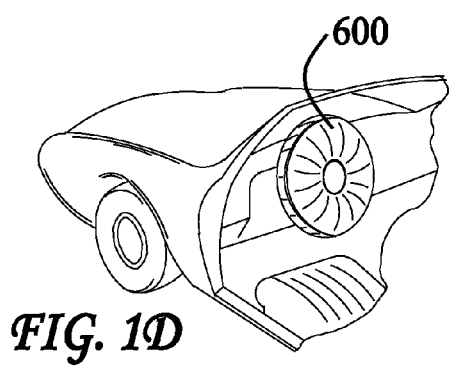
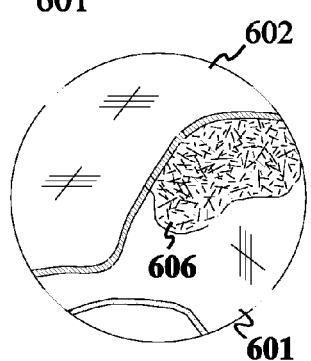
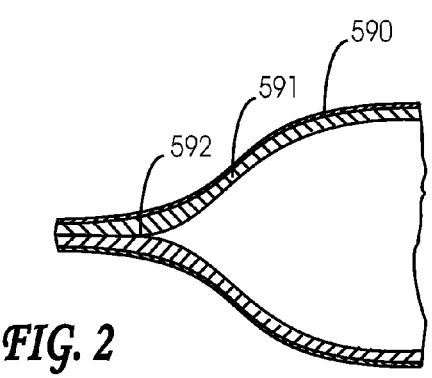
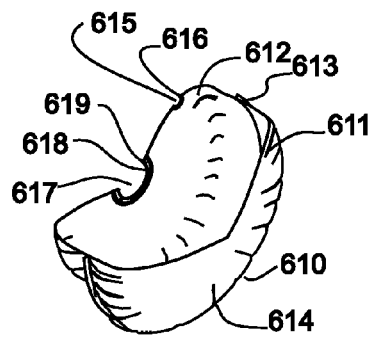

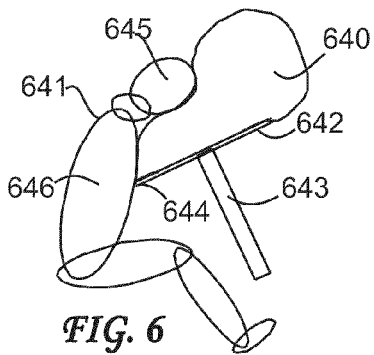
FIG. 6
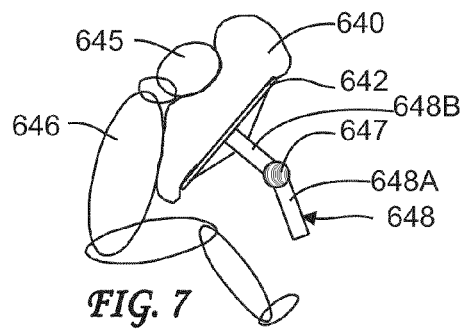
FIG. 7
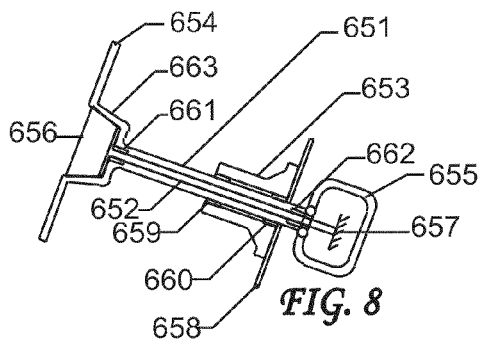
FIG. 8
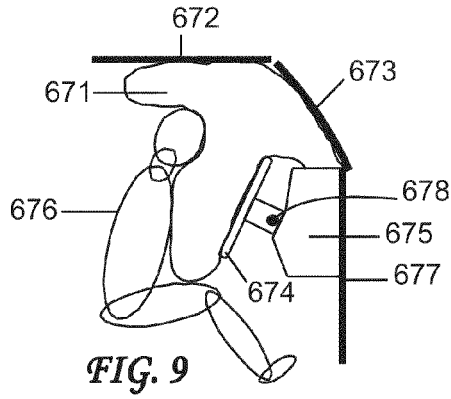
FIG. 9
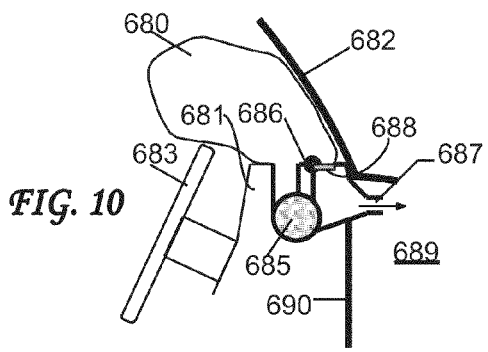
FIG. 10
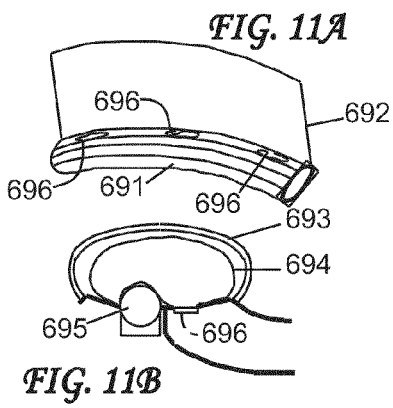
FIG. 11A
FIG. 11B
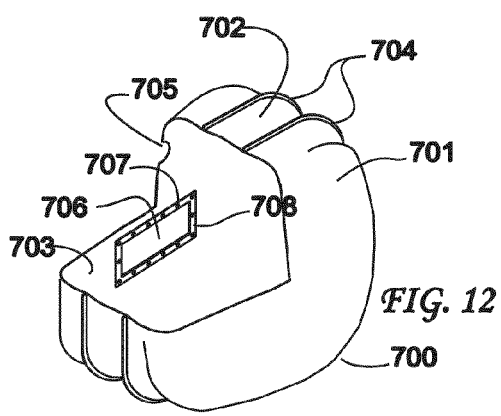
FIG. 12
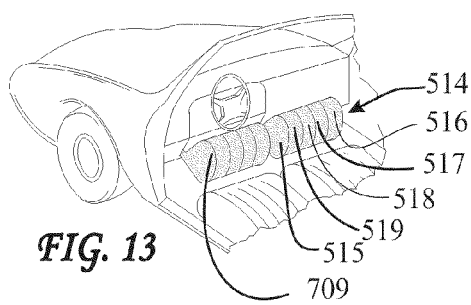
FIG. 13

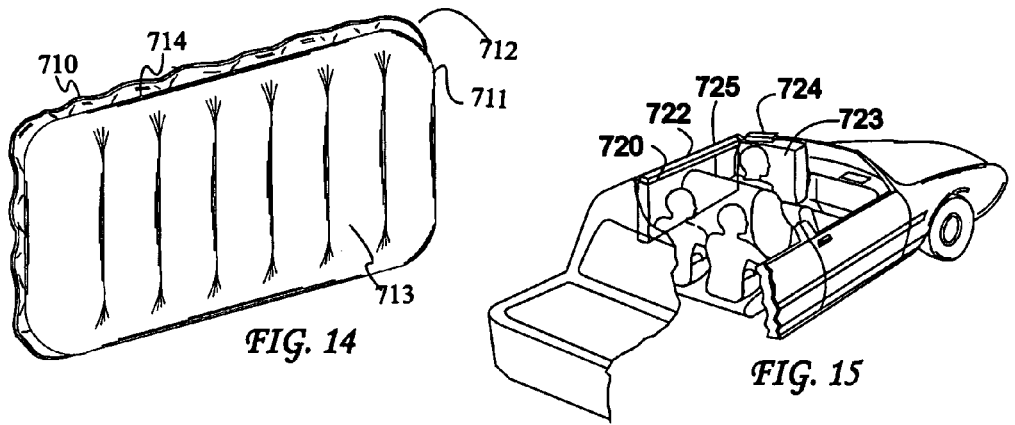
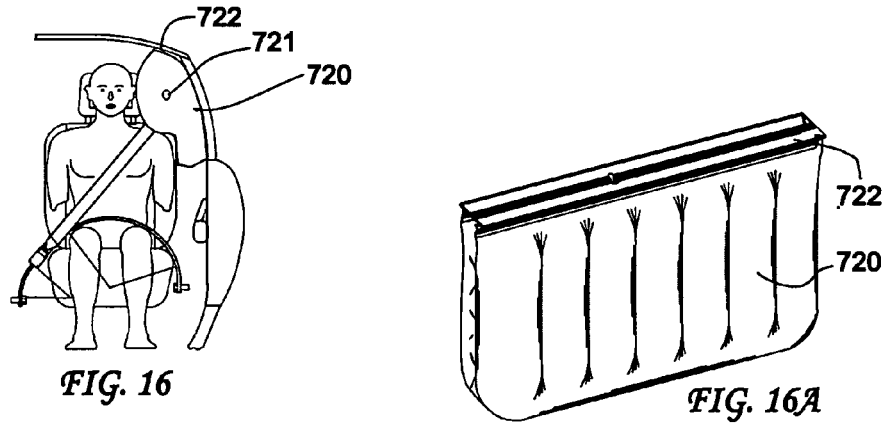
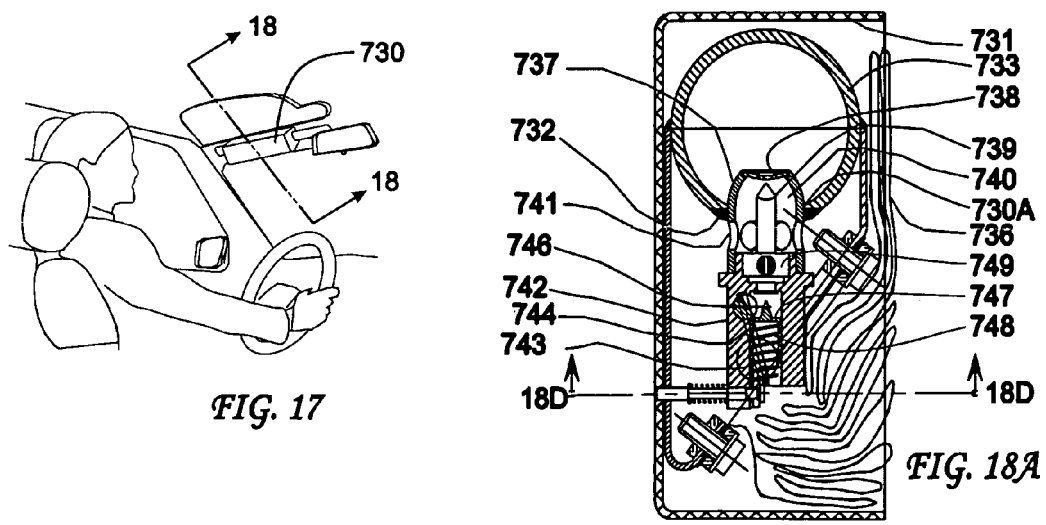

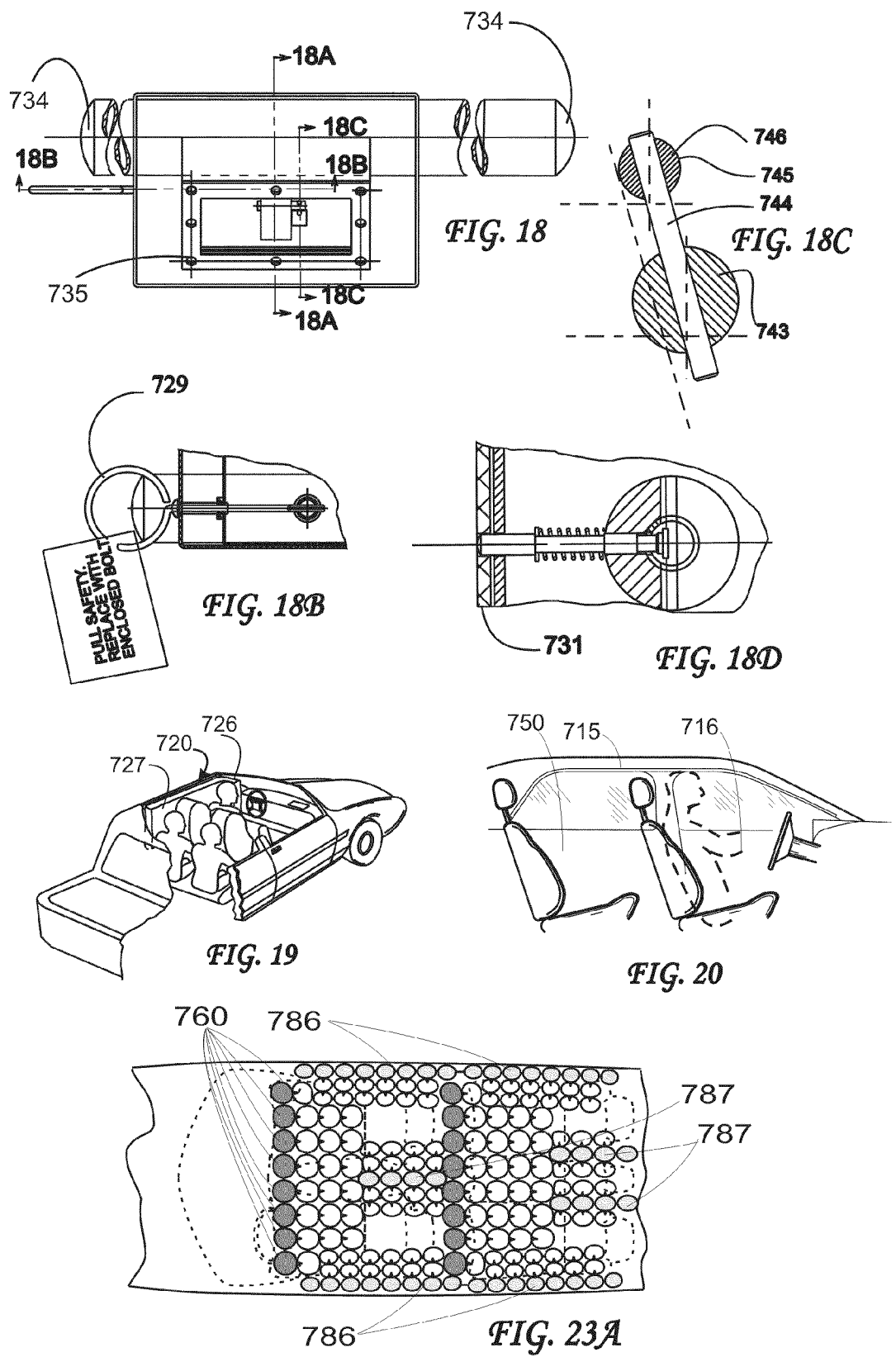

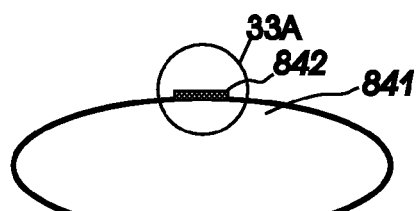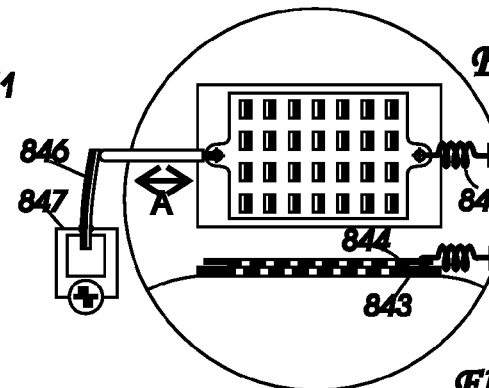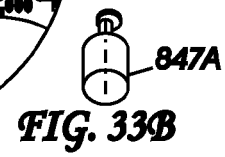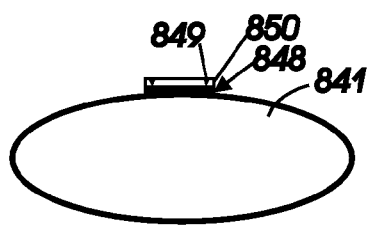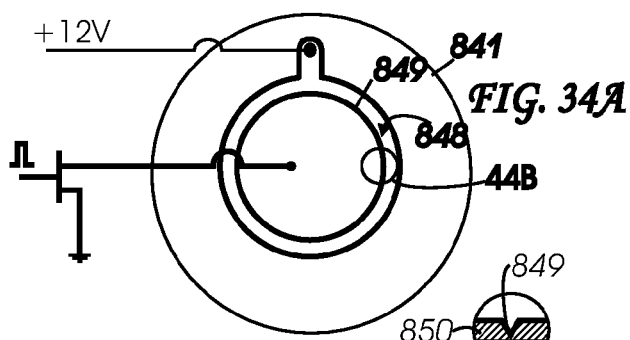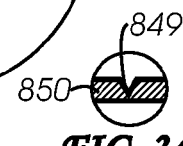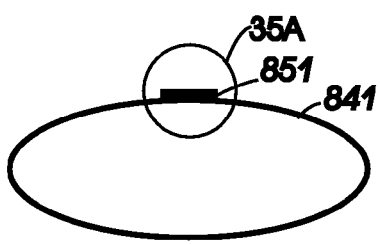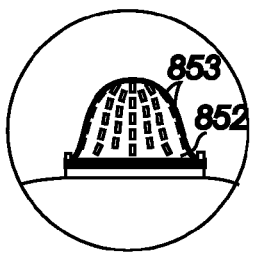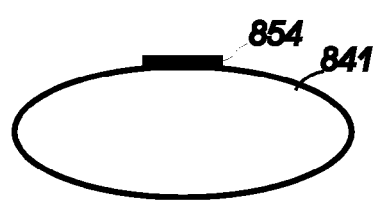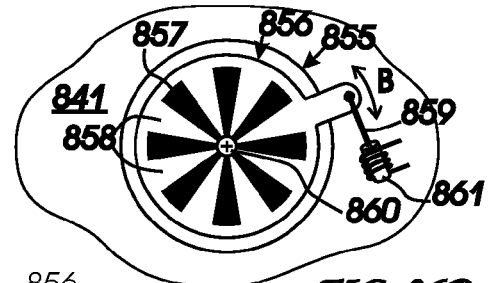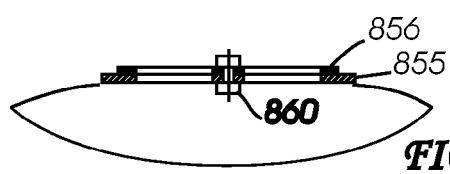

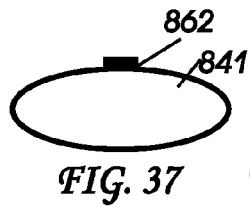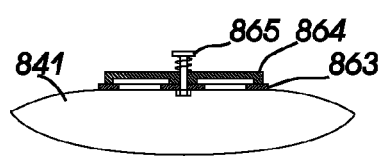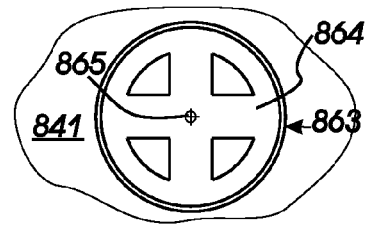
FIG. 37   FIG. 37A   FIG. 37B
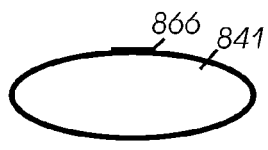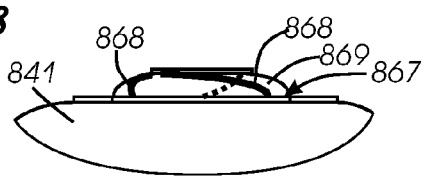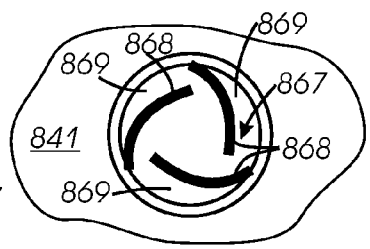
FIG. 38   FIG. 38A   FIG. 38B
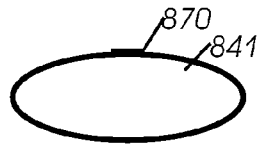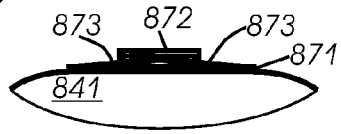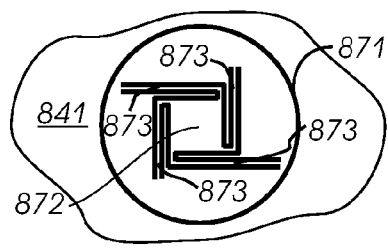
FIG. 39   FIG. 39A   FIG. 39B
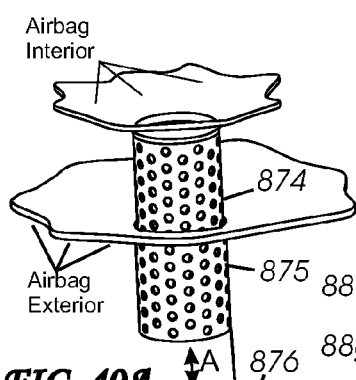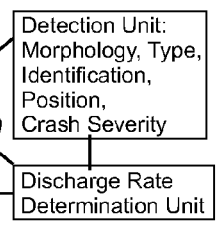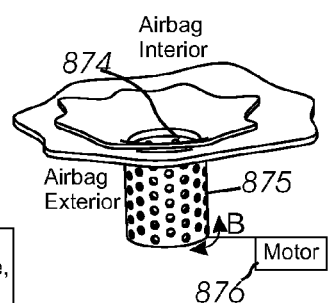
FIG. 40A   FIG. 40B

AIRBAG DEPLOYMENT TECHNIQUES

CROSS-REFERENCE TO RELATED APPLICATIONS

This application is a continuation of U.S. patent application Ser. No. 11/418,517 filed May 4, 2006 which is:

1) a continuation-in-part (CIP) of U.S. patent application Ser. No. 10/817,379 filed Apr. 2, 2004, now abandoned; and 2) a CIP of U.S. patent application Ser. No. 10/974,919 filed Oct. 27, 2004, now U.S. Pat. No. 7,040,653; and 3) a CIP of U.S. patent application Ser. No. 11/131,623 filed May 18, 2005, now U.S. Pat. No. 7,481,453.

This application is related to, on the grounds that it includes common subject as, U.S. patent application Ser. No. 10/413,318 filed Apr. 14, 2003, U.S. patent application Ser. No. 09/888,575 filed Jun. 25, 2001, now U.S. Pat. No. 6,715,790, U.S. patent application Ser. No. 09/535,198, filed Mar. 27, 2000, now U.S. Pat. No. 6,250,668, U.S. patent application Ser. No. 09/071,801, filed May 4, 1998, now U.S. Pat. No. 6,149,194, U.S. patent application Ser. No. 08/795,418, filed Feb. 4, 1997, now U.S. Pat. No. 5,863,068, U.S. patent application Ser. No. 08/626,493, filed Apr. 2, 1996, now U.S. Pat. No. 5,746,446, U.S. patent application Ser. No. 08/571,247, filed Dec. 12, 1995, now U.S. Pat. No. 5,772,238, U.S. patent application Ser. No. 08/539,676, filed Oct. 5, 1995, now U.S. Pat. No. 5,653,464, and U.S. patent application Ser. No. 08/247,763, filed May 23, 1994 now U.S. Pat. No. 5,505,485.

All of the above applications and patents, and any applications, publications and patents mentioned below, are incorporated herein by reference in their entirety and made a part hereof.

FIELD OF THE INVENTION

The present invention relates to airbag deployment techniques.

The present invention also relates to airbags made from plastic film such as a side curtain airbag arranged to deploy along the side of a vehicle to protect occupants during a crash involving the vehicle, including a rollover. The side curtain airbag may even wrap around a front-seated occupant, i.e., have a frontal portion designed to deploy between a front-seated occupant and the dashboard. Also there may be a plurality of plastic film airbags that deploy in the event of a vehicle crash. In some cases, such plastic film airbags may deploy to fill substantially all of the front passenger compartment of an automotive or truck vehicle.

BACKGROUND OF THE INVENTION

The invention relates to several different areas and a discussion of some particular areas of interest follows. All mentioned patents, published patent applications and literature are incorporated by reference herein.

1. AIRBAGS 1.1 Plastic Film Airbags

At the time of earlier related applications, plastic films had not previously been used to make airbags with the exception of perforated films as disclosed in U.S. Pat. No. 4,963,412 to Kokeguchi, which is discussed below.

U.S. Pat. No. 3,451,693 (Carey) describes the presence of a variable exhaust orifice in an airbag which maintains constant pressure in the airbag as the occupant is thrown into the airbag but does not disclose plastic film, merely plastic. The distinguishable properties of film are numerically described in the instant specification and basically are thinner and less weight. The material of Carey is not plastic film which is capable of arresting the propagation of a tear. In fact, it is unclear in Carey as to whether the orifice can be varied in a repeatable/reusable manner and no mention is made as to whether the stretching of the orifice area is permanent or temporary.

U.S. Pat. No. 5,811,506 (Slagel) describes a thermoplastic, elastomeric polyurethane for use in making vehicular airbags. The polyurethane is extrudable so that airbags of various shapes and sizes can be formed therefrom.

U.S. Pat. No. 6,627,275 (Chen) describes the use of crystal gels to achieve tear resistance for airbags. This is a particular example of the teachings herein for the use of the thermoplastic elastomers to achieve tear resistance through the use of a particular subclass of such polymers. No mention is made, however, to laminate these materials with a film with a higher elastic modulus as is taught herein. Although interesting materials, they may not be practical for airbags due to their high cost. In particular, the crystal gel described in Chen is part of a class of thermoplastic elastomer (TPE) and in particular of polyester elastomers such as HYTREL™ which are discussed elsewhere herein and in the parent applications listed above. It is important to note that the particular formulations listed in Chen are probably poor choices for the blunting film portion of a laminated film used to make film airbags. This is due to their very high elasticity of $10^4$ to $10^6$ dynes per $cm^2$ (see Chen at col. 21, line 4). This corresponds to the liquid crystal polymers which have an elastic modulus of above $10^{10}$ dynes per $cm^2$. Thus, they will provide little resistance to the propagation of a tear in the higher modulus component of the laminated film and would be poor as the blunting layer.

It is important to note that liquid crystal polymers of a different sort than disclosed in Chen having quite the opposite properties would be ideal candidates for the high modulus component of a laminated film due to their inelastic nature, that is their high modulus of elasticity. Although these materials are considerably more expensive than NYLON®, for example, they are about twice as strong and therefore only half as much would be required. This would render the inner layer, for example, of a lamination with perhaps urethane as the outer layers, half the thickness and thus one eighth of the bending stiffness of NYLON®. Thus, the laminated airbag made in this manner would be considerably easier to fold and when folded, it would occupy substantially less space.

Another advantage of the more rigid liquid crystal polymers is that they can be laminated to polyurethane or other blunting materials without the need for an adhesive. This results in a significant cost saving for the laminated film and thus partially offsets the higher cost of the material compared with NYLON®, for example. Naturally, they can also be laminated to a more elastic liquid crystal polymer.

Note also that the "soft, safe, hugging, enveloping inflatable restraint cushions" described in Chen are not applicable in the form disclosed because, if used in a thin film version, it would blow up like a balloon permitting the occupant to easily displace the gas and penetrate far into the airbag. If used in a thick film version so that it does not stretch, then the advantages of the material are lost and the airbag would be similar in weight to a fabric airbag. However, if it is laminated to a more rigid material or a net as disclosed herein and in the previous patents of the current assignee, then again many of the advantages of the material are lost since the main material providing the strength to the airbag is the more rigid film or net layer. Nevertheless, providing there is not too much of a cost penalty the "elastic-crystalline gels" described in Chen might be advantageously used in the inventions described herein for some applications. Some other patents assigned to the same assignee as Chen that may be relevant to inventions herein are: U.S. Pat. No. 6,552,109, U.S. Pat. No. 6,420,475, U.S. Pat. No. 6,333,374, U.S. Pat. No. 6,324,703, U.S. Pat. No. 6,148,830, U.S. Pat. No. 6,117,176, U.S. Pat. No. 6,050,871, U.S. Pat. No. 5,962,572, U.S. Pat. No. 5,884,639, U.S. Pat. No. 5,868,597, U.S. Pat. No. 5,760,117, U.S. Pat. No. 5,655,947, U.S. Pat. No. 5,633,286, U.S. Pat. No. 5,508,334, U.S. Pat. No. 5,336,708, U.S. Pat. No. 5,334,646, U.S. Pat. No. 5,324,222, U.S. Pat. No. 5,262,468 and U.S. Pat. No. 4,369,284.

Although airbags are now installed in all new vehicles and each year an increasing number of airbags are making their way into new vehicle designs, they are still basically the same design as originally invented about 40 years ago. Generally, each driver and passenger side airbag is a single chamber or at most two chambers, they are made from fabric that has sufficient mass as to cause injury to an occupant that is in the deployment path and they are positioned so that a forward-facing occupant will be protected in a substantially frontal impact. In contrast, many occupants are out-of-position and many real world crashes involved highly angular impacts, spinouts, rollovers etc. where the occupant is frequently injured by the deploying airbag and impacts other objects in the vehicle compartment in addition to the airbag.

In the out-of-position case, occupant sensors are now being considered to prevent or control the deployment of the airbag to minimize deployment induced injuries. These occupant sensors will significantly reduce the number of deaths caused by airbags but in doing so, they can deprive the occupant of the protection afforded by a softer airbag if the deployment is suppressed. Side and side curtain airbags are being installed to give additional protection to occupants in side impacts and rollovers. However, there still will be many situations where occupants will continue to be injured in crashes where airbags could have been a significant aid. What is needed is an airbag system that totally surrounds the occupant and holds him or her in the position that he or she is prior to the crash. The airbag system needs to deploy very rapidly, contact the occupant without causing injury and prevent his or her motion until the crash is over. This is a system that fills up the passenger compartment in substantially the same way that packaging material is used to prevent breakage of a crystal glass during shipment.

To accomplish this self-adjusting airbag system, the airbags must be made of very light material so that when they impact the occupant, they do not cause injury. They also must be inflated largely with the gas that is in the passenger compartment or else serious ear injuries may result and the doors and windows may be blown out. Thus, an airbag system comprised of many mini-airbags all connected together and inflated with one or more aspirated inflators that limit the pressure within each mini-airbag is needed. This is one focus of this invention. As it is accomplished, the inflators will get smaller and simpler since there will be no need for dual stage inflators. Since out-of-position occupants will not be injured by the deploying airbags, there will be no need for occupant sensors and children can safely ride in the front seat of a vehicle. The entire system will deploy regardless of the direction of the impact and the occupants will be frozen in their pre-crash positions until the crash is over.

Anticipatory crash sensors based on pattern recognition technology are disclosed in several of current assignee's patents and pending patent applications (see, e.g., U.S. Pat. No. 6,343,810, U.S. Pat. No. 6,209,909, U.S. Pat. No. 6,623,033, U.S. Pat. No. 6,746,078 and US20020166710). The technology now exists to allow the identification and relative velocity determination to be made for any airbag-required accident prior to the accident occurring (anticipatory sensing). This achievement now allows airbags to be reliably deployed prior to the accident. The implications of this are significant. Prior to this achievement, the airbag system had to wait until an accident started before a determination could be made whether to deploy the airbags. The result is that the occupants, especially if unbelted, would frequently achieve a significant velocity relative to the vehicle passenger compartment before the airbags began to interact with the occupant and reduce his or her relative velocity. This would frequently subject the occupant to high accelerations, in some cases in excess of 40 Gs, and in many cases result in serious injury or death to the occupant. On the other hand, a vehicle typically undergoes less than a maximum of 20 Gs during even the most severe crashes. Most occupants can withstand 20 Gs with little or no injury. Thus, as taught herein, if the accident severity could be forecast prior to impact and the vehicle filled with plastic film airbags that freeze the occupants in their pre-crash positions, many lives could be saved and many injuries avoided.

A main argument against anticipatory sensors is that the mass of the impacting object remains unknown until the accident commences. However, through using a camera, or other imaging technology based on, e.g., infrared, radar or terahertz generators and receivers, to monitor potentially impacting objects and pattern recognition technologies such as neural networks, the object can be identified and in the case of another vehicle, the mass of the vehicle when it is in the unloaded condition can be found from a stored table in the vehicle system. If the vehicle is a commercial truck, then whether it is loaded or not will have little effect on the severity of an accident. Also if the relative velocity of the impacting vehicles is above some threshold, then again the mass of the impacting vehicle is not important to the deployment decision. Pickup trucks and vans are thus the main concern because as loaded, they can perhaps weigh 50 percent more than when unloaded. However, such vehicles are usually within 10% of their unloaded-plus-one-passenger weight almost all of the time. Since the decision to be made is whether or not to deploy the airbag, in all severe cases and most marginal cases, the correct decision will be made to deploy the airbag regardless if there is additional weight in the vehicle. If the assumption is made that such vehicles are loaded with no more than 10% additional weight, then only in a few marginal crashes, a no-deployment decision will be made when a deployment decision is correct. However, as soon as the accident commences, the traditional crash sensors will detect the accident and deploy the airbags, but for those marginal cases the occupants will have obtained little relative forward velocity anyway and probably not be hurt and certainly not killed by the deploying plastic film airbags which stop deploying as soon as the occupant is contacted. Thus, the combination of anticipatory sensor technology and plastic film airbags as disclosed herein results in the next generation self adapting safety system that maximizes occupant protection. Both technologies preferably can be used together.

Another feature of plastic film airbags discussed below is the ability of film to be easily joined together to form structures that would be difficult or impossible to achieve with fabric such as the addition of a sheet of film to span the chambers of a side curtain airbag. It is well known that side curtain airbags are formed with chambers in order to limit the thickness of the curtain. This results in a curtain with reduced stiffness to resist the impact of the head of an occupant, for example, and to also form areas where the protection is less than other areas due to the presence of seams. Using film, these seam sections can be easily spanned without running the risk of introducing additional leakage paths in the airbag. This spanning of the chambers can produce additional chambers that can also be pressurized or the additional chambers can be left open to the atmosphere.

An analysis of a driver airbag made from two flat sheets of inelastic film shows that maximum stresses occur in the center of the airbag where the curvature is at a minimum. Thus, the material strength and not the seal or seam strength limits the pressure that causes the airbag to fail. On the other hand, analysis of some conventional side curtain airbags has shown that maximum stress can occur in the seams and thus the maximum pressure that the airbag can hold without bursting is limited by the material strength in the seams. This fact is at least partially the cause of excessive gas leakage at the seams of some fabric airbags necessitating the lamination of a polymer film onto the outside of the airbag. This problem is even more evident when the bag is made by continuous weaving where the chambers are formed by weaving two sheets of material together. A solution to this problem as discussed below is to first optimize the design of the seam area to reduce stresses and then to form the airbag by joining the sheets of material by heat sealing, for example, where an elastic material forms the seam that joins the sheets together. Such a joint permits the material to stretch and smooth the stresses, eliminating the stress concentrations and again placing the maximum stresses in the material at locations away from the seam. This has the overall effect of permitting the airbag to be constructed from thinner material permitting a more rapid deployment and causing less injury to an out-of-position occupant. This technique also facilitates the use of plastic film as an airbag material. Such a film can comprise a relatively inelastic, biaxially oriented layer for maximum tensile strength and a relatively elastic, polyurethane film, or equivalent, where the polyurethane film is substantially thicker than the NYLON®. This combination not only improves the blunting property discussed above but also substantially reduces the stresses in the seams (see Appendix 3 of U.S. patent application Ser. No. 10/817,379).

U.S. Pat. No. 6,355,123 to Baker et al. uses reinforcement material to make the seams stronger so as to compensate for the increased stresses discussed above rather than using elastic material to smooth out the stresses as disclosed herein. Similarly, in U.S. Pat. No. 6,712,920, Masuda et al. add reinforcing strips to the inside of a seam which are attached by adhesive to the airbag beyond the sewn seam.

1.2 Driver Side Airbag

A conventional driver side airbag (also referred to herein as a driver airbag) is made from pieces of either NYLON® or polyester fabric that are joined together, e.g., by sewing. The airbag is usually coated on the inside with neoprene or silicone for the purposes of (i) capturing hot particles emitted by the inflator in order to prevent holes from being burned in the fabric, and (ii) sealing the airbag to minimize the leakage of an inflating gas through the fabric. Although such coatings are films, they differ significantly from the films disclosed herein in that they do not significantly modify the properties of the fabric airbags to which they are applied since they are thin and substantially more elastic than fabric. These airbags are conventionally made by first cutting two approximately circular sections of a material having a coating on only one side and which will form a front panel and a back panel, and sewing them together with the coated side facing out. The back panel is provided with a hole for attachment to an inflator. Fabric straps, called tethers, are then sewn to the front panel. Afterwards, the airbag is turned inside out by pulling the fabric assembly through the inflator attachment hole placing the coated side on the inside. Assembly is completed by sewing the tethers to the back panel adjacent the inflator attachment hole.

If a conventional driver airbag is inflated without the use of tethers, the airbag will usually take an approximately spherical shape. Such an inflated airbag would protrude significantly into the passenger compartment from the steering wheel and, in most cases, impact and injure the driver. To prevent this possible injury, the tethers are attached to the front and rear panels of the airbag to restrict the displacement of the front panel relative to the back panel. The result of the addition of such tethers is an airbag that has the shape of a flat ellipsoid with a ratio of the thickness of the airbag to its diameter of approximately 0.6. In the conventional airbag, the tethers are needed since the threads that make up the airbag fabric are capable of moving slightly relative to each other. The airbag is elastic for stresses that are not aligned with the warp or woof of the fabric. As a result, the fabric would distort to form an approximate sphere in the absence of such tethers.

Moreover, the above-mentioned method of manufacturing an airbag involves a great deal of sewing and thus is highly labor intensive and, as a result, a large percentage of all driver airbags are presently manufactured in low labor cost countries such as Mexico.

Many people are injured and some killed by interaction with the deploying airbag (see, e.g., "Warning: Too Much Safety May Be Hazardous", New York Times, Sunday, Dec. 10, 1995, Section F, Page 8). One of the key advantages of the film airbag described herein and in the current assignee's above-referenced patents and patent applications is that, because of its much lower mass than conventional NYLON® or polyester fabric airbags, the injury caused by interaction with the deploying airbag is substantially reduced. In accordance with the teachings of those patents and patent applications mentioned above, the driver airbag system can be designed to permit significant interaction with the driver. In other words, the film airbag can be safely designed to intrude substantially further into the passenger compartment without fear of injuring the driver. Nevertheless, in some cases, as described in U.S. Pat. No. 5,653,464, it may be desirable to combine the properties of a film airbag, which automatically attains the conventional driver airbag shape, with a fabric airbag. In such cases, interaction with the driver needs to be minimized.

Airbag systems today are designed so that ideally the airbag is fully inflated before the occupant moves into the space that is occupied by the airbag. However, most occupants are not positioned at the ideal location assumed by the airbag system designer, and also may not have the dimensions, e.g., size and weight, in the range considered for optimum airbag deployment by the airbag system designer. Many occupants sit very close to the airbags, or at least closer than expected by the airbag system designer, and as mentioned above, are injured by the airbag deployment. On the other hand, others sit far from the airbag, or at least farther away from the airbag than expected, and therefore must travel some distance, achieving a significant relative velocity, before receiving the benefit of the airbag (see, e.g., "How People Sit in Cars: Implications For Driver and Passenger Safety in Frontal Collisions—The Case for Smart Restraints.", Cullen, E., et al $40^{th}$ Annual Proceedings, Association For the Advancement of Automotive Medicine, pp. 77-91).

With conventionally mounted airbags such as those mounted in the steering wheel or instrument panel, severe out-of-position occupant situations, for example where the occupant is resting against the airbag when deployment begins, can be handled using an occupant position sensor, such as disclosed in the current assignee's U.S. Pat. No. 5,653,462 (corresponding to WO 94/22693) which prevents an airbag from deploying if an occupant is more likely to be seriously injured by the airbag deployment than from the accident itself. In many less severe accidents, the occupant will still interact with the deploying airbag and sustain injuries ranging from the mild to the severe. In addition, as mentioned above, some occupants sit very far from the steering wheel or instrument panel and, with conventional airbags, a significant distance remains between the occupant and the inflated airbag. Such occupants can attain a significant kinetic energy relative to the airbag before impacting it, which must be absorbed by the airbag. This effect serves to both increase the design strength requirements of the airbag and increase the injury induced in the occupant by the airbag. For these reasons, it is desirable to have an airbag system that adjusts to the location of the occupant and which is designed so that the impact of the airbag causes little or no injury to the occupant.

Conventional airbags contain orifices or vent holes for exhausting or venting the gas generated by the inflator. Thus, typically for frontal impact airbags within one second after the bag is inflated (and has provided its impact absorbing function), the gas has been completely exhausted from the bag through the vent holes. This imposes several limitations on the restraint system that encompasses the airbag system. Take for example the case where an occupant is wearing a seatbelt and has a marginal accident, such as hitting and severing a small tree, which is sufficient to deploy the airbag, but where it is not really needed since the driver is being restrained by his seatbelt. If the driver has lost control of the car and is traveling at 30 MPH, for example, and has a secondary impact one second or about 50 feet later, this time with a large tree, the airbag will have become deflated and thus is not available to protect the occupant in this secondary, life threatening impact.

In other situations, the occupant might be involved in an accident that exceeds the design capability of the restraint system. These systems are typically designed to protect an average-size male occupant in a 30-MPH barrier impact. At higher velocities, the maximum chest deceleration experienced by the occupant can exceed 60 G's and become life threatening. This is particularly a problem in smaller vehicles, where airbag systems typically only marginally meet the 60-G maximum requirement, or with larger or frailer occupants.

There are many cases, particularly in marginal crashes, where existing crash sensors will cause the airbag to deploy late in the crash. This can also result in an "out-of-position occupant" for deployment of the airbag that can cause injuries and possibly death to the occupant. Other cases of out-of-position occupants include standing children or the forward motion of occupants during panic braking prior to impact especially when they are not wearing seatbelts. The deploying airbag in these situations can cause injury or death to the out-of-position occupant. It is estimated that more than one hundred people have now been killed and countless more seriously injured by the deployment of the airbag due to being out-of-position.

It is recognized in the art that the airbag must be available to protect an occupant for at least the first 100-200 milliseconds of the crash and longer for rollover events. Since the airbag usually contains large vents, the inflator must continue to supply gas to the airbag to replace the gas flowing out of these vents. As a result, inflators are usually designed to produce about twice as much gas than is needed to fill the airbag for frontal impacts. This, of course, increases the cost of the airbag system as well as its size, weight, pressure in the passenger compartment and total amount of contaminants resulting from the gases that are exhausted into the automobile environment.

This problem is compounded when the airbag becomes larger, which is now possible using the film materials of this invention, so as to impact with the occupant wherever he/she is sitting, without causing significant injury, as in a preferred implementation of this invention. This then requires an even larger inflator which, in many cases, cannot be accommodated in conjunction with the steering wheel, if conventional inflator technology, rather than an aspirated inflator, is utilized.

Furthermore, there is a great deal of concern today for the safety of a child in a rear facing child seat when it is used in the front passenger seat of a passenger airbag equipped vehicle. Current passenger side airbags have sufficient force to cause significant injury to a child sitting in such a seat and parents are warned not to use child seats in the front seat of a vehicle having a passenger side airbag. Additionally, several automobile companies are now experimenting with rear seat airbags in which case, the child seat problem would be compounded.

Airbags made of plastic film are described in the patents and patent applications referenced above. Many films are quite inelastic under typical stresses associated with an airbag deployment. If an airbag is made from a pair of joined flat circular sections of such films and inflated, instead of forming a spherical shape, it automatically forms the flat ellipsoidal shape required for driver airbags as described in U.S. Pat. No. 5,653,464. This unexpected result vastly simplifies the manufacturing process for driver airbags since tethers are not required, i.e., the film airbag is made from two pieces of film connected only at their peripheral edges. Furthermore, since the airbag can be made by heat-sealing two flat circular sections together at their peripheral edges without the need for tethers, the entire airbag can be made without sewing, thereby reducing labor and production costs. In fact, the removal of the requirement for tethers permits the airbag to be made by a blow molding or similar process which greatly reduces the cost of manufacturing driver airbags. Thus, the use of film for making an airbag has many advantages that are not obvious.

Films having this inelastic quality, that is films with a high modulus of elasticity and low elongation at failure, tend to propagate tears easily and thus when used alone are not suitable for airbags. This problem can be solved through the addition of reinforcement in conjunction with the inelastic films such as a net material as described in the above-referenced patents and patent applications. Other more elastic films such as those made from the thermoplastic elastomers, on the other hand, have a low modulus of elasticity and large elongation at failure, sometimes 100%, 200% or even 400%, and naturally resist the propagation of tears. Such films, on the other hand, do not form the flat ellipsoidal shape desired for steering wheel-mounted driver side airbags. As discussed in greater detail below, the combination of the two types of film through attachment using lamination, successive casting or coating, or through the use of adhesives, which can be applied in a pattern, can produce a material having both the self-shaping and the resistance to tear propagation properties.

In addition to the above-referenced patents and patent applications, film material for use in making airbags is described in U.S. Pat. No. 4,963,412 to Kokeguchi. The film airbag material described in Kokeguchi is considerably different in concept from that disclosed in the current assignee's above-referenced patents and patent applications or the instant invention. The prime feature of Kokeguchi is that the edge tear resistance, or notch tear resistance, of the airbag film material can be increased through the use of holes in the plastic films, i.e., the film is perforated. Adding holes, however, reduces the tensile strength of the material by a factor of two or more due to the stress concentration effects of the hole. It also reduces the amount of available material to resist the stress. As such, it is noteworthy that the Kokeguchi steering wheel mounted airbag is only slightly thinner than the conventional driver side fabric airbag (320 micrometers (0.013 inches) vs. the conventional 400 micrometers) and is likely to be as heavy as or perhaps heavier than the conventional airbag. Also, Kokeguchi does not disclose any particular shapes of film airbags or even the airbag itself for that matter. Since his airbag has no significant weight advantage over conventional airbags, there is no teaching in Kokeguchi of perhaps the most important advantage of thin film airbags of the present invention, that is, in reducing injuries to occupants who interact with a deploying airbag.

In some implementations of the film airbag of the present invention, the concept of "blunting" is used to achieve the property of arresting the propagation of a tear (see, e.g., Weiss, Peter "Blunt Answer: Cracking the puzzle of elastic solids' toughness", Science News, Week of Apr. 26, 2003, Vol. 163, No. 17).

As discussed in detail below, the airbags constructed in accordance with the present teachings attain particular shapes based on the use of the inelastic properties of particular film materials and reduce tear propagation through a variety of novel methods including the use of elastic films and blunting that is achieved by combinations of films with different elastic moduli. It is also noteworthy that Kokeguchi describes using vacuum methods to form the airbag into the desired shape and thus fails to realize that the properties of inelastic film results in the airbag automatically forming the correct shape upon deployment. Also noteworthy is that Kokeguchi states that polymeric films do not have sufficient edge tear resistance and thus fails to realize that films can be so formulated to have this property, particularly those made incorporating elastomers. These limitations of Kokeguchi results in a very thick airbag that although comprised of film layers, no longer qualifies as a true film airbag as defined herein.

A "film airbag" for the purposes herein is one wherein the film thickness is generally less than about 250 micrometers (0.01 inches), and preferably even below about 100 micrometers, for use as a driver protection airbag. As the size of the airbag increases, the thickness must also increase in order to maintain an acceptable stress within the film. A film airbag so defined may also contain one or more sections that are thicker than about 250 micrometers and which are used primarily to reinforce the thinner film portion(s) of the airbag. A film airbag as defined herein may also include a layer or layers of inelastic material and a layer or layers of elastic material (for example thermoplastic elastomers).

The neoprene or silicone coating on conventional driver airbags, as mentioned above, serves to trap hot particles that are emitted from some inflators, such as a conventional sodium azide inflator. A film airbag may be vulnerable to such particles, depending on its design, and as a result, cleaner inflators that emit fewer particles are preferred over most sodium azide inflators. It is noteworthy, however, that even if a hole is burned through the film by a hot particle, the use of an elastomer in the film material prevents this hole from propagating and causing the airbag to fail, that is by blunting the crack or tear propagation. Also, new inflators using pyrotechnic, hybrid, aspirated or stored gas technologies are now available which do not produce hot particles and produce gases which are substantially cooler than gases produced by sodium azide inflators. Also, not all sodium azide inflators produce significant quantities of hot particles.

One interesting point that also is not widely appreciated by those skilled in the art previously, is that the gas temperature from the inflator is only an issue in the choice of airbag materials during the initial stages of the inflation. The total thermal energy of the gas in an airbag is, to a first order approximation, independent of the gas temperature which can be shown by application of the ideal gas laws. When the gas initially impinges on the airbag material during the early stages of the inflation process, the temperature is important and, if it is high, care must be taken to protect the material from the gas. Also, the temperature of the gas in the airbag is important if the vent holes are located where the out-flowing gas can impinge on an occupant. The average temperature of the airbag itself, however, will not be affected significantly by the temperature of the gas in the airbag.

In certain conventional airbag deployments, the propellant which is used to inflate the airbag also is used to force open a hole in the vehicle trim, called the deployment door, permitting the airbag to deploy. Since the mass of a film airbag is substantially less than the mass of a conventional fabric airbag, much less energy is required to deploy the airbag in time. However, substantial pressure is still required to open the deployment door. Also, if the pressure now used to open the deployment door is used with film airbags, the airbag velocity once the door has been opened may be substantially higher than conventional airbags. This rapid deployment can put excessive stresses on the film airbag and increases the chance that the occupant will be injured thereby. For most implementations of the film airbag, an alternate less energetic method of opening the deployment door may be required.

One such system is described in Barnes et al. (U.S. Pat. No. 5,390,950) entitled "Method and arrangement for forming an airbag deployment opening in an auto interior trim piece". This patent describes a method " . . . of forming an airbag deployment opening in an interior trim piece having a vinyl skin overlying a rigid substrate so as to be invisible prior to operation of the airbag system comprising an energy generating linear cutting element arranged in a door pattern beneath the skin acting to degrade or cut the skin when activated."

A goal of Barnes et al. is to create an invisible seam when the deployment door is located in a visible interior trim panel. This permits greater freedom for the vehicle interior designer to create the particular aesthetic effect that he or she desires. The invisible seam of Barnes et al. is thus created for aesthetic purposes with no thought toward any advantages it might have to reduce occupant injury or advantages for use with a film airbag, or to reduce injuries at all for that matter. One unexpected result of applying the teachings of this patent is that the pressure required to open the deployment door, resulting from the force of the inflating airbag, is substantially reduced. When used in conjunction with a film airbag, this result is important since the inflator can be designed to provide only sufficient energy to deploy and inflate the very light film airbag thereby significantly reducing the size of the inflator. The additional energy required to open a conventional deployment door, above that required to open a deployment door constructed in accordance with the teachings of Barnes et al., is not required to be generated by the inflator. Furthermore, since a film airbag can be more vulnerable to being injured by ragged edges on the deployment door than a conventional fabric airbag, the device of Barnes et al. can be used to pyrotechnically cut open the deployment door permitting it to be easily displaced from the path of the deploying airbag, minimizing the force of the airbag against the door and thus minimizing the risk of damage to the film airbag from the deployment door. Since Barnes et al. did not contemplate a film airbag, advantages of its use with the pyrotechnically opening deployment door could not have been foreseen. Although Barnes et al. describes one deployment door opening method which is suitable for use with an airbag made from plastic film as disclosed herein, i.e., one which requires substantially less force or pressure to open than conventional deployment doors, other methods can be used in accordance with the invention without deviating from the scope and spirit thereof.

The discussion of the self-shaping airbag thus far has been limited to film airbags. An alternate approach is to make an airbag from a combination of fabric and film. The fabric provides the tear resistance and conventional airbag appearance. The film forces the airbag to acquire the flat ellipsoidal shape desired for driver airbags without the use of tethers and permits the airbag to be assembled without sewing using heat and/or adhesive sealing techniques. Such a hybrid airbag is made from fabric and film that have been laminated together prior to the cutting operation. A combination of a film and net, as described in the above referenced patents and patent applications, is equally applicable for airbags described here and both will be referred to herein as hybrid airbags and belong to the class of composite airbags. Combinations of a film and fabric in this invention differ from previous neoprene or silicone coated fabric airbags in that in the prior art cases, the coating does not materially effect either the elastic modulus, stiffness, strength or tear resistance of the airbag whereas in inventions disclosed herein, the film contributes significantly to one or more of these properties.

A finite element analysis of conventional driver side airbags (made of fabric) shows that the distribution of stresses is highly unequal. Substantial improvements in conventional airbag designs can be made by redesigning the fabric panels so that the stresses are more equalized (see, e.g., Appendix 1 of U.S. patent application Ser. No. 10/974,919 which describe inventive designs of airbags with fabric panels and relatively more equalized stresses and Appendices 1-6 of U.S. patent application Ser. No. 10/817,379 filed Apr. 2, 2004, both of which are incorporated by reference herein). Today, conventional airbags are designed based on the strength required to support the maximum stress regardless of where that stress occurs. The entire airbag must then be made of the same thickness material as that selected to withstand maximum stress condition. This is wasteful of material and attempts have been made to redesign the airbag to optimize its design in order to more closely equalize the stress distribution and permit a reduction in fabric strength and thus thickness and weight. However, this optimization process when used with conventional fabric airbags can lead to more complicated assembly and sewing operations and more expensive woven materials and thus higher overall manufacturing costs. An example of such an airbag is that marketed by Precision Fabrics of Greensboro, N.C. Thus, there is a tradeoff between manufacturing cost and airbag optimization.

As discussed in the above-referenced patents and patent applications as well as below and in Appendix 1 of the '919 application and Appendices 1-6 of the '379 application, with a film airbag manufactured using blow molding or casting techniques, for example, greater freedom is permitted to optimize the airbag vis-à-vis equalization of the stress. First, other than tooling cost, the manufacturing cost of an optimized airbag is no greater than for a non-optimized airbag and in fact frequently less since less material is required. Furthermore, the thickness of the film can be varied from one part of the airbag to another to permit the airbag to be thicker where the stresses are greater and thinner where the stresses are less. A further advantage of blow molding or casting is that the film can be made of a single constituent material. When the airbag is fabricated from sheet material, the outside layer of the material needs to be heat sealable, such as is the case with polyurethane, polyethylene or other polyolefin, or else a special adhesive layer is required where the sealing occurs.

As discussed in greater detail below in connection with the description of the invention, when the film for the airbag is manufactured by casting or coating methods, techniques familiar to those skilled in the art of plastics manufacturing are also available to produce a film where the thickness varies from one part to another in a predetermined pattern. This permits a film to be made that incorporates thicker sections in the form of a lattice, for example, which are joined together with thin film. Thus, the film can be designed so that reinforcing ribs, for example, are placed at the optimum locations determined by mathematical stress analysis.

One example of an inflatable film product which partially illustrates the self-shaping technology of this invention is the common balloon made from metallized MYLAR® plastic film found in many stores. Frequently these balloons are filled with helium. They are made by heat-sealing two flat pieces of film together as described in U.S. Pat. No. 5,188,558 (Barton), U.S. Pat. No. 5,248,275 (McGrath), U.S. Pat. No. 5,279,873 (Oike) and U.S. Pat. No. 5,295,892 (Felton). Surprisingly, the shape of these balloons, which is circular in one plane and elliptical in the other two planes, is very nearly the shape that is desired for a driver side airbag. This shape is created when the pressure within the balloon is sufficiently low such that the stresses induced into the film are much smaller than the stresses needed to significantly stretch the film. The film used is relatively rigid and has difficulty adjusting to form a spherical shape. In contrast, the same airbag made from woven material more easily assumes an approximate spherical shape requiring the use of tethers to create the shape which comes naturally with the MYLAR® balloons.

One problem with film balloons is that when a hole is formed in the balloon, it fails catastrophically. One solution to this problem is to use a combination of a film and net as described in the current assignee's above-referenced patents and patent applications. Such materials have been perfected for use as sail material for lightweight high performance sails for sailboats. One example is marketed under the trade name Bainbridge Sailcloth SL Series™, and in particular SL 500-P™, 0.0015 inches. This material is a laminate of a film and a net. Such materials are frequently designed to permit heat-sealing thereby eliminating threads and the stress concentrations associated therewith. Heat-sealing also simplifies the manufacturing process for making sails. Another preferred solution is to make the airbags from a film material which naturally resists tears, that is, one which is chemically formulated to arrest a tear which begins from a hole, for example. Examples of films which exhibit this property are those from the thermoplastic elastomer (TPE) families such as polyurethane, Ecdel elastomer from Eastmen, polyester elastomers such as HYTREL™ and some metallocene-catalyzed polyolefins. For the purposes herein, a thermoplastic elastomer will include all plastic films which have a relatively low modulus of elasticity and high elongation at failure, including but not limited to those listed above. As discussed below, in many implementations, the elastomers can be laminated with NYLON® (NYLON 6,6 for example) or other more rigid film to form a composite film having the blunting property.

Applications for the self-shaping airbag described herein include all airbags within the vehicle which would otherwise require tethers or complicated manufacturing from several separate panels. Most of these applications are more difficult to solve or unsolvable using conventional sewing technology. The invention described herein solves some of the above problems by using the inelastic properties of film, and others by using the elastic properties of thermoplastic elastomers plus innovative designs based on analysis including mathematical modeling plus experimentation (see Appendix 1 of the '919 application and Appendices 1-6 of the '379 application). In this manner, the problems discussed above, as well as many others, are alleviated or solved by the airbags described below. Films for airbags which exhibit both the self-shaping property and also formulated to resist the propagation of a tear are made by combining a layer of high modulus material with a layer of a thermoplastic elastomer. Then, if a tear begins in the combined film, it will be prevented from propagating by the elastomer, yet the airbag will take the proper shape due to the self-shaping effect of the high modulus film. Such materials frequently exhibit blunting.

Japanese Patent No. 89-090412/12 describes fabricated cloths that are laminated in layers at different angles to each other's warp axis to be integrated with each other. Strength and isotropy are improved. The cloth is stated as being useful for automotive airbags for protecting the passenger's body. It is possible that such an airbag may have some of the self-shaping properties of a driver side film airbag disclosed herein but such is not disclosed in this patent.

U.S. Pat. No. 6,607,796 and U.S. Pat. No. 6,180,044 (Hirai) describe a plastic film driver side airbag referred to as a Resin airbag and a method of making it. One layer of the film airbag is actually molded in place resulting in a variation in material thickness at the seams. This variation in thickness has also been disclosed in the current assignee's patents as listed above. The resulting bag has a variation in the shape caused by the variable width of the seam. In the current assignee's patents, a similar effect is achieved by varying the geometry of the seam as illustrated herein in FIG. 5D.

Consider now a driver side airbag that does not rotate with the steering wheel. Self-contained driver side airbag systems, such as U.S. Pat. No. 4,167,276 to Bell and U.S. Pat. No. 4,580,810 to Thuen, are designed to mount on and rotate with the steering wheel of vehicles. Such designs have the advantage of being modular so that they can be installed on many different vehicles with a modification of the steering wheel. However, because the airbag module rotates with the steering wheel, the shape of a driver side airbag must be axis-symmetrical with respect to the axis of steering wheel, as is the case with conventional driver airbags. This configuration allows the airbag to deploy and provide a uniform protection at any steering position. Usually a driver side airbag is made of two circular pieces of coated NYLON® cloth sewn together with tethers and becomes an approximation of an ellipsoid when inflated.

An airbag absorbs the energy of an occupant when the occupant moves forward and impacts with the airbag and the airbag deforms to wrap around the occupant. The efficiency of an airbag cushion depends not only on the stiffness and damping of the bag (which is a function of the pressure inside the bag and the exit orifices or exit valves), but also on the relative orientation and penetration of the occupant and the bag. If a large portion of the occupant torso is in contact with the bag in the early stage of a crash, a considerable amount of occupant energy can be dissipated. On the other hand, if only a small portion of the body, such as the head, is in contact with the bag, it can result in significant penetration into the bag and delay the absorption of kinetic energy. Airbags of axis-symmetrical shapes may not be optimal for occupant protection because the interaction between an airbag and an occupant is a function of the distance and the relative angle between the steering wheel and the occupant's upper torso. Another concern is that the steering wheel angle can change significantly from driver to driver Another problem of an ellipsoidal driver side bag is the tendency of the driver to slide off edges of the bag particularly in angle crashes. This is mainly due to the geometry of the bag and the fact that the central portion of the bag is frequently stiffer than the periphery. A solution is to have a larger airbag, like a passenger side airbag, to embrace the driver as much as possible to prevent the tendency to slide off the airbag. Such improvements cannot be achieved by a driver side airbag fixed to the steering wheel because the space and the geometry are both limited.

Some vehicles, such as buses and trucks, have a very steep steering column angle. When an accident occurs and the driver moves forward, the lower part of the steering wheel close to the driver makes contact with the driver first and a great deal of abdomen or chest penetration occurs. If a conventional airbag module attached to the steering wheel is deployed, the protection of driver is limited until the upper torso of the driver bends fully forward and lands on the air cushion. This problem could be solved by modifying the angle of the steering wheel or column, but it requires a change of the structure of the steering mechanism or the installation of an additional joint in the steering column.

Inside a self-contained airbag module, the sensor is arranged so that its axis is aligned to the axis of the steering wheel. The axis of the sensor is defined as the sensitive axis of the accelerometer or sensing mass. However, a ball-in-tube sensor or an accelerometer-based satellite crush zone mounted sensor used to detect frontal impacts has the sensitive axis parallel to the longitudinal axis of the vehicle. With such an arrangement, the sensor is most sensitive in the desired detecting direction. In the self-contained module mounted on the steering wheel, on the other hand, the sensitivity of the sensor to the frontal velocity change is reduced because the sensor is inclined at an angle from the crushing direction. Even though the calibration of a sensor can be chosen selected to compensate the steering column angle, this makes the sensor more sensitive to vertical accelerations which may be undesirable.

In many cases, the driver side airbag module located on the steering wheel is large and frequently blocks the driver's view of the instrument panel behind the steering wheel. When this is the case, the addition of an airbag system to a vehicle can require modification of the steering column or the instrument panel to compensate for this reduced visibility.

The steering column of some vehicles may collapse or shift in a high-speed crash or under a tremendous crush of the front end of a vehicle. If the driver side airbag is designed to operate under normal conditions, the unexpected movement of the steering column could change the location of a deployed airbag and thus alter the relative positions of the occupant and the airbag cushion. This can result in a partial loss of airbag protection for the driver.

US20040026909 to Rensingoff describes an auxiliary airbag coming from the dashboard to support the steering wheel and provide additional protection to the driver through this supplemental airbag. Such an airbag is not disclosed to aid in supporting a much lighter steering wheel steering column as might be used in a drive-by-wire system.

1.3 Passenger Side Airbag

There is no known related art specifically covering passenger airbags made from plastic film.

1.4 Inflatable Knee Bolster

This aspect of the invention relates to a knee bolster safety apparatus for protecting the legs and lower torso of the occupant of a motor vehicle to reduce the extent and severity of injuries sustained during a crash. This invention more specifically relates to using an inflatable bolster to restrain the occupant's legs and lower torso during a survivable crash.

During a frontal impact, the occupant moves forward due to the inertia and kinematics of the crash while the front components of the vehicle structure (bumper, hood, engine cavity) begin to collapse. Knee and leg injuries can occur when the body of an occupant slides or submarines forward and/or downward and the occupant's knees hit the instrument panel or structure beneath the panel. Further injuries can occur when the occupant's lower torso and legs move forward such that the knees are trapped in or beneath the instrument panel just before the foot well begins to collapse. As the foot well collapses, it can push the occupant's feet backward, causing the knees to elevate and become further trapped. As the foot well continues to crush, the loads on the trapped legs increase and can cause foot, ankle, and tibia injuries. These injuries are common even with fixed knee bolsters designed to meet present knee injury criteria requirements.

Abdominal and lower torso injuries can be inflicted by the lap and lower part of the torso belts as they ride upward on the soft tissue of the occupant's torso when he or she slides forward and downward due to the forces of the frontal crash. Knee bolsters are designed to attempt to eliminate or minimize these injuries.

Airbag apparatus are generally designed under the assumption that the occupant is riding in the vehicle in a forward-facing, seated position with both feet on the vehicle floor. When an occupant is not in this position, the occupant or occupant's body part is said to be "out-of-position". As most occupants are sometimes out-of-position, airbag apparatus which effectively restrain the occupant regardless of the occupant's position are advantageous.

During a front end collision with a standard airbag, it the occupant is restrained by a seat belt, the occupant's upper torso bends at the waist and hits the primary airbag. However, depending on the design of the vehicle seat and force of the collision, there is a tendency for an occupant to slide forward along the seat and slip below the primary airbag, sometimes even entering into the leg compartment of the vehicle. Alternatively, the legs and knees of the occupant may slide or shift to one side of the seat or the other. The tendency is pronounced when the occupant is not properly restrained by a seat belt. This tendency may be referred to as "submarining". Submarining often causes the occupant's upper torso to bend at the waist but not in a direction perpendicular to the primary airbag. When the occupant submarines, the primary airbag is less effective in protecting the occupant.

Submarining is more prevalent in vehicles which have large leg room compartments. Vehicles which have restricted leg room, such as sports cars, have a lower submarining tendency. In vehicles like sports cars, the distance between the legs and knees of the occupant and the instrument panel is shorter than the distance in vehicles such as sport utility vehicles or trucks. In an accident in a sports car, the knees of the occupant often strike the instrument panel. The instrument panel then prevents submarining. Generally, the material of the sports car instrument panel deforms to some degree to help protect the legs and knees of the occupant. The area of the instrument panel which is impacted is called the knee bolster.

In order to prevent submarining in vehicles with large leg room compartments, a knee airbag system is sometimes used. A knee airbag system is generally positioned in the lower portion of the instrument panel. Knee airbag systems allow vehicle manufacturers to design vehicles with more leg room and still have safety comparable to that of vehicles with less leg room.

The knee airbag system includes an inflator, a housing, an airbag, and a trim cover panel. The housing is a conventional enclosure for securing the knee airbag components to the vehicle. The housing stores the knee airbag system components while the airbag is deflated and not in use.

The airbag provides the main structure for protecting the occupant. The bag is generally made of flexible fabric material. The material is generally a weave of NYLON® and/or polyester. Generally, multiple pieces of fabric are sewn together to form an airbag. Alternatively, the material may be woven to create a one piece airbag. Preferably, as taught herein, the airbag is formed into cells and made from plastic film.

The trim cover panel is a panel which covers the airbag and inflator within the housing and presents an aesthetic trim surface to the vehicle occupant. The trim cover panel is connected to the housing such that the pressure of the inflating airbag pushes the trim cover panel out of the way.

The inflator, once triggered, uses compressed gas, solid fuel, or a combination to produce rapidly expanding gas to inflate the airbag. As with conventional airbag systems, a knee airbag can be a large textile bag which the gas inflates like a balloon. The conventional prior art inflated knee airbag occupies some of the volume of the vehicle leg compartment. The knee airbag system may also include a fixed panel, called a load distribution panel or knee bolster panel. This panel can be made of foam and hard plastic surrounding a metal substrate. This panel can provide support to prevent submarining.

Generally, two designs are used in knee airbag systems. The first design concentrates on moving a piece of rigid material, similar to the material of the instrument panel in a sports car, close to the occupant's knees and legs thereby creating leg and knee support. This is known as a load distribution plate. The second design does not use a support plate. This design relies on the knee airbag to provide the necessary knee and leg support. Traditional designs of the knee airbag without the load distribution plate have been less successful in preventing submarining. This is due to the fact that the airbag only partially fills the volume surrounding the knees and legs of the occupant and thus the airbag can easily deform and provides less support. On the other hand, it is possible for the knees of the occupant to slip off of the load distribution plate thereby defeating its purpose. Also, if the load distribution plate is at a significant distance from the occupant's knees, the occupant can attain a significant velocity before striking the plate resulting in knee and femur injuries.

These problems are generally solved by the cellular knee bolster design described in detail herein.

It is known in the art to make an inflatable fabric single chamber knee bolster airbag without a load distribution panel. U.S. Pat. No. 3,642,303 and U.S. Pat. No. 5,240,283 are two of many such patents. It is also known to use an airbag to move a load distribution panel closer to the occupant (see, e.g., U.S. Pat. No. 6,345,838, U.S. Pat. No. 6,471,242 and European Patent EP00684164B1).

U.S. Pat. No. 4,360,223 (Kirchoff) describes a low-mount, airbag module for the passenger side of an automobile that uses two bags that are folded within a housing that is open at one end. One of the bags is for restraining the knees of the passenger to prevent forward sliding in the event of a crash; the other bag is for restraining the torso. The knee bag is inside the torso bag and they are both attached directly to the inflator, the knee bag being arranged to be inflated first. The torso bag then is inflated to prevent forward rotation of the passenger from the hips.

Further, in accordance with Kirchoff, a pressure responsive orifice is provided in a second opening in the wall of the knee bag. This orifice controls the flow of gas through the opening in the wall of the knee bag thereby to insure a predetermined gas pressure within the knee bag, while permitting subsequent inflation of the torso bag by gases passing into the torso bag through the orifice. Thus, a knee bolster airbag is described but it is positioned inside of the main torso airbag and inflated by the same inflator.

U.S. Pat. No. 5,458,366 describes a compartmentalized airbag that functions to move a knee bolster or load distribution plate to the knees of the occupant. The occupant's knees do not contact directly the compartmentalized airbag as is in a preferred embodiment of the invention as described herein below. The '366 patent correctly points out that a knee bolster airbag, referred to in the '366 patent as a reactive type knee bolster, functions on the principle of a single compartment airbag and has the disadvantage that on impact of the knees with the airbag, the airbag loses rigidity in the impact area. This is due to the gas flowing from the impact area to other parts of the airbag.

U.S. Pat. No. 6,092,836 also describes an airbag that moves a load distribution plate toward the occupant's knees. This patent points out that using known knee bolsters, the knees of an improperly seated occupant can slide off the knee bolster potentially increasing the tendency of the occupant to submarine under the instrument panel. It is important that the knee bolster capture the knees to prevent this problem, as is an object of the present invention.

Another problem pointed out by the '836 patent is the tendency, due to the point loading, for the knees in many airbag knee bolsters to penetrate too far into the bolster and therefore lose some of the energy absorbing effects. Thus, most knee bolsters use a load distribution plate for the contact point with the occupant's knees. This will also be addressed in the description of the invention below.

U.S. Pat. No. 6,170,871 describes an unworkable elastic film airbag as a knee bolster. The fact that an elastic film is used results in the air flowing from the point of contact to another unloaded section which then expands as a balloon. There is also a danger that if punctured, the '871 knee bolster will pop as a balloon since it will not exhibit blunting as described below. One properly designed film knee bolster, as disclosed below, makes use of a laminated film material including a layer of a high modulus of elasticity film with one or more layers of film having a low elastic modulus. The combination does not expand as a balloon as in the case of the '871 patent and thus its shape is accurately controlled. Also, if it should get punctured, the hole or tear does not propagate.

U.S. Pat. No. 6,336,653 (Yaniv et al.) describes an inflatable tubular bolster that is meant to reduce leg and knee injuries and prevent the occupant from submarining under the instrument panel. This design suffers from the tendency of the occupant's knees to slide off of the bolster if the accident is from an angle or if the occupant is not properly seated.

US20020149187 (Holtz et al.) describes a soft knee bolster which is basically composed of cells of fabric airbag material positioned in front of a load distribution plate. The knee bolster of the present invention also provides for a soft knee bolster but usually does not require a special load distribution or reaction plate. This patent application correctly points out that, it would advance the art to provide a soft-surface inflatable knee bolster airbag system which prevents submarining while providing a soft surface for contacting a vehicle occupant's legs and knees. It would be another advancement in the art to provide a soft-surface inflatable knee bolster airbag system which functions even though the occupant's legs and knees are "out-of-position". A further advancement in the art would be to provide a soft-surface inflatable knee bolster airbag system which is compact, simple, and has fewer parts. The present invention provides these advancements in a novel and useful way. All of these advancements are available in the cellular bolster as first described in the current assignee's U.S. Pat. No. 5,505,485.

U.S. Pat. No. 6,685,217 describes a flat mattress like airbag, similar to those disclosed in assignee's prior patents, for use as a knee restraint.

1.5 Ceiling Deployed Airbags

U.S. Pat. No. 5,322,326 (Ohm) describes a small, limited protection airbag manufactured in Korea. Although not disclosed in the patent, it appears to use a plastic film airbag material made from polyurethane. It is a small airbag and does not meet U.S. standards for occupant protection (FMVSS-208). The film has a uniform thickness and if scaled to the size necessary for meeting U.S. standards, it would likely become of comparable thickness and weight as the current fabric airbags.

Of particular interest, FIG. 6 shows an airbag having a shape that conforms to the human body by forming a two-fold pocket bag. Junction points are provided such that after inflation, the head of a passenger is protected by an inflated part around the upper junction point while the upper part of the passenger is covered with the other inflated part around the middle junction points and a U-shaped junction line. In contrast to some pertinent inventions disclosed below, the junction points and lines do not enable the formation of an airbag having a plurality of substantially straight or elongate compartments, or even a multiplicity of cells, which can be deployed along the side of a vehicle in order to protect the occupant(s) from injury. Rather, the junction points and lines result in the formation of a limited-use airbag which will conform only to the human body, i.e., having a section for engaging the head and a section for engaging the upper body. Other applications of junction points and lines are not contemplated by Ohm.

1.5.1 Side Curtain Airbags

U.S. Pat. No. 5,439,247 describes a fabric hose and quilt-type airbag that is meant to protect front seat occupants in side impacts. The construction has a rectangular peripheral tube with an inner section formed by stitching the fabric together to form cells or tubes. Aside from the fact that this is made from fabric, there is no discussion as to how this airbag is supported during a crash and it appears likely that the bag will be pushed out the window by the head of the occupant. Although it is mentioned that the airbag can be deployed from either the door or the ceiling, it does not extend into the rear section of the vehicle passenger compartment. There appears to be no prior art side curtain airbags made from fabric that predate the disclosure in the current assignee's patents listed above. There also is no prior art for making a side curtain airbag from plastic film.

U.S. Pat. No. 6,457,745 (Heigl) describes how to achieve the effects of tethers without actually having them. In this case, loose threads are used as if they were a seam to permit the weaving of a fabric airbag and at the same time to achieve control over the shape of the resulting airbag. In particular, for side curtain airbags, it can be desirable to have a roughly uniform thickness across the entire front and rear seat span except where the seat back would interfere. However, to achieve this ideal would require many tethers since left to its own, the airbags would tend to form spherical-like chambers. As stated in the current assignee's patents on film airbags, this is by nature less of a problem with film since the tendency of inelastic film is to form ellipsoids rather than spheres which is the tendency of fabric. However, this is not the only advantage of film in this arena as will be seen below. Since sheets of plastic film can be easily manufactured in any thickness and since they can be easily joined using either heat or adhesive sealing, the opportunities for controlling film geometry greatly exceed that of fabric. Thus, by practicing the teachings of this invention, very substantial benefits accrue, as will be shown below.

1.5.2 Frontal Curtain Airbags

With the exception of U.S. Pat. No. 5,322,326 discussed above, there appears to be little if any other prior art on ceiling-mounted airbags for frontal crash protection and none whatsoever that extend so as to offer protection for multiple occupants.

1.5.3 Other Compartmentalized Airbags

U.S. Pat. No. 3,511,519 (Martin) describes a large fabric airbag which is shown impacting the occupant. It does not discuss the problem of injury to the occupants due to the impact of the airbag which would certainly be the case with this design.

U.S. Pat. No. 4,262,931 (Strasser) describes two airbags joined together to cover right and center seating positions. These airbags are not mounted on the vehicle ceiling.

U.S. Pat. No. 3,638,755 (Sack) describes a two-bag airbag combination, however, one bag is contained within the other.

U.S. Pat. No. 3,752,501 (Daniel) describes an inflatable cushion device for protective interposition between a vehicle operator and the rim and hub of a vehicle steering wheel assembly. The cushion is compartmented to provide, when inflated, peripheral ring compartmentation in juxtaposition to the steering wheel rim and center compartmentation in overlying juxtaposition to the steering wheel hub. The peripheral ring compartmentation, when pressurized, provides greater resistance to collapse than the center compartmentation, whereby the peripheral ring compartmentation is adapted to guide the vehicle operator upon contact of the latter with the cushion toward the center compartmentation thereby maintaining the vehicle operator in substantially centered cushioned relationship to the steering wheel assembly under vehicle impact conditions. This airbag contains two compartments; an outer, donut-shaped ring or torus, and an inner compartment of somewhat larger volume. This is an example of a bag within a bag where an outer bag is connected to an inner bag by flapper valves.

U.S. Pat. No. 4,227,717 (Bouvier) describes a method for protecting a motorcycle operator with a plurality of tubular plastic or fabric airbags. These tubes deploy upward from a housing mounted on the motorcycle.

1.6 Rear-of-Seat Mounted Airbags

There is little, if any, prior art for rear-of-seat mounted airbags of the type described herein.

1.7 Exterior Airbags

There is little, if any, prior art for exterior mounted airbags made from plastic film.

1.8 Variable Vent

U.S. Pat. No. 3,573,885 (Brawn) describes a blowout patch assembly but not variable exhaust orifices.

U.S. Pat. No. 3,820,814 (Allgaier) describes variable exhaust vents located within the fabric airbag material.

U.S. Pat. No. 3,888,504 (Bonn) describes an inflatable occupant restraint airbag which is comprised at least in part of a woven stretch fabric which is permeable to fluid used to inflate the bag, the bag having a variable porosity which increases and decreases in relation to the fluid pressure within the bag.

U.S. Pat. No. 4,394,033 (Goetz) describes a temperature compensation system. The inflatable occupant-restraint system in a vehicle includes a generator for producing fluid under pressure placed such that a portion of the generator is outside the cushion and has a resilient venting structure for dumping increasing fractions of gas volume outside the cushion at increasing operating temperatures.

U.S. Pat. No. 4,805,930 (Takada) describes another temperature compensation system. Further, it describes stitched thread seams between fabric elements of the envelope of a vehicle safety airbag which induce localized distension and opening up of the envelope fabrics along the seams, thereby causing the film coatings of the envelope fabric to rupture along the seam and allow gas to escape and maintain a substantially constant overall maximum pressure, regardless of variations in ambient temperature.

U.S. Pat. No. 3,675,942 (Huber) describes a unidirectional valve which permits air to enter the bag, but prevents its escape in the event the pressure within the bag exceeds that of the atmosphere within the vehicle, such as by the impact of a person with the bag.

U.S. Pat. No. 4,964,652 (Karlow) describes a system for venting excessively high pressure gas incident to deployment of an airbag including a diaphragm that is rupturable upon the occurrence of a threshold pressure internally of the airbag to instantaneously release the pressure. This is a pressure relief system through the center of the module.

1.8.1 Discharge Valves for Airbags

Prior art valves for possible use with airbags includes those described in U.S. Pat. No. 4,719,943 (Perach), and U.S. Pat. No. 5,855,228 (Perach).

Also, U.S. Pat. No. 5,653,464 (Breed et al.) discloses a variable vent hole for an airbag (FIGS. 7 and 7A). The variable vent is formed in a seam of the airbag and includes a hinged elastic member biased so that it tends to maintain the vent in a closed position. As pressure rises in the airbag, the vent is forced open. The vent contains an opening formed between a film layer of the airbag and a reinforcement member. The film layer is also sealed to the reinforcing member Flow of gas out of an airbag may be controlled during inflation and deflation of the airbag based on the morphology of the occupant for whom deployment of the airbag will be effective as disclosed in U.S. Pat. No. 5,822,707 (Breed et al.). This patent, as well as others assigned to the current assignee, further describes that gas outflow may also be controlled based on other properties of the occupant to be protected by the deploying airbag including but not limited to the occupant's position, identification and/or type.

1.9 Airbags with a Barrier Coating

Barrier coatings which prevent, or reduce, contact of a selected substrate with a gas, vapor, chemical and/or aroma have been widely described. A recent improvement in barrier coatings is described in U.S. Pat. No. 6,087,016 and U.S. Pat. No. 6,232,389.

To date, barrier coatings have not been commercially applied in airbags made of fabric and in particular side curtain airbags made of fabric which is often permeable. It would thus be desirable to improve the impermeability of the fabric of the airbags.

In contrast to frontal impact driver and passenger airbags which only are required to retain the inflation gas or other fluid for typically a fraction of a second, the side curtain airbag must retain the inflation fluid for several seconds in order to offer protection for rollover events, for example. Also, the side curtain or ceiling-mounted airbag must deploy rapidly and pack into a small space.

It is disadvantageous that current polymer coatings used on such airbags are relatively thick thereby increasing the mass of the airbag making it difficult to pack into a ceiling space and delay the deployment of the airbag in an accident, thereby increasing the chance that an occupant will not receive the full benefit of the airbag. As a result of these disadvantages, such coatings are not optimal for use on side curtain airbags.

Much of the leakage in side curtain airbags occurs through the seams where the front and rear panels forming the side curtain airbag are joined. This is due to the methods of joining such panels which include sewing and interweaving. Thus, although the barrier coatings of this invention will reduce the leakage through the panel surfaces, and reduce the cost and mass of the airbag, alternative treatments for the seam area are also desirable as described and disclosed herein.

2. DEFINITIONS

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The object can also be a vehicle with an accelerometer that generates a signal based on the deceleration of the vehicle. Such a system might determine only that the object is or is not a member of one specified class (e.g., airbag-required crashes), or it might attempt to assign the object to one of a larger set of specified classes, or find that it is not a member of any of the classes in the set. One such class might consist of vehicles undergoing a crash of a certain severity into a pole. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines or a neural computer.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identity of that object. A number of different objects, optionally in different positions, are tested to obtain the unique patterns from each object. As such, the algorithm is generated, and stored in a computer processor, and which can later be applied to provide the identity of an object based on the wave pattern, for example, received during use by a receiver connected to the processor and other information. For the purposes here, the identity of an object sometimes applies to not only the object itself but also to its location and/or orientation in the passenger compartment. For example, a rear-facing child seat is a different object than a forward-facing child seat and an out-of-position adult can be a different object than a normally-seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to some of the inventions disclosed herein. In the above-cited prior art, except the current assignee's, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A "pattern recognition algorithm" will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized. The class may also be one containing all frontal impact airbag-desired crashes into a pole at 20 mph, one containing all events where the airbag is not required, or one containing all events requiring a triggering of both stages of a dual stage gas generator with a 15 millisecond delay between the triggering of the first and second stages.

To "ascertain the identity of" as used herein with reference to an object will generally mean to determine the type or nature of the object (obtain information as to what the object is), i.e., that the object is an adult, an occupied rear-facing child seat, an occupied front-facing child seat, an unoccupied rear-facing child seat, an unoccupied front-facing child seat, a child, a dog, a bag of groceries, a car, a truck, a tree, a pedestrian, a deer etc.

An "object" in a vehicle or an "occupying item" of a seat may be a living occupant such as a human or a dog, another living organism such as a plant, or an inanimate object such as a box or bag of groceries or an empty child seat.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "optical image" will generally mean any type of image obtained using electromagnetic radiation including visual, infrared, terahertz and radar radiation.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Out-of-position" as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance such as about 5 inches from the deployment door of the airbag module. The actual distance where airbag deployment should be suppressed depends on the design of the airbag module and is typically farther for the passenger airbag than for the driver airbag.

"Transducer" or "transceiver" as used herein will generally mean the combination of a transmitter and a receiver. In some cases, the same device will serve both as the transmitter and receiver while in others, two separate devices adjacent to each other will be used. In some cases, a transmitter is not used and in such cases, transducer will mean only a receiver. Transducers include, for example, capacitive, inductive, ultrasonic, electromagnetic (antenna, CCD, CMOS arrays), electric field, weight measuring or sensing devices. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases, a pair of such plates or antennas will comprise a transducer as determined by the context in which the term is used.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks or other processing units as most broadly defined that are either connected together or that analyze all or a portion of the input data. Typically, it is a system wherein the data to be processed is separated into discrete values which are then operated on and combined in at least a two stage process and where the operation performed on the data at each stage is, in general, different for each discrete value and where the operation performed is at least determined through a training process. It includes ensemble, modular, cellular neural networks, among others, and support vector machines and combination neural networks.

A "neural computer" is a computer designed to efficiently execute one or more neural networks primarily in hardware. Thus, it is typically much faster than a microprocessor running a neural network algorithm.

A "sensor" as used herein is generally a combination of two transducers (a transmitter and a receiver) or one transducer which can both transmit and receive. In some cases it may refer to a single receiver such as a temperature sensor or passive infrared sensor.

The "headliner" is the trim which provides the interior surface to the roof of the vehicle.

A "sensor system" includes any of the sensors listed above in the definition of "sensor" as well as any type of component or assembly of components that detect, sense or measure something.

An "occupant protection system" or "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle.

An "occupant restraint device" includes any type of device that is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, nets, knee bolsters, side curtain airbags, externally deployable airbags and the like.

A diagnosis of the "state of the vehicle" means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

A "part" of the vehicle includes any component, sensor, system or subsystem of the vehicle such as the steering system, braking system, throttle system, navigation system, airbag system, seatbelt retractor, airbag inflation valve, airbag inflation controller and airbag vent valve, as well as those listed below in the definitions of "component" and "sensor".

The crush sensing zone is that portion of the vehicle that has crushed at the time that the crash sensor must trigger deployment of the restraint system.

The term "airbag" is often used to mean all deployable passive passenger protective devices including airbags, seatbelts with pretensioners and deployable nets.

The "A-pillar" of a vehicle and specifically of an automobile is defined as the first roof supporting pillar from the front of the vehicle and usually supports the front door. It is also known as the hinge pillar.

The "B-Pillar" is the next roof support pillar rearward from the A-Pillar.

The "C-Pillar" is the final roof support usually at or behind the rear seats.

The term "squib" represents the entire class of electrically initiated pyrotechnic devices capable of releasing sufficient energy to cause a vehicle window to break. It is also used to represent the mechanism which starts the burning of an initiator which in turn ignites the propellant within an inflator. Squib generally refers to electrical initiation while primer is usually used for mechanical initiation however; these terms are frequently used interchangeably and thus either will mean the device that initiates airbag deployment whether by electrical or mechanical means.

The term "airbag module" generally connotes a unit having at least one airbag, a gas generator for producing a gas, an attachment or coupling structure for attaching the airbag(s) to and in fluid communication with the gas generator so that gas is directed from the gas generator into the airbag(s) to inflate the same, an initiator for initiating the gas generator in response to a crash of the vehicle for which deployment of the airbag is desired and structure for attaching or connecting the unit to the vehicle in a position in which the deploying airbag(s) will be effective in the passenger compartment of the vehicle. In the instant invention, the airbag module may also include occupant sensing components, diagnostic and power supply electronics and componentry which are either within or proximate to the module housing.

The term "occupant protection device" as used herein generally includes any type of device which is deployable in the event of a crash involving the vehicle for the purpose of protecting an occupant from the effects of the crash and/or minimizing the potential injury to the occupant. Occupant protection devices thus include frontal airbags, side airbags, seatbelt tensioners, knee bolsters, side curtain airbags, deployable nets, externally deployable airbags and the like.

A "composite airbag" is any airbag comprised of a film and a fabric, two or more films, a film and a net or other combination of two or more materials or layers such that each material contributes to the structural or tear properties of the composite. This is in contrast to the combinations of a film and fabric used previously in neoprene or silicone coated fabric airbags in that, in the prior art cases, the coating does not materially effect either the elastic modulus, stiffness, strength or tear resistance of the airbag where in the case of the composite airbag disclosed herein, the film contributes significantly to one or more of these properties. Note that the two or more layers may or may not be joined together including cases where the layers are joined during an extrusion processing step such as in co-extrusion, by a casting process, progressive coating process, or where a film layer is combined with another reinforcing material such as fibers or a woven or molded net in addition to the most common method of joining layers by adhesive.

The following definitions related to coatings are generally taken from U.S. Pat. No. 6,087,016 and U.S. Pat. No. 6,232, 389. As used herein, the term "mixture" or "coating mixture" is interpreted to include true liquid solutions, as well as colloidal dispersions, suspensions, emulsions and latexes as they are conventionally defined. For example, by "colloidal dispersion or latex", it is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid.

A "barrier coating mixture" as used herein means a liquid containing dissolved or suspended solids, which is used to apply the solids to a substrate. A novel aspect of one of the present inventions is that the barrier coating mixtures provide a better dispersion of platelet fillers in liquid at an unusually low solids content, e.g., between about 1% to about 30% solids as described in more detail below. According to this invention, once the "coating mixture" is dried, it is referred to as a "dried coating" or a "film". The term "vapor barrier" implies a barrier to a liquid and its vapor. Conventionally, a vapor is the gas in equilibrium with a liquid at atmospheric pressure. For simplicity, as used herein, the term "vapor barrier" can be interpreted to mean a barrier to gases and chemicals as well as traditionally defined vapors, as well as a barrier to moisture, generally water or water vapor.

The term "gas barrier" includes a barrier to oxygen, nitrogen, carbon dioxide and other gases. The term "chemical barrier" includes a barrier to the migration or blooming of a molecule from one substrate to another or out of one substrate to that substrate's surface.

The term "aspect ratio" is a characteristic of every platelet material in solid form. Aspect ratio is a lateral dimension of a platelet filler particle, e.g., mica flake, divided by the thickness of the platelet. The term "high aspect ratio" refers to a platelet filler whose lateral dimension divided by thickness is greater than 25. The aspect ratio of any filler is an inherent property of the selected filler. For example, MICROLITE® 963++ aqueous vermiculite solution [W. R. Grace] has a characteristic aspect ratio of about 10,000 or dimensions of 10-30 µm×10 Å.

Intercalation is defined as the state of a coating composition in which polymer is present between each layer of a platelet filler. Intercalation can be defined by the detection of an X-ray line, indicating a larger spacing between vermiculite layers than in the original mineral. The term "exfoliation" is defined for layered fillers as the complete separation of individual layers of the original particle, so that polymer completely surrounds each particle. Preferably, so much polymer is present between each platelet, that the platelets are randomly spaced. No X-ray line appears because of the random spacing of exfoliated platelets. In some circumstances, the filler can exfoliate when dispersed in an aqueous or non-aqueous medium. This would result in a higher aspect ratio than that of a solid particle before dispersion.

The term "effective aspect ratio" relates to the behavior of the platelet filler when incorporated into a binder. The platelet may not exist in a single platelet formation, but in many forms, such as a bundle of 10-50 platelets or hundreds of platelets, referred to as agglomerates. If the platelets are not in the single layer form, the aspect ratio of the entire bundle or agglomerate is much lower than that of the single layer particle. Therefore, the aspect ratio of the particles in a binder is referred to as an effective aspect ratio. The effective aspect ratio is determined by plotting the experimental data versus theoretical model, such as described by E. L. Cussler et al, J. Membrane Sci., 38: 161-174 (1988). A graph of reduction in permeability versus the volume % of filler in the binder generates theoretical curves for each effective aspect ratio. The graph predicts an effective aspect ratio for the experimental data (see FIG. 43).

It is important in the understanding of the effects of the coatings of this invention to differentiate between "effective aspect ratio" and "aspect ratio". The aspect ratio is characteristic of a platelet material in the solid form or one platelet and can be determined by light scattering techniques or microscopy. The term "effective aspect ratio" is much different in that it relates to the behavior of the platelet when incorporated into a binder. It may no longer be a single platelet but instead bundles of platelets referred to as agglomerates. This value is determined using experimental permeability data plotted versus theoretical behavior of the platelet. For example, experimental data when plotted versus the theoretical model of the platelet in the binder [see E. L. Cussler et al, J. Membrane S., 38:161-174 (1988)] is directly related to the barrier improvement of the coating through Cussler's theoretical model. Most commercially available fillers have aspect ratios ranging from 25 up to 10,000. However, the effective aspect ratio of these fillers is much lower when incorporated into a binder and is directly related to the barrier improvement due to the platelet filler, generally resulting in reduced barrier properties. It is important to distinguish between these terms for barrier coatings containing platelet fillers.

Much of the disclosure herein involving particular barrier coatings is based on U.S. Pat. No. 6,087,016 and U.S. Pat. No. 6,232,389. However, the invention is not limited to airbags including the barrier coatings described in these patents and encompasses airbags including any comparable barrier coatings and any barrier coatings encompassed by the claims.

Preferred embodiments of the invention are described below and unless specifically noted, it is the applicant's intention that the words and phrases in the specification and claims be given the ordinary and accustomed meaning to those of ordinary skill in the applicable art(s). If applicant intends any other meaning, he will specifically state he is applying a special meaning to a word or phrase.

Likewise, applicant's use of the word "function" here is not intended to indicate that the applicant seeks to invoke the special provisions of 35 U.S.C. §112, sixth paragraph, to define his invention. To the contrary, if applicant wishes to invoke the provisions of 35 U.S.C. §112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

OBJECTS AND SUMMARY OF THE INVENTION

It is an object of the present invention to provide a system for substantially filling a passenger compartment of a vehicle with airbags to protect an occupant during a crash involving the vehicle. Other possible objects are set forth in the parent applications.

In order to achieve this object, an airbag deployment system for a vehicle having a passenger compartment in accordance with the invention includes a plurality of airbags arranged to substantially fill the passenger compartment upon deployment, an inflator system for inflating the airbags and a crash sensor system coupled to the inflator system for directing the inflator system to inflate the airbag. Multiple housings may be arranged around the passenger compartment, each including at least one airbag. Some of the airbags may be interconnected to provide a primary airbag and at least one secondary airbag extending from the primary airbag. The inflator system may be an aspirated inflator system. The crash sensor system may be an anticipatory sensor system. The airbags may be film airbags. One-way valves may be arranged between adjacent airbags.

Further, one embodiment of an airbag for a vehicle in accordance with the invention includes at least one section of material defining a plurality of cells, chambers or compartments, and one-way valves arranged in connection with the material section(s) between the cells to control flow of inflating fluid between the cells. Each valve can lead from a respective first cell to a respective second cell and are preferably designed to close once a predetermined pressure prevails in the second cell to prevent fluid outflow from the respective second cell.

The cells may be interconnected such that at least one cell is interposed between and connected to two other cells. A plurality of valves may be arranged between adjacent pairs of the cells, or only a single valve may be arranged between an adjacent pair of cells.

In some embodiments, only one cell is in direct communication with a source of inflating fluid. In this case, if this single cell is a common distribution manifold, a plurality of cells are directly connected to it via one-way valves. This provides a distribution from the single common cell directly to a plurality of other cells, which may not be connected in turn to other cells via one-way valves. On the other hand, each other cell may be connected to yet another cell to provide one or more series of linked cells, each series having three or more cells and originating from the common cell.

An envelope can surround the cells and may be made of, for example, film.

In one operational embodiment of a vehicle including such an airbag, the vehicle includes an instrument panel and a front seat on which an occupant sits opposite the instrument panel. The airbag has a storage position in connection with the instrument panel and a deployed position extending outward from the instrument panel. An inflator inflates the airbag from the storage position to the deployed position. When in the deployed position, the airbag is arranged in a space between the knees of the occupant when seated on the front seat and the instrument panel.

Another operational embodiment includes a headliner or ceiling and a seat on which an occupant sits below the headliner or ceiling. The airbag has a storage position in connection with the headliner or ceiling and a deployed position extending outward from the headliner or ceiling. An inflator inflates the airbag from the storage position to the deployed position. When in the deployed position, the airbag is arranged in a space between the occupant when seated on the seat and a side of the vehicle.

An airbag system in accordance with the invention includes an inflatable airbag having a plurality of interconnected chambers (cells or compartments) and arranged to engage part of a vehicle occupant upon inflation, and an inflator arranged to direct inflating fluid directly into only a portion of the chambers of the airbag. The airbag included a plurality of one-way valves arranged between adjacent chambers to control flow of inflating fluid from the inflator to all of the chambers to thereby enable the airbag to be inflated. The chambers are interconnected such that at least one chamber is interposed between and connected to two other chambers. Variations to the airbag system include the variations discussed above. Also, the chambers may include a row of primary airbag chambers and at least one secondary airbag chamber extending from each primary airbag chamber.

A motor vehicle in accordance with the invention includes a frame including a headliner or ceiling and instrument panel, an airbag device mounted to the frame and comprising an inflator for providing inflating fluid upon actuation thereof and a compartmentalized airbag having a plurality of compartments (cells or chambers) in communication with the inflator, and a mounting mechanism for mounting the airbag device to the frame such that the airbag, when inflated, is present in a space between the frame and part of an occupant situated in a seat of the vehicle. The airbag includes one-way valves arranged between the compartments to control flow of inflating fluid between the compartments. The compartments may include a row of primary airbag compartments and at least one secondary airbag compartment extending from each primary airbag compartment.

Inflation of the airbag is caused by a determination by a crash sensor system of an actual or expected crash involving the vehicle and may include an anticipatory crash sensor which forecasts a crash between the vehicle and another object prior to impact of the vehicle by the other object. In this manner, the airbag is inflated prior to the crash.

Various constructions of the airbag are possible, some of which are mentioned above. In one construction, the airbag includes at least two pieces of substantially flat inelastic plastic film having peripheral edges, one of which has an inlet port for inflow of inflating fluid, and the pieces of inelastic plastic film are attached together at least at peripheral edges to form a substantially sealed airbag. The airbag may have interconnected chambers formed by attaching the pieces of inelastic plastic film together. In another construction, the airbag includes inelastic plastic film, an inlet port for inflow of inflating fluid and a variable outlet vent which is designed to open variably in response to pressure in the airbag. In another construction, the airbag includes a single piece of inelastic plastic film having an inlet port for inflow of inflating fluid. In yet another construction, the airbag includes an outer airbag made of at least one layer of plastic film and an inner airbag made of at least one layer of plastic film and arranged to fill an interior volume of the outer airbag when inflated.

In still another embodiment, the airbag includes a first sheet of film and a member arranged in connection therewith for arresting the propagation of a tear therein. The member may be (a) a network of multi-directional material strips; (b) a second sheet of film having substantially anisotropic tear properties with the direction of tear resistance thereof being different than a direction of tear resistance of the first sheet of film; and (c) a thermoplastic elastomeric material arranged at specific locations such that the locations are thicker in comparison to an average thickness of the first sheet of film.

In still another embodiment, the airbag includes a composite airbag having at least one layer of inelastic plastic film attached to a layer of a more elastic plastic film, the second layer serving to blunt the propagation of a tear.

In another embodiment, the airbag includes a plurality of material sections defining a plurality of interconnected cells. In yet another embodiment, a net surrounds the airbag during and after deployment of the airbag.

The inflator may include a gas generator for producing pressurized gas to inflate the airbag and an aspiration system which combines gas from the passenger compartment of the vehicle with pressurized gas from the gas generator and directs the combined flow of gas into the airbag.

A knee bolster airbag system for protecting the knees of an occupant of a vehicle includes an airbag having a plurality of cells, an inflator arranged to inflate the airbag and a housing for storing the airbag, the housing being mounted in the vehicle in a position in which the airbag engages lower extremities of the occupant upon inflation. Preferably, the airbag is dimensioned to occupy a space between the occupant's legs and structural components of an instrument panel of the vehicle when inflated.

Another knee bolster airbag system for a vehicle includes an airbag having a plurality of chambers and an inflator arranged to inflate the airbag such that the airbag engages the lower extremities of a vehicle occupant upon inflation and distributes impact force imposed by the lower extremities over the chambers. The airbag provides a soft surface adapted to engage the lower extremities of an occupant. Optionally, the airbag is arranged such that when inflated, it occupies a space between the occupant's legs and the vehicle instrument panel such that the instrument panel provides support for the airbag. In one embodiment, the inflator is arranged to direct gas directly into only a portion of the chambers and the airbag includes a plurality of one-way valves arranged between adjacent chambers to enable flow of gas from the inflator to all of the chambers.

Another vehicle equipped with a knee bolster airbag system in accordance with the invention includes a compartmentalized airbag knee bolster device mounted to the instrument panel and including an inflator for providing pressurized gas upon actuation thereof and a compartmentalized airbag having a plurality of compartments in communication with the inflator. The compartmentalized airbag knee bolster device is mounted to the instrument panel such that the compartmentalized airbag substantially occupies a space between the instrument panel and the knees or lower extremities of an occupant situated in front of the instrument panel when inflated. The compartmentalized airbag may include a plurality of material sections defining a plurality of compartments and one-way valves arranged in the material sections between the compartments to control flow of inflating fluid between the compartments. Each compartment can have a width approximately equal to or less than the width of a knee of an occupant of the motor vehicle.

An inflatable tubular bolster for a vehicle in accordance with the invention includes an inflatable airbag having a plurality of cells, a gas generator fluidly connected to the airbag via a gas conduit and a crash sensor connected to the gas generator for detecting an impact involving the vehicle. When an impact is detected by the crash sensor, the gas generator causes the cells to be inflated and the airbag deploys from a stowed position downward and rearward into a position below an instrument panel of the vehicle such that it restrains forward and downward movement of an occupant situated in front of the instrument panel. The airbag may be arranged to deploy in front of an occupant's knees and thereby inhibits forward and downward movement of the occupant.

A system for protecting occupants of a vehicle during a crash involving the vehicle in accordance with the invention includes a plurality of inflators for generating pressurized gas, a crash sensor system for controlling the inflators to begin generating pressurized gas based on a crash involving the vehicle, a plurality of primary airbags each directly connected to a respective inflator and receiving pressurized gas directly from the respective inflator and at least one secondary airbag in flow communication with each primary airbag such that inflation of the primary airbag by the respective inflator causes inflation of the secondary airbag(s). This resembles a chain reaction of inflating airbags which progresses from an airbag closest to the vehicle structure inward until contact is made by a secondary airbag with the occupant. Thus, when a plurality of secondary airbags are present and distanced sequentially from the primary airbag, gas from the primary airbag passes into a first one of the secondary airbags and from the first secondary airbag to a second one of the secondary airbags and so on. The secondary airbags may include a one-way valve which enables flow of gas from each secondary airbag to an adjoining downstream secondary airbag. Each primary airbag may also include a one-way valve which enable flow of gas from the primary airbag to an adjoining secondary airbag.

In one particular embodiment, the crash system includes an anticipatory crash sensor arranged to determine whether a crash involving the vehicle is about to occur and to direct the inflators to generate gas prior to the crash such that the primary airbags and the secondary airbag(s) are inflated prior to the crash. In this manner, substantially the entire unoccupied interior space of the passenger compartment can be filled with airbags to cushion any occupants in a crash.

Each inflator may include a gas generator for producing pressurized gas to inflate a respective primary airbag and an aspiration system for combining gas from the passenger compartment of the vehicle with pressurized gas from the gas generator and directing the combined flow of gas into the respective primary airbag.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the invention and are not meant to limit the scope of the invention as encompassed by the claims.

FIG. 1 is a perspective view with portions cut away and removed of a film airbag wherein the film is comprised of at least two layers of material which have been joined together by a process such as co-extrusion or successive casting or coating.

FIG. 1A is an enlarged view of the inner film airbag layer and outer film airbag layer taken within circle 1A of FIG. 1.

FIG. 1B is an enlarged view of the material of the inner film airbag and outer film airbag taken within circle 1A of FIG. 1 but showing an alternate configuration where the outer airbag layer has been replaced by a net.

FIG. 1C is an enlarged view of the material of the inner film airbag layer and outer film airbag layer taken within circle 1A of FIG. 1 but showing an alternate configuration where fibers of an elastomer are incorporated into an adhesive layer between the two film layers.

FIG. 1D is a perspective view with portions cut away of a vehicle showing the driver airbag of FIG. 1 mounted on the steering wheel and inflated.

FIG. 2 illustrates a section of a seam area of an airbag showing the deformation of the elastic sealing film layer.

FIG. 3 is a partial cutaway perspective view of a driver side airbag made from plastic film.

FIG. 6 shows a deployed airbag, supported on the steering wheel of a vehicle with a steep steering column, in contact with an occupant.

FIG. 7 shows an inflated airbag and a steering wheel, self-aligned with an occupant.

FIG. 8 shows a driver side airbag module supported by a steering column, but not attached to the steering wheel.

FIG. 9 illustrates an inflated driver side airbag installed on the dashboard of a vehicle.

FIG. 10 shows an airbag system installed on the dashboard of a vehicle with a vent hole to the engine compartment.

FIGS. 11A and 11B show a tubular inflatable system mounted on the dashboard of a vehicle.

FIG. 12 is a partial cutaway perspective view of a passenger side airbag made from plastic film.

FIG. 13 is a perspective view with portions cut away of a vehicle showing the knee bolster airbag or restraint in an inflated condition mounted to provide protection for front-seated occupants.

FIG. 14 is a perspective view of an airbag and inflator system where the airbag is formed from tubes.

FIG. 15 is a perspective view with portions removed of a vehicle having several deployed film airbags.

FIG. 16 is a view of another preferred embodiment of the invention shown mounted in a manner to provide protection for a front and a rear seat occupant in side impact collisions and to provide protection against impacts to the roof support pillars in angular frontal impacts.

FIG. 16A is a view of the side airbag of FIG. 9 of the side airbag with the airbag removed from the vehicle.

FIG. 17 is a partial view of the interior driver area of a vehicle showing a self-contained airbag module containing the film airbag of this invention in combination with a stored gas inflator.

FIG. 18 is a view looking toward the rear of the airbag module of FIG. 17 with the vehicle removed taken at 18-18 of FIG. 17.

FIG. 18A is a cross sectional view of the airbag module of FIG. 18 taken at 18A-18A.

FIG. 18B is a cross sectional view, with portions cutaway and removed, of the airbag module of FIG. 18 taken at 18B-18B.

FIG. 18C is a cross sectional view of the airbag module of FIG. 18 taken at 18C-18C.

FIG. 18D is a cross sectional view of the airbag module of FIG. 18A taken at 18D-18D.

FIG. 19 is a perspective view of another preferred embodiment of the invention shown mounted in a manner to provide protection for a front and a rear seat occupant in side impact collisions, to provide protection against impacts to the roof support pillars in angular frontal impacts and to offer some additional protection against ejection of the occupant or portions of the occupant.

FIG. 20 is a side view of the interior of a motor vehicle provided with another form of safety device in accordance with the invention, before the safety device moves to the operative state.

FIG. 23A is a top view of the airbag arrangement of FIG. 23 taken along line 23A-23A.

FIG. 33 is a sketch of a first embodiment of a valve in accordance with the invention.

FIG. 33A is an enlarged view of the portion designated 33A in FIG. 33.

FIG. 33B is an alternative actuating device for the embodiment shown in FIG. 33A.

FIG. 34 is a sketch of a second embodiment of a valve in accordance with the invention.

FIG. 34A is a top view of the embodiment shown in FIG. 34.

FIG. 34B is an enlarged view of the portion designated 34B in FIG. 34A.

FIG. 35 is a sketch of a third embodiment of a valve in accordance with the invention.

FIG. 35A is an enlarged view of the portion designated 35A in FIG. 35.

FIG. 36 is a sketch of a fourth embodiment of a valve in accordance with the invention.

FIG. 36A is a partial cross-sectional view of the embodiment shown in FIG. 36.

FIG. 36B is a top view of the embodiment shown in FIG. 36.

FIG. 37 is a sketch of a fifth embodiment of a valve in accordance with the invention.

FIG. 37A is a partial cross-sectional view of the embodiment shown in FIG. 37.

FIG. 37B is a top view of the embodiment shown in FIG. 37.

FIG. 38 is a sketch of a sixth embodiment of a valve in accordance with the invention.

FIG. 38A is a partial cross-sectional view of the embodiment shown in FIG. 38.

FIG. 38B is a top view of the embodiment shown in FIG. 38.

FIG. 39 is a sketch of a seventh embodiment of a valve in accordance with the invention.

FIG. 39A is a partial cross-sectional view of the embodiment shown in FIG. 39.

FIG. 39B is a top view of the embodiment shown in FIG. 39.

FIGS. 40A and 40B are sketches of variations of a valve in accordance with the invention showing the use of a cylinder valve.

DETAILED DESCRIPTION OF PREFERRED EMBODIMENTS

1. Airbags

1.1 Plastic Film Airbags

Figure 4A:
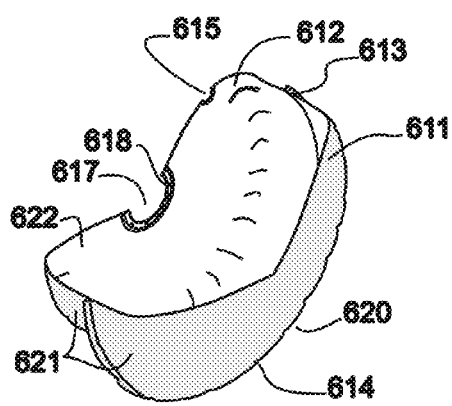
FIG. 4A is a partial cutaway perspective view of an inflated driver side airbag made from plastic film and a fabric to produce a hybrid airbag.

A fundamental problem with the use of plastic films for airbags is that when a single conventional plastic film is used and a tear is (inadvertently) introduced into the film, the tear typically propagates easily and the airbag fails catastrophically upon deployment. As noted above, this invention is concerned with various methods of eliminating this problem and thus permitting the use of films for airbags with the resulting substantial cost and space savings as well as a significant reduction in injuries to occupants. The reduction in occupant injury arises from the fact that the film is much lighter than fabric in a conventional airbag and it is the mass of the airbag traveling at a high velocity which typically injures the out-of-position occupant. Also, since the packaged airbag is considerably smaller than conventional airbags, the module is also smaller and the total force exerted on the occupant by the opening of the deployment door is also smaller further reducing the injuries to severely out-of-position occupants caused by the initial stages of the airbag deployment. Finally, in some preferred implementations of this invention, the airbag is mounted onto the ceiling of the vehicle making it very difficult for an occupant to get into a position as to be injured by the opening of the deployment door. Ceiling mounting of conventional fabric airbags is less practical due their excessive size. Ceiling mounting of full protection film airbags, on the other hand, is practical based on the use of the materials and, the reinforcements disclosed here.

One method of solving the tear problem is to use two film airbags or two airbag layers, one inside the other, where the airbags or layers are attached to each other with an adhesive which is strong enough to hold the two airbags or layers closely together but not sufficiently strong to permit a tear in one airbag or layer to propagate to the other. If a tear is initiated in the outer airbag or layer, for example, and the material cannot support significant tensile stresses in the material close to the tear, the inner airbag or layer must accommodate the increased tensile stress until it can be transferred to the outer layer at some distance from the tear. If the tear is caused by a small hole, this increased stress in the inner bag may only occur for a few hole diameters away from the hole. If the inner airbag is also made from an elastomer and the outer airbag layer is made from a less elastic material, the outer material can cause the airbag to take on a particular, desired shape and the inner airbag is used to provide the tear resistance.

In a preferred embodiment, five layers make up the film that is used to construct the airbag. The inner layer is a high tensile strength plastic such as NYLON® and the two outer layers are elastomeric and also capable of being heat sealed together. The three layers are joined together using an adhesive layer between each adjacent pair of layers resulting in a total of five layers. In addition to blunting the propagation of a crack, the elastomeric layers allow the airbag to be formed by heat sealing the elastic layers together. Additional layers can be added if particular properties are desired. Additional layers may also be used at particular locations where added strength is desired, such as at the seams. Although five layers are described, a preferred embodiment is to use three layers by eliminating one elastic and one adhesive layer. Also, in many cases, the elastic and inelastic layers can be thermally bonded together eliminating the need for the adhesive layer.

The problem which arises with a two airbag system with one airbag inside of and attached to the other, when both film layers have high elastic moduli and the cause of the tear in one airbag also causes a tear in the second airbag, is solved if one of the materials used for the two airbags has a low modulus of elasticity, such a thermoplastic elastomer. In this case, even though a tear starts in both airbags at the same time and place, the tear will not propagate in the thermoplastic elastomer and thus it will also be arrested in the high modulus material a short distance from the tear initiation point.

An example of a two layer airbag construction is illustrated in FIG. 1 which is a perspective view with portions cut away and removed of a film airbag made from two layers or sheets of plastic film material, which are preferably substantially coextensive with one another. Frequently, a third adhesive layer is used if the first and second layers cannot be joined together.

Some of the constructions discussed below contain various materials for reinforcing films. Although not yet available, a promising product for this purpose is carbon nanotubes. These materials are 100 times stronger than steel and have one sixth the weight. Such nanotubes have been demonstrated at Rice University, The University of Texas and Trinity College in Dublin, Ireland.

The phenomenon of crack blunting is discussed in some detail in C.-Y. Hui, A. Jagota, S. J. Bennison and J. D. Londono "Crack blunting and the strength of soft elastic solids", Proc. R. Soc. London, A (2003) 459, 1489-1516. The invention herein makes use of crack blunting to arrest the propagation of a crack (or tear) by the use of elastic layers on one or both sides of the more rigid film, typically NYLON®. The NYLON® prevents the stretching of the elastic films and the elastic films serve to both seal the pieces of plastic film to make an airbag and to blunt the propagation of cracks or tears.

As discussed above and elsewhere herein, the combination of two layers of film wherein one layer comprises a high tensile strength material, such as biaxially oriented Nylon®, and the other generally thicker layer comprises an elastic material, such as polyurethane or a thermoplastic elastomer, not only provides the high strength plus blunting property but also permits the stress concentrations in the seams to be substantially reduced. This is illustrated in FIG. 2 where 590 illustrates an airbag including a high tensile strength layer 590 of NYLON®, for example, 591 an elastic layer of polyurethane, for example, and the joint 592 illustrates the expansion of the elastic layer 591 signifying the redistribution of the stresses in the joint 592. This stress distribution takes place both along the seam (i.e., into the plane of the drawing) and into the joint 592 (i.e., from right to left in the drawing). By this process, the maximum stress can be moved from the joint 592 to the material away from the joint 592 where the strength of the high tensile strength material in layer 590 limits the pressure that the airbag can withstand. By thereby reducing or eliminating the stress concentrations in the joints 592 and/or seams, the thickness and thus the weight of the material making up the airbag is reduced. This permits an airbag to be constructed with interconnected compartments formed by joining portions of sheet material together, e.g., by heat sealing or vulcanization, to form the desired shape for occupant protection while minimizing stress concentrations and thus minimizing the weight of the airbag.

Appendix 1 (of U.S. patent application Ser. No. 10/974, 919) provides a finite element analysis for a production side curtain airbag as used on the AGM Saturn vehicle. The stresses calculated in the seams are shown to require a NYLON® film thickness of about 0.3 mm or about 0.012 inches to withstand a gage pressure of about 2.8 kg/cm$^2$. Through the use of the elastic film techniques described herein, this thickness can be dramatically reduced to about 0.004 inches or lower.

As mentioned above, U.S. Pat. No. 5,811,506 (Slagel) describes a thermoplastic, elastomeric polyurethane for use in making vehicular airbags. Slagel does not mention the possibility of this material for use in a laminated film airbag. The elasticity of this material and the fact that it can be cast or otherwise made into a thin film renders this an attractive candidate for this application especially due to its high temperature resistance and other properties. Such a laminated film airbag would be considerably thinner and have a lighter weight than the polyurethane material by itself which would have to be quite thick to avoid becoming a balloon.

Another technique which can be used in some situations where particular geometries are desired is to selectively deposit or laminate metal foil onto particular sections or locations of the airbag. Such a foil not only greatly reduces gas permeation or leakage through the material but it also adds local stiffness or tensile strength to a particular area of the airbag. This can be used, for example, to reinforce the airbag seams or joints. The most common material for this purpose is aluminum; however, other metals can also be used. Selective addition of metal foil can also be used to control the shape of the airbag. For some applications, one layer of the entire airbag can be foil.

Other additives can be used in conjunction with the film airbags according with this invention including, e.g., aluminum trihydrate or antimony trioxide for flame proofing, BPS by Morton Thiokol for mildew prevention and TINUVUN 765 by Ciba Geigy for ozone resistance.

1.2 Driver Side Airbag

In FIG. 1, the driver airbag is shown in the inflated condition generally at 600 with one film layer 601 lying inside a second film layer 602. The film layers 601, 602, or sheets of film laminated or otherwise attached together, are non-perforated and are also referred to as airbags or layers herein since they constitute the same. FIG. 1A is an enlarged view of the material of the inner layer 601 and outer layer 602 taken within circle 1A of FIG. 1. When manufactured, the film of the inner layer 601 may be made from a thermoplastic elastomer such as polyurethane, for example, as shown in FIG. 1A, and the outer layer 602 may be made from a more rigid material such as NYLON® or polyester. The two film layers 601, 602 are held together along their adjacent regions by adhesive such as an adhesive 603 applied in a manner sufficient to provide adherence of the two film layers 601, 602 together, as is known in the art.

In FIG. 1, a driver side airbag 600 is illustrated where the bag is formed from two flat pieces of material 601, 602 and a center cylindrical piece 604 all of which are joined together using heat sealing with appropriate reinforcement at the heat sealed joints. Heat sealing entails the application of heat to one or both of the surfaces to be joined. In most implementations, the center cylindrical piece 604 is not required as taught in U.S. Pat. No. 5,653,464 mentioned above.

The example of FIG. 1 is meant to be illustrative of a general technique to minimize the propagation of tears in a composite film airbag. In an actual airbag construction, the process can be repeated several times to create a composite airbag composed of several layers, each adjacent pair of layers optionally joined together with adhesive.

The materials used for the various film layers can be the same or different and are generally made from NYLON®, polyethylene or polyester, for the high modulus component and from polyurethane, polyester elastomer such as HYTREL™ or other thermoplastic elastomers for the low modulus component, although other materials could also be used. The use of different materials for the different layers has the advantage that tear propagation and strength properties can complement each other. For example, a material which is very strong but tears easily can be used in conjunction with a weaker material which requires a greater elongation before the tear propagates or where the tear does not propagate at all as with blunting materials. Alternately, for those cases where self-shaping is not necessary, all layers can be made from thermoplastic elastomers which expand upon inflation and do not maintain any set shape.

In the implementation of FIG. 1, the adhesive 603 has been applied in a uniform coating between the film layers. In some cases, it is preferable to place the adhesive in a pattern so as to permit a tear to propagate a small distance before the stress is transferred between layers. This permits the stress concentration points to move a small distance away from each other in the two films and further reduces the chance that a catastrophic failure will result. Thus, by selecting the pattern of the application of the adhesive 603 and/or the location(s) of application of the adhesive 603, it is possible to control the propagation of a tear in the composite airbag 600.

FIG. 1B illustrates an alternate configuration of a composite airbag where the outermost airbag 602 has been replaced by a net 605. There may be additional film layers beneath the inner layer 601 in this embodiment. A "net" is defined for the purposes of this application as an interlaced or intercrossed network of material, e.g., strips of material which cross one another. The interlacing may be generated, e.g., by weaving discrete elongate strips of material together or by molding, casting, progressive coating or a similar process in which case the material is molded into the network to provide an intercrossed structure upon formation. Additionally, the net 605 may be formed integrally with the film material in which case it appears as a substantial change in material thickness from the net 605 and film portions of the material to the only film portions of the material. The strips of material may be joined at the intersection points in the event that discrete material strips are woven together. In the illustrated embodiment, the material strips which constitute the net 605 are oriented in two directions perpendicular to one another. However, it is within the scope of the invention to have a net comprising material strips oriented in two, non-perpendicular directions (at an angle to one another though) or three or more directions so long as the material strips are interlaced with each other to form the net. Additionally, the net pattern can vary from one portion of the airbag to another with the particular location and orientation determined by analysis to minimize stress concentrations, eliminate wrinkles and folds, or for some other purpose. Also, it is understood that the net has openings surrounded by material having a thickness and width substantially smaller than the openings.

The net 605 may be an integral part of the inner airbag 601 or it can be attached by an adhesive 603, or by another method such as heat sealing, to the inner airbag 601 or it can be left unattached to the inner airbag 601 but nevertheless attached to the housing of the airbag system. In this case, the stress in the inner airbag 601 is transferred to the net 605 which is designed to carry the main stress of the composite airbag and the film of the inner airbag 601 is used mainly to seal and prevent the gas from escaping. Since there is very little stress in the film layer constituting the inner airbag 601, a tear will in general not propagate at all unless there is a failure in the net 605. The net 605 in this illustration has a mesh structure with approximately square openings of about 0.25 inches. This dimension will vary from design to design. The adhesive 603 also serves the useful purpose of minimizing the chance that the net 605 will snag buttons or other objects which may be worn by an occupant. The design illustrated in FIG. 1B shows the net 603 on the outside of the inner airbag 601. Alternately, the net 605 may be in the inside, internal to the inner airbag 601, especially if it is created by variations in thickness of one continuous material.

In one embodiment, the net 605 is attached to the housing of the inner airbag 601 and is designed to enclose a smaller volume than the volume of the inner airbag 601. In this manner, the inner airbag 601 will be restrained by the net 605 against expansion beyond the volumetric capacity of the net 605. In this manner, stresses are minimized in the film permitting very thin films to be used, and moreover, a film having a higher elastic modulus can be used. Many other variations are possible. In one alternative embodiment, for example, the net 605 is placed between two layers of film so that the outer surface of the composite airbag is smooth, i.e., since the film layer is generally smooth. In another embodiment shown in FIG. 1C, fibers 606 of an elastomer, or other suitable material, are randomly placed and sealed between two film layers 601, 602 (possibly in conjunction with the adhesive). In this embodiment, the fibers 606 act to prevent propagation of tears in much the same manner as a net. The net 605 may also be constructed from fibers.

The driver airbag 600 of FIG. 1 is shown mounted on a vehicle by a conventional mounting structure (not shown) in the driver side position and inflated in FIG. 1D.

It is understood that the airbag 600 is arranged prior to deployment in a module or more specifically in a housing of the module and further that the interior of the airbag 600 is adapted to be in fluid communication with an inflator or inflator system for inflating the airbag, e.g., a gas generation or gas production device. Thus, the inflator is coupled in some manner to the housing. Also, the module includes an initiator or initiation system for initiating the gas generation or production device in response to a crash of the vehicle. This structure is for the most part not shown in the drawings but may be included in connection with all of the airbag concepts disclosed herein.

An airbag made from plastic film is illustrated in FIG. 3 which is a partial cutaway perspective view of a driver side airbag 610 made from film. This film airbag 610 is constructed from two flat disks or sheets of film material 611 and 612 which are sealed together by heat welding or an adhesive to form a seam 613. A hole 617 is provided in one of the sheets 612 for attachment to an inflator (not shown). The hole 617 can be reinforced with a ring of plastic material 619 and holes 618 are provided in the ring 619 for attachment to the inflator. A vent hole 615 is also provided in the sheet 612 and it can be surrounded by a reinforcing plastic disk 616. Since this airbag 610 is formed from flat plastic sheets 611 and 612, an unequal stress distribution occurs causing the customary wrinkles and folds 614.

Several different plastic materials are used to make plastic films for balloons as discussed in U.S. Pat. No. 5,188,558, U.S. Pat. No. 5,248,275, U.S. Pat. No. 5,279,873 and U.S. Pat. No. 5,295,892. These films are sufficiently inelastic that when two flat disks of film are joined together at their circumferences and then inflated, they automatically attain a flat ellipsoidal shape. This is the same principle used herein to make a film airbag, although the particular film materials selected are different since the material for an airbag has the additional requirement that it cannot fail during deployment when punctured.

When the distinction is made herein between an "inelastic" film airbag and an elastic airbag, this difference in properties is manifested in the ability of the untethered elastic airbag to respond to the pressure forces by becoming approximately spherical with nearly equal thickness and diameter while the inelastic film airbag retains an approximate ellipsoidal shape, or other non-spherical shape in accordance with the design of the inelastic film airbag, with a significant difference between the thickness and diameter of the airbag.

An analysis of the film airbag shown in FIG. 3 shows that the ratio of the thickness to the diameter is approximately 0.6. This ratio can be increased by using films having greater elasticity. A completely elastic film, rubber for example, will form an approximate sphere when inflated. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the airbag made from inelastic film automatically provides nearly the desired shape for driver airbags upon deployment (i.e., the roughly circular shape commonly associated with driver side airbags). Note that this airbag still has a less than optimum stress distribution which will be addressed below.

Although there are many advantages in making the airbag entirely from film, there is unfortunately reluctance on the part of the automobile manufacturers to make such a change in airbag design until the reliability of film airbags can be satisfactorily demonstrated. To bridge this gap, an interim design using a lamination of film and fabric is desirable. Such a design is illustrated in FIG. 4A which is a partial cutaway perspective view of a driver side airbag made from film 622 laminated with fabric 621 to produce a hybrid airbag 620. The remaining reference numbers represent similar parts as in the embodiment shown in FIG. 3. In all other aspects, the hybrid airbag 620 acts as a film airbag. The inelastic nature of the film 622 causes the hybrid airbag 620 to form a proper shape for a driver airbag. The fabric 621, on the other hand, presents the appearance of a conventional airbag when viewed from the outside. Aside from the lamination process, the fabric 621 may be attached to the film 622 directly by suitable adhesives, such that there are only two material layers, or by heat sealing or any other convenient attachment and bonding method. Note, this is not to be confused with a neoprene or silicone rubber coated conventional driver side airbag where the coating does not significantly modify the properties of the fabric.

Figure 4B:
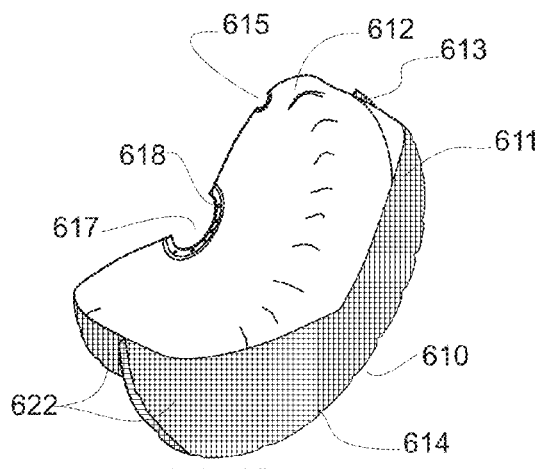
FIG. 4B is a partial cutaway perspective view of an inflated driver side airbag made from plastic film and a net to produce a hybrid airbag.

Analysis, as described in the above-referenced U.S. Pat. No. 5,505,485, has shown that a net is much stronger per unit weight than a fabric for resisting tears. This is illustrated in FIG. 4B which is a partial cutaway perspective view of a driver side airbag 610 made from film 612 and a net 622, which is preferably laminated to the film 612 or formed from the same material as the film 612 and is integral with it, to produce a hybrid airbag. The analysis of this system is presented in the '485 patent and therefore will not be reproduced here. The reference numerals designating the element in FIG. 4B correspond to the same elements as in FIG. 4A.

Figure 4C:
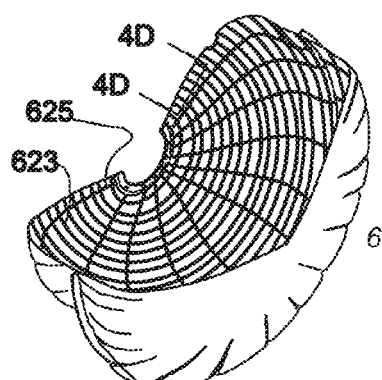
FIG. 4C is a partial cutaway perspective view of an inflated driver side airbag made from plastic film having a variable thickness reinforcement in a polar symmetric pattern with the pattern on the inside of the airbag leaving a smooth exterior.
Figure 4D:
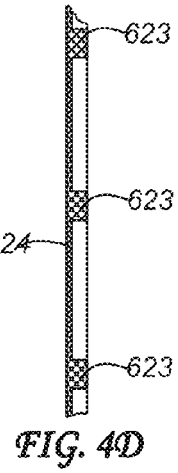
FIG. 4D is an enlarged cross sectional view of the material of the film airbag taken at 4D-4D of FIG. 4C showing the thickness variation within the film material.

For axisymmetric airbag designs such as shown in FIGS. 4A-4D, a more efficient reinforcement geometry is to place the reinforcements in a pattern of circular rings 623 and ribs 625 (FIG. 4C). A cross-sectional view of the material taken along line 4D-4D in FIG. 4C is shown in FIG. 4D. In this case, the reinforcement has been made by a progressive coating process from a thermoplastic elastomeric material such as polyurethane. In this case, the reinforcing rings and ribs 623, 625 are many times thicker than the spanning thin film portions 624 and the reinforcing ribs 625 have a variable spacing from complete contact at the center or polar region to several centimeters at the equator. The reinforcements may comprise the laminated net as discussed above. Since the rings and ribs 623, 625 are formed in connection with the inner surface of the airbag 610, the outer surface of the airbag 610 maintains its generally smooth surface.

In this regard, it should be stated that plastic manufacturing equipment exists today which is capable of performing this progressive coating process, i.e., forming a multi-layer plastic sheet (also referred to as a material sheet) from a plurality of different plastic layers. One such method is to provide a mold having the inverse form of the predetermined pattern and apply the specific plastic materials in individual layers into the mold, all but the initial layer being applied onto a preexisting layer. The mold has depressions having a depth deeper than the remaining portions of the mold which will constitute the thicker regions, the thinner portions of the mold constituting the spanning regions between the thicker regions. Also, it is possible and desirable to apply a larger amount of the thermoplastic elastomer in the depressions in the mold so that the thicker regions will provide a reinforcement effect. In certain situations, it is foreseeable that only the thermoplastic elastomer can be coated into the depressions whereas a plastic material which will form an inelastic film layer is coated onto the spanning regions between the depressions as well as in the depressions in order to obtain an integral bond to the thermoplastic elastomer. The mold can have the form of the polar symmetric pattern shown in FIG. 4C.

Figure 5A:
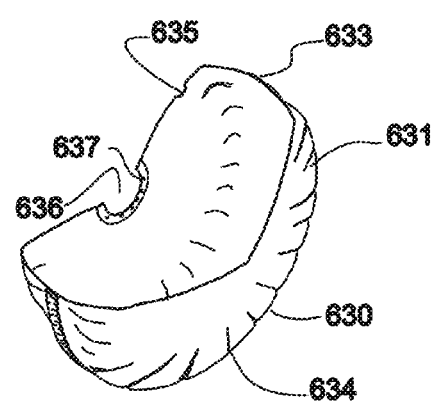
FIG. 5A is a partial cutaway perspective view of an inflated driver side airbag made from plastic film using a blow molding process.

The film airbag designs illustrated thus far were constructed from flat plastic sheets which have been sealed by heat welding, adhesive or otherwise. An alternate method to fabricate an airbag is to use a molding process to form an airbag 630 as illustrated in FIG. 5A which is a partial cutaway perspective view of a driver side airbag made from film using blow molding (a known manufacturing process). Blow molding permits some thickness variation to be designed into the product, as does casting and progressive coating methods molding (other known manufacturing processes). In particular, a thicker annular zone 633 is provided on the circumference of the airbag 630 to give additional rigidity to the airbag 630 in this area. Additionally, the material surrounding the inflator attachment hole 636 has been made thicker removing the necessity for a separate reinforcement ring of material. Holes 637 are again provided, usually through a secondary operation, for attachment of the airbag 630 to the inflator.

The vent hole 635 is formed by a secondary process and reinforced, or, alternately, provision is made in the inflator for the gases to exhaust therethrough, thereby removing the need for the hole 635 in the bag material itself. Since this design has not been stress optimized, the customary wrinkles and folds 634 also appear. The vent hole 635 might also be a variable-sized or adjustable vent hole to achieve the benefits of such as known to those skilled in the art.

Figure 5B:
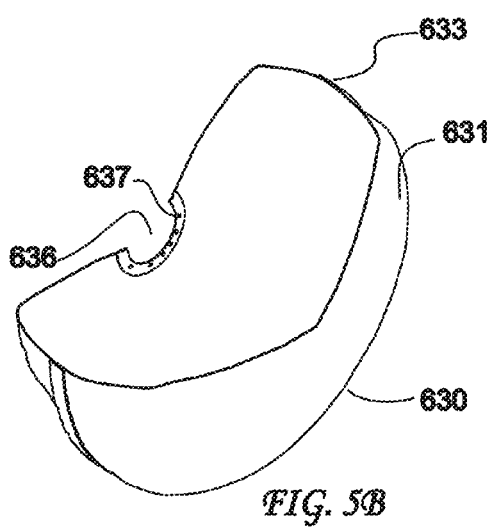
FIG. 5B is a partial cutaway perspective view of an inflated driver side airbag made from plastic film using a blow molding process so that the airbag design has been partially optimized using finite element airbag model where the wrinkles have been eliminated and where the stresses within the film are more uniform.

One advantage of the use of the blow molding process to manufacture airbags is that the airbag need not be made from flat sheets. Through careful analysis, using a finite element program for example, the airbag can be designed to substantially eliminate the wrinkles and folds seen in the earlier implementations. Such a design is illustrated in FIG. 5B which is a partial cutaway perspective view of a driver side airbag made from film using a blow molding process where the airbag design has been partially optimized using a finite element airbag model. This design has a further advantage in that the stresses in the material are now more uniform permitting the airbag to be manufactured from thinner material.

Figure 5C:
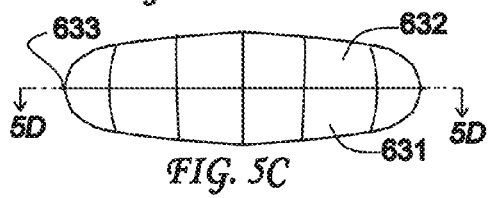
FIG. 5C is a cutaway view of an inflated driver side airbag made from plastic film showing a method of decreasing the ratio of thickness to effective diameter.
Figure 5D:
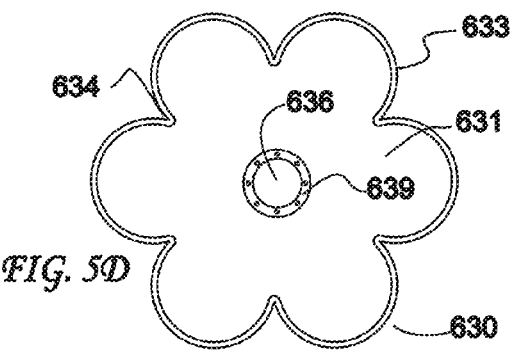
FIG. 5D is a view of a driver side airbag of FIG. 5C as viewed along line 5D-5D.

In some vehicles, and where the decision has been made not to impact the driver with the airbag (for example if a hybrid airbag is used), the inflated airbag comes too close to the driver if the ratio of thickness to diameter is 0.6. In these applications, it is necessary to decrease this ratio to 0.5 or less. For this ratio, thickness means the dimension of the inflated airbag measured coaxial with the steering column, assuming the airbag is mounted in connection with the steering column, and diameter, or average or effective diameter, is the average diameter measured in a plane perpendicular to the thickness. This ratio can be obtained without resorting to tethers in the design as illustrated in FIG. 5C which is a side view of a driver side airbag made from film where the ratio of thickness to effective diameter decreases. FIG. 5D is a view of the airbag of FIG. 5C taken along line 5D-5D. This airbag 630 can be manufactured from two sheets of material 631 and 632 which are joined together, e.g., by a sealing substrate, to form seal 633. Inflator attachment hole 636 can be reinforced with a ring of plastic material 637 as described above. Many circumferential geometries can be used to accomplish this reduction in thickness to diameter ratio, or even to increase this ratio if desired. The case illustrated in FIG. 5C and FIG. 5D is one preferred example of the use of a finite element design method for an airbag.

Some vehicles have a very steep steering column angle. Direct mounting of an airbag module on the steering wheel will therefore not provide good protection to the driver. One approach to solve this problem can be accomplished by using a softer wheel rim or column, which adjusts its angle when pressed by the occupant. However, in some cases this can have just the opposite effect. If a non-rotating driver side airbag is used, the airbag can be arranged to deploy at a different angle from the steering wheel without modifying the steering column while the airbag can be inflated in a direction appropriate for driver protection. Another advantage of using a non-rotating driver side airbag module is that the angle of the sensor axis is independent of the steering column angle for self-contained airbag modules.

In a high-speed vehicle crash, the steering column may collapse or shift due to the severe crush of the front end of the vehicle. The collapse of the steering column can affect the performance of an airbag if the bag is installed on the steering column. One steering system proposed herein purposely induces a large stroking of the steering column when the driver side airbag is activated. This stroking or "disappearing" column, creates a large space in the driver side compartment and therefore allows the use of a relatively large airbag to achieve better protection. In both of the above cases, an airbag module not rotating with the steering wheel is the better choice to accomplish occupant protection.

Recently, there are some developments in steering design, such as "steering by wire", to eliminate the steering column or the mechanical mechanism connecting the steering column to the front wheels. The rotation of the steering wheel is converted into a signal which controls the turning of front wheels by actuators adjacent to the wheels. As steer-by-wire is commercialized, it will be advantageous to use the invention herein of a non-rotating driver side airbag module, which does not have to be supported by a steering column.

To provide better viewing to the instrumentation panel for the driver, it is also beneficial to arrange a driver side airbag module so that it does not obstruct this view. A non-rotating driver side airbag can be either arranged to be out of the central portion of the steering wheel or completely out of the steering wheel to avoid this inconvenience.

An inflated airbag 640 interacting with an occupant driver 641 is shown in FIG. 6. Airbag 640 is installed in and deployed from steering wheel 642. The steering column 643 has a steep column angle placing the lower rim 644 of the steering wheel close to the driver 641. When the driver 641 moves forward after a crash, the driver's head 645 and the upper torso 646 make contact with the airbag 640 and the steering wheel 642. The airbag 640 is then deformed and pushed by the occupant 641 so that the airbag 640 does not form a cushion between the upper torso 646 and the steering wheel 642 even though the occupant's driver's head 645 is in full contact with the airbag 640.

A modified column 648 is illustrated in FIG. 7, which is equipped with a joint 647 between a lower part 648A of the steering column 648 connected to the vehicle and an upper part 648B of the steering column 648 connected to the steering wheel 642. Joint 647 allows the steering wheel 642 and the inflated airbag 640 to have a variable angle relative to the lower part 648A of the steering wheel 648 and thus an adjustable angle to the driver 641. Appropriate rotation of the joint 647 enables the inflated airbag 640 to align with the head 645 and upper torso 646 of the driver 641. The protection offered by the steering column 648 including the airbag 640 system in FIG. 7 is an improvement over the system in FIG. 6 since the airbag 640 is in a better orientation to cushion the occupant driver 641 and penetration of the lower rim 644 of the steering wheel 642 is avoided. The concept of a self-aligned driver side airbag can also be accomplished by rotating the steering wheel 642 or utilizing a soft rim for the steering wheel 642.

Construction of the joint 647 may involve use of a pivot hinge having two parts pivotable relative to one another with one part being attached to the lower part 648A of the steering column 648 and the other part being attached to the upper part 648B of the steering column 648. Alternatively, one of the lower and upper parts 648A, 648B can be formed with a projecting member and the other part formed with a fork-shaped member and a pivot pin connects the projecting member and fork-shaped member. Other ways to construct joint 647 will be apparent to those skilled in the art in view of the disclosure herein and are encompassed by the description of joint 647.

Pivotal movement of the upper part 648B of the steering column 648 and thus the steering wheel 642 and airbag 640 mounted in connection therewith may be realized manually by the driver or automatically by an actuating mechanism. The actuating mechanism can be designed to cooperate with an occupant position and monitoring system to receive the detected position and/or morphology of the driver 641 and then adjust the steering wheel 642 to a position within a range of optimum positions for a driver in that position and/or with that morphology. To allow for situations in which the driver manually changes the position of the steering wheel 642 outside of the range, the actuating mechanism can be designed to cooperate with a crash sensor system to receive a signal indicative of an impending or actual crash and then automatically adjust the position of the upper part 648B of the steering column 648. In this manner, even if the driver has the steering wheel 642 set in a position during regular driving in which it will adversely affect airbag deployment, the actuating mechanism causes the steering wheel 642 to be re-positioned during the crash A design with an airbag and an inflator on the steering column is illustrated in FIG. 8. The steering column can comprise an outer shaft 651, an inner shaft 652, and a supporting bracket 653. Outer shaft 651 can be coupled with the steering wheel 654 at one end region and extended to the engine compartment at the other end region to drive the steering mechanism 655 which causes turning of the tire(s) of the vehicle. The inner shaft 652 can be coupled with the inflator and airbag module 656 at one end region while the other end region can be attached to a stationary part 657 of the vehicle chassis in the engine compartment, for example. The supporting bracket 653 can be fixed to the firewall 658 for support. Bearings 659 and 660 can be placed between the bracket 653 and the outer shaft 651 to rotatably support the outer shaft 651 on the bracket 653 and bearings 661 and 662 can be placed between the outer shaft 651 and the inner shaft 652 and can be used for rotatably supporting the outer shaft 651 on the inner shaft 652. The outer and inner shafts 651, 652 may be tubular and concentric to one another.

Inner shaft 652 is stationary, not rotating with the steering wheel 654, therefore the airbag in airbag module 656 can be designed in an arbitrary shape and orientation. For example, a large airbag can be designed to provide the optimal protection of the driver. A less rigid steering wheel or column can also reduce the force exerted on the driver and allow the airbag to align with the driver. For example, the curved portion 663 of the steering wheel 654 can be designed to be flexible or to move away when the force on the rim of the steering wheel 654 exceeds a certain level. This force can be measured by appropriate measurement devices or sensors and a processor used to determine when the curved portion 663 of the steering wheel 654 should be moved away.

Steering wheel 654 can have a central cavity in which the inflator and airbag module 656 is situated. This central cavity may be centered about a rotation axis of the steering wheel 654.

Although module 656 is referred to as an inflator and airbag module, it is conceivable that only the airbag is arranged in the steering wheel 654, i.e., in the cavity defined thereby, while the inflator portion is arranged at another location and the inflation gas is directed into the airbag, e.g., the inflator is arranged on the dashboard and inflating gas directed into the airbag via a passage in the inner shaft 652.

A driver side restraint system, which is installed on or in the dashboard 675 of a vehicle is depicted in FIG. 9. The inflated airbag 671 fills the space between the ceiling of the passenger compartment 672, the windshield 673, the steering wheel 674, the dashboard 675, and the occupant driver 676. The airbag 671 is of such a geometry that the occupant driver 676 is surrounded by air cushion after the airbag 671 is fully inflated. An additional improvement can be provided if the steering wheel 674 and column strokes and sinks toward the dashboard 675 increasing the space between the occupant driver 676 and the steering wheel 674. The stroking movement of the steering wheel 674 and column can be initiated by the restraint system crash sensor. One approach is to use a mechanism where pins 678 lock the column and the steering wheel 674. As soon as the sensor triggers to initiate the airbag 671, the pins can be released and the steering wheel 674 and the column can then move towards the firewall 677. Other mechanisms for enabling movement of the steering wheel 674, i.e., the steering column to sink toward the dashboard 675, can be used in the invention.

An airbag 680 installed on the dashboard 681 of a vehicle is illustrated in FIG. 10. The airbag 680 is partially deployed between the windshield 682 and the steering wheel 683 and the dashboard 681. The inflator 685 provides gas to unfold and inflate the airbag 680. A torsional spring 686, or other mechanism, can be used to control the opening of a valve 687, which controls the flow of gas out of vent hole 688 of the airbag 680. When the pressure inside the airbag 680 is lower than a desired pressure, the valve 687 can close retaining the gas within the airbag 680. When the pressure inside the airbag 680 exceeds a design level, the valve 687 opens and releases gas from the airbag 680 into the engine compartment 689, which is separated from the passenger compartment by firewall 690. Although only a single vent hole 688 and associated valve 687 are shown, multiple vent holes and/or valves can be provided.

A distributed inflator and airbag module 691 along the dashboard of a vehicle below the windshield 692 is illustrated in FIG. 11A. FIG. 11B illustrates a side view of the inflator and airbag module 691, which shows the module cover 693, the folded airbag 694, the inflator 695 and the vent hole 696 covering an opening in the airbag 694. The long tubular inflator 695, which has multiple ports along the module 691, can evenly and quickly generate gas to inflate the airbag 694. Multiple vent holes 696 are shown in FIG. 11A, located near the bottom of the windshield 692. These vent holes 696, since they cover openings in the airbag 694, can direct, or allow the flow of, the exhaust gases from the airbag 694 into the engine compartment. More specifically, vent holes 696 can be used regulate the gas flow from the airbag 694 to the engine compartment so that the inflated airbag 694 can be matched to the occupant and the severity of the crash.

Airbag 694 may be attached to the dashboard so that the periphery of the opening in the airbag 694 associated with each vent hole 696 is aligned with the vent hole 696.

Drive-by-wire is being considered for automobiles. Such a system will permit a significant reduction in the mass and cost of the steering wheel and steering column assembly. However, if the airbag is still deployed from the steering wheel, the strength and thus weight of the airbag will have to be largely maintained. Thus, a preferable arrangement is to cause the steering wheel and column to move out of the way and have the airbag for the driver deploy from the dashboard or the ceiling as discussed elsewhere herein. Such an airbag can be multi-chambered so as to better capture and hold the driver occupant in position during the crash.

1.3 Passenger Side Airbag

The discussion above has been limited for the most part to the driver side airbag which is attached to the vehicle steering wheel or otherwise arranged in connection therewith. This technology is also applicable to a passenger side airbag, which is generally attached to the instrument panel, as illustrated in FIG. 12 which is a partial cutaway perspective view of a passenger side airbag 700 made from three pieces or sheets of flat film 701, 702 and 703 which have joined seams 704 between adjacent pieces of film 701, 702, 703. The passenger side airbag, as well as rear seat airbags and side impact airbags, generally have a different shape than the driver side airbag but the same inventive aspects described above with respect to the driver side airbag could also be used in connection with passenger side airbags, rear seat airbags and side impact airbags. Although illustrated as being constructed from a plurality of sheets of plastic film, the passenger side airbag 700 can also be made by blow molding or other similar molding process, i.e., as one unitary sheet. Also, for many vehicles, the film sheet 702 is unnecessary and will not be used thereby permitting the airbag to once again be manufactured from only two flat sheets. The inflator attachment hole 706 is now typically rectangular in shape and can be reinforced by a rectangular reinforcement plastic ring 708 having inflator-mounting holes 707. A vent hole 705 can also be provided to vent gases from the deploying airbag 700. The vent hole 705 might be a variable-sized or adjustable vent hole to achieve the benefits of such as known to those skilled in the art.

Another class of airbags that should be mentioned are side impact airbags that deploy from the vehicle seat or door. These also can be made from plastic film according to the teachings of this invention.

1.4 Inflatable Knee Bolster-Knee Airbag

An example of a knee airbag is illustrated in FIG. 13 which is a perspective view of a knee restraint airbag illustrating the support of the driver's knees and also for a sleeping occupant lying on the passenger seat of the vehicle (not shown). The knee support airbag shown generally at 514 comprises a film airbag 515 which is composed of several smaller airbags 516, 517, 518, and 519 as disclosed above. Alternately, the knee airbag can be made from a single film airbag as disclosed in U.S. Pat. No. 5,653,464 referenced above. The knee support airbag can be much larger than airbags previously used for this purpose and, as a result, offers some protection for an occupant, not shown, who is lying asleep on the vehicle seat prior to the accident.

With the development of the film airbag and the inflator design above, a very thin airbag module becomes possible as disclosed in U.S. Pat. No. 5,505,485. Such a module can be made in any length permitting it to be used at many locations within the vehicle. For example, one could be positioned on the ceiling to protect rear seat occupants. Another one would stretch the length of the car on each side to protect both front and rear occupants from head injuries in side impacts. A module of this design lends itself for use as a deployable knee restraint as shown in FIG. 13. Eventually, especially when drive-by-wire systems are implemented and the steering wheel and column are redesigned or eliminated, such an airbag system will be mounted on the ceiling and used for the protection of all of the front seat passengers and driver in frontal impacts. With the economies described above, airbags of this type will be very inexpensive, perhaps one-fifth the cost of current airbag modules offering similar protection.

In FIG. 13, a knee protection airbag for the front driver is shown generally at 709 (and is also referred to as a knee bolster herein). Since the knee airbag 709 fills the entire space between the knees and the instrument panel and since the instrument panel is now located at a substantial distance from the occupant's knees, there is substantially more deflection or stroke provided for absorbing the energy of the occupant. Submarining is still prevented by inflating the knee airbag 709 to a higher pressure, typically in excess of 1 bar and sometimes in excess of 2 bars, and applying the force to the occupant knees before he or she has moved significantly. Since the distance of deployment of the knee airbag 709 can be designed large enough to be limited only by the interaction with an occupant or some other object, the knee airbag 709 can be designed so that it will inflate until it fills the void below the upper airbag, not illustrated in this figure. The knee protection airbag 709 can take the form of a fabric or any of the composite airbags disclosed above, e.g., include a plastic film layer and an overlying net, or two or more plastic film layers, usually at least one being inelastic to provide the shape of the knee bolster and at least one being elastic to control the propagation of a tear. The knee bolster airbag can also be deployed using as aspirated inflator or other method permitting the airbag to be self-limiting or self-adjusting so as to fill the space between the knees of the occupant and the vehicle structure. In FIG. 13, the width of the cells is typically less than the width of the knee of an occupant. In this manner, the capturing of the knees of the occupant to prevent them from sliding off of the knee airbag 709 is enhanced.

In preferred designs presented herein and below, the knee airbag 709 is deployed as a cellular airbag with the cells, frequently in the form of tubes, interconnected during inflation and, in most cases, individual valves in each chamber closed to limit the flow of gas out of the chamber during the accident. In this manner, the occupant is held in position and prevented from submarining. A composite film is one preferred material; however, fabric can also be used with some increased injury risk. The cellular or tubular airbags designs described herein are also sometimes referred as compartmentalized airbags.

Figure 30:
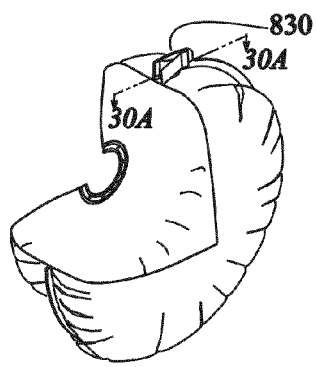
FIG. 30 is a partial cutaway perspective view of a driver side airbag made from plastic film having a variable vent in the seam of the airbag.
Figure 30A:
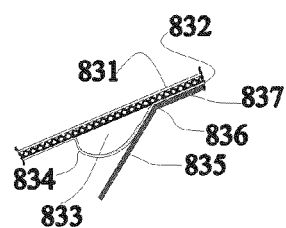
FIG. 30A is an enlargement of the variable vent of FIG. 30 taken along line 30A-30A of FIG. 30.

Normally, the knee bolster airbag will not have vents. It will be deployed to its design pressure and remain deployed for the duration of the accident. For some applications, a vent hole will be used to limit the peak force on the knees of the occupant. As an alternate to providing a fixed vent hole as illustrated in the previous examples, a variable vent hole can be provided as shown in FIGS. 30 and 30A (discussed below). Alternately, this variable vent function can be incorporated within the inflator as described in U.S. Pat. No. 5,772,238.

Typically, inflatable knee bolster installations comprise an inflatable airbag sandwiched between a rigid or semi-rigid load distributing impact surface and a reaction surface. When the inflator is triggered, the airbag expands to move the impact surface a predetermined distance to an active position.

This position may be determined by tethers between the reaction and impact surfaces. These installations comprise numerous parts, bits and pieces and require careful installation. In contrast, in a preferred knee bolster described herein, there is no rigid load distributing surface but rather, the knee bolster conforms to the shape of the knees of the occupant. Tethers in general are not required or used as the shaping properties of inelastic films are utilized to achieve the desired airbag shape. Finally, preferred designs herein are not composed of numerous parts and in general do not require careful installation. One significant problem with the use of load distribution plates as is commonly done in the art is that no provision is made to capture the knees and thus, especially if the crash is an angular impact or if the occupant is sitting on an angle with respect to the knee bolster or has his or her legs crossed, there is a tendency for the knees to slip sideways off of the knee bolster defeating the purpose of the system. In the multi-cellular knee bolster disclosed herein, the cells expand until they envelop the occupant's knees, capturing them and preventing them from moving sideways. Once each cell is filled to a design pressure, a one-way valve closes and flow out of the cell is prevented for the duration of the crash. This design is especially effective when used with an anticipatory sensor as the knees can be captured prior to occupant movement relative to the passenger compartment caused by the crash. A signal from the anticipatory sensor would initiate an inflator to inflate the knee bolster prior to or simultaneous with the crash.

An improvement to this design, not illustrated, is to surround the airbags with a net or other envelope that can slide on the surface of the airbag cells until they are completely inflated. Then, when the occupant begins loading the airbag cells during the crash, displacement of the knees not only compresses the cells that are directly in line with the knees but also the adjacent cells thus providing a significant increase to the available effective piston area to support the knees in much the same way that a load distribution plate functions. Such a net or envelope effectively distributes the load over a number of cells thus limiting the required initial pressure within the airbag cells. Other methods of accomplishing this load distribution include the addition of somewhat flexible stiffeners into the surface of the airbag where it contacts the knees, again with the goal of causing a load on one cell to be partially transferred to the adjacent cells.

In a preferred design, as discussed below, the cellular airbags inflate so as to engulf the occupant by substantially filling up all of the space between the occupant and the walls of the passenger compartment freezing the occupant in his or her pre-crash position and preventing the occupant from ever obtaining a significant velocity relative to the passenger compartment. This will limit the acceleration on the occupant to below about 15-20 Gs for a severe 30 MPH barrier crash. This retains the femur loads well below the requirements of FMVSS-208 and can essentially eliminate all significant injury to the occupant in such a crash. This, of course, assumes that the vehicle passenger compartment is effectively designed to minimize intrusion, for example.

In most of the preferred designs disclosed herein, the surface that impacts the occupant is a soft plastic film and inflicts little if any injury upon impact with the occupant. Even the fabric versions when used as a knee bolster, for example, can be considered a soft surface compared with the load distribution plates or members that impact the knees of the occupant in conventional inflatable knee bolster designs. This soft impact is further enhanced when an anticipatory sensor is used and the airbags are deployed prior to the accident as the deployment velocity can be substantially reduced.

In a conventional airbag module, when the inflator is initiated, gas pressure begins to rise in the airbag which begins to press on the deployment door. When sufficient force is present, the door breaks open along certain well-defined weakened seams permitting the airbag to emerge from its compartment. The pressure in the airbag when the door opens, about 10 to 20 psi, is appropriate for propelling the airbag outward toward the occupant, the velocity of which is limited by the mass of the airbag. In the case of a film airbag, this mass is substantially less, perhaps by as much as a factor of three or more, causing it to deploy at a much higher velocity if subjected to these high pressures. This will place unnecessary stresses in the material and the rapid movement of the airbag past the deployment door could induce abrasion and tearing of the film by the deployment door. A film airbag, therefore, must be initially deployed at a substantially lower pressure. However, conventional deployment doors require a higher pressure to open. This problem is discussed in detail in the above-referenced patents and patent applications where, in one implementation, a pyrotechnic system is used to cut open the door according to the teachings of Barnes et al. (U.S. Pat. No. 5,390,950).

There are of course many ways of making inflatable knee restraints using chambered airbags, such as illustrated in U.S. Pat. No. 6,685,217, without deviating from the teachings of this invention.

1.5 Ceiling Deployed Airbags

Airbags disclosed herein and in the assignee's prior patents are believed to be the first examples of multi-chambered airbags that are deployed from the ceiling and the first examples of the use of tubular or cellular airbags. These designs should become more widely used as protection is sought for other situations such as preventing occupants from impacting with each other and when developments in drive-by-wire are implemented. In the former case, airbags will be interposed between seating positions and in the latter case, steering wheel assemblies will become weaker and unable to support the loads imposed by airbags. In some cases, in additional to support from the ceiling, these airbags will sometimes be attached to other surfaces in the vehicle such as the A, B and C pillars in much the way that some curtain airbags now receive such support.

One method of forming a film airbag is illustrated generally at 710 in FIG. 14. In this implementation, the airbag is formed from two flat sheets or layers of film material 711, 712 which have been sealed, e.g., by heat or adhesive, at joints 714 to form long tubular shaped mini-airbags 713 (also referred to herein as compartments or cells) in much the same way that an air mattress is formed. In FIG. 14, a single layer of mini-airbags 713 is shown. It should be understood that the mini-airbags 713 are interconnected to one another to allow the inflating gas to pass through all of the interior volume of the airbag 710. Also, the joints 714 are formed by joining together selected, opposed parts of the sheets of film material 711, 712 along parallel lines whereby the mini-airbags 713 are thus substantially straight and adjacent one another. In other implementations, two or more layers could be used. Also, although a tubular pattern has been illustrated, other patterns are also possible such as concentric circles, waffle-shaped or one made from rectangles, or one made from a combination of these geometries or others. The film airbag 710 may be used as either a side airbag extending substantially along the entire side of the vehicle, an airbag disposed down the center of the vehicle between the right and left seating positions or as a rear seat airbag extending from one side of the vehicle to the other behind the front seat (see FIG. 15) and may or may not include any of the venting arrangements described herein.

FIG. 15 is a perspective view with portions removed of a vehicle having several deployed film airbags. Specifically, a single film airbag having several interconnected sections, not shown, spans the left side of the vehicle and is deployed downward before being filled so that it fits between the front seat and the vehicle side upon inflation (an airbag spanning the right side of the vehicle can of course be provided). This provides substantial support for the airbag and helps prevent the occupant from being ejected from the vehicle even when the side window glass has broken. A system which also purports to prevent ejection is described in Bark (U.S. Pat. No. 5,322,322 and U.S. Pat. No. 5,480,181). The Bark system uses a small diameter tubular airbag stretching diagonally across the door window. Such a device lacks the energy absorbing advantages of a vented airbag however vents are usually not desired for rollover protecting airbags. In fact, the device can act as a spring and can cause the head of the occupant to rebound and actually experience a higher velocity change than that of the vehicle. This can cause severe neck injury in high velocity crashes. The airbag of Bark '322 also is designed to protect primarily the head of the occupant, offering little protection for the other body parts. In contrast to the completely sealed airbag of Bark, a film airbag of the present invention can have energy absorbing vents and thus dampens the motion of the occupant's head and other body parts upon impact with the film airbag. Note that the desirability of vents typically goes away when anticipatory sensors are used as discussed elsewhere herein.

The airbag of Bark '322 covers the entire vehicle opening and receives support from the vehicle structure, e.g., it extends from one side of the B-pillar to the other so that the B-pillar supports the airbag 720. In contrast to the tube of Bark, the support for a preferred embodiment of the invention disclosed herein in some cases may not require complicated mounting apparatus going around the vehicle door and down the A-pillar but is only mounted to or in the ceiling above the side door(s). Also, by giving support to the entire body and adjusting the pressure between the body parts, the airbag of the present invention minimizes the force on the neck of the occupant and thus minimizes neck injuries.

1.5.1 Side Curtain Airbags

In FIG. 15, a single side protection airbag for the driver side is illustrated at 720. A single front airbag spans the front seat for protection in frontal impacts and is illustrated at 723 with the ceiling mounted inflator at 724. A single airbag is also used for protection of each of the rear seat occupants in frontal impacts and is illustrated at 725. With respect to the positioning of the side airbag 720, the airbag 720 is contained within a housing 722 which can be position entirely above the window of the side doors, i.e., no portion of it extends down the A-pillar or the B-pillar of the vehicle (as in Bark '322). The side airbag housing 722 thus includes a mounting structure (not shown) for mounting it above the window to the ceiling of the vehicle and such that it extends across both side doors (when present in a four-door vehicle) and thus protects the occupants sitting on that side of the vehicle from impacting against the windows in the side doors. To ensure adequate protection for the occupants from side impacts, as well as frontal impacts and roll-overs which would result in sideward movement of the occupants against the side doors, the airbag housing 722 is constructed so that the airbag 720 is initially projected in a downward direction from the ceiling prior to inflation and extends at least substantially along the entire side of the ceiling. This initial projection may be designed as a property of the housing 722 which houses the airbag 720, e.g., by appropriate construction and design of the module and its components such as the dimensioning the module's deployment door and deployment mechanism.

Although a variety of airbag designs can be used as the side impact protection airbag, one preferred implementation is when the airbag includes first and second attached non-perforated sheets of film and a tear propagation arresting mechanism arranged in connection with each of the film sheets for arresting the propagation of a tear therein. A net may also be used as described above. The net would constrict or tension the airbag if it were to be designed to retain an interior volume less than the volume of the airbag (as discussed above).

The airbag can include a venting device (e.g., a venting aperture as shown in FIGS. 4A and 4B) arranged in connection with the airbag for venting the airbag after inflation thereof. In certain embodiments, the airbag is arranged to extend at least along a front portion of the ceiling such that the airbag upon inflation is interposed between a passenger in the front seat of the vehicle and the dashboard (this aspect being discussed below with respect to FIG. 19).

FIG. 16 is a view looking toward the rear of the vehicle of the deployed side protection airbag of FIG. 15. An airbag vent is illustrated as a fixed opening 721. Other venting designs are possible including venting through the airbag inflator as disclosed in the above-referenced patents and patent applications as well as the variable vent described below with reference to FIGS. 30 and 30A or even no vent for rollover protection.

The upper edge of the airbag is connected to an inflator and the airbag 720 covers the height of the window in the door in this implementation.

FIG. 16A is a view of a side airbag similar to the one of FIG. 16 although with a different preferred shape, with the airbag 720 removed from the vehicle. The parallel compartments or cells can be seen. This aspect is discussed below with reference to FIGS. 24-26.

1.5.2 Frontal Curtain Airbags

FIGS. 17 and 18-18D illustrate the teachings of this invention applied in a manner similar to the airbag system of Ohm in U.S. Pat. No. 5,322,326. The airbag of Ohm is a small limited protection system designed for the aftermarket. It uses a small compressed gas inflator and an unvented thin airbag which prevents the occupant from contacting with the steering wheel but acts as a spring causing the occupants head to rebound from the airbag with a high velocity. The system of FIG. 17 improves the performance of and greatly simplifies the Ohm design by incorporating the sensor and compressed gas inflator into the same mounting assembly which contains the airbag. The system is illustrated generally at 730 in FIG. 17 where the mounting of the system in the vehicle is similar to that of Ohm.

In FIG. 18, the module assembly is illustrated from a view looking toward the rear of the airbag module of FIG. 17 with the vehicle removed, taken at 18-18 of FIG. 17. The module 730 incorporates a mounting plate 731, a high pressure small diameter tube constituting an inflator 733 and containing endcaps 734 which are illustrated here as having a partial spherical surface but may also be made from flat circular plates. The mounting plate 731 is attached to the vehicle using screws, not illustrated, through mounting holes 735. An arming pin 729 is illustrated and is used as described below.

FIG. 18A is a cross sectional view of the airbag module of FIG. 18 taken at 18A-18A and illustrates the inflator initiation system of this invention. The inflator 733 is illustrated as a cylindrical tube, although other cross sectional shapes can be used, which contains a hole 730A therein into which is welded by weld 732 to an initiation assembly 737. This assembly 737 has a rupture disk 738 welded into one end. A rupture pin 739 is positioned adjacent rupture disk 738 which will be propelled to impact the rupture disk 738 in the event of an accident as described below. When disk 738 is impacted by pin 739, it fails thereby opening essentially all of the orifice covered by disk 738 permitting the high pressure gas which is in a tube of the inflator 733 to flow out of the tube into cavity 740 of initiator assembly 737 and then through holes 741 into cavity 742. Cavity 742 is sealed by the airbag 736 which now deploys due to the pressure from the gas in cavity 742.

When the vehicle experiences a crash of sufficient severity to require deployment of the airbag 736, sensing mass 743, shown in phantom, begins moving to the left in the drawing toward the front of the vehicle. Sensing mass 743 is attached to shaft 744 which in turn is attached to D-shaft 745 (see FIG. 18C). As mass 743 moves toward the front of the vehicle, D-shaft 745 is caused to rotate. Firing pin 747 is held and prevented from moving by edge 746 of D-shaft 745. However, when D-shaft 745 rotates sufficiently, edge 746 rotates out of the path of firing pin 747 which is then propelled by spring 748 causing the firing pin point to impact with primer 749 causing primer 749 to produce high pressure gas which propels pin 739 to impact disk 738 releasing the gas from inflator tube 733 inflating the airbag 736 as described above. The sensor 743,744, D-shaft 745 and primer mechanism 747, 748, 749 are similar to mechanisms described in U.S. Pat. No. 5,842,716.

FIG. 18B is a cross sectional view, with portions cutaway and removed, of the airbag module 730 of FIG. 18 taken at 18B-18B and illustrates the arming pin 729 which is removed after the module 730 is mounted onto the vehicle. If the module 730 were to be dropped accidentally without this arming pin 729, the sensor could interpret the acceleration from an impact with the floor, for example, as if it were a crash and deploy the airbag 736. The arming system prevents this from happening by preventing the sensing mass 743 from rotating until the arming pin 729 is removed.

FIG. 19 is a perspective view of another preferred embodiment of the airbag of this invention 720 shown mounted in a manner to provide protection for a front and a rear seat occupant in side impact collisions and to provide protection against impacts to the roof support pillars in angular frontal impacts and to offer some additional protection against ejection of the occupant.

More particularly, in this embodiment, an airbag system for protecting at least the front-seated occupant comprises a single integral airbag 720 having a frontal portion 726 sized and shaped for deploying in front of the front-seated occupant and a side portion 727 sized and shaped for deploying to the side of the front-seated occupant. In this manner, airbag 720 wraps around the front-seated occupant during deployment for continuous front to side coverage. An inflator (not shown) is provided for inflating the single integral airbag with gas. As shown, the side portion 727 may be sized and shaped to deploy along an entire side of the vehicle, the side portion 727 is longer than the frontal portion 726 and the frontal portion 726 and side portion 727 are generally oriented at a 90 degree angle relative to each other. As with the other side curtain airbags discussed in connection with FIGS. 15, 16, 16A and 19, the airbag 720 may be housed in the ceiling. Also, as noted throughout this application, airbag 720 may comprise one or more sheets of film and the tear propagation arresting structure or a net may be provided to tension or constrict the deployment of the airbag 720. The construction can also comprise straight or curved interconnected cells or tubular structures.

Figure 21:
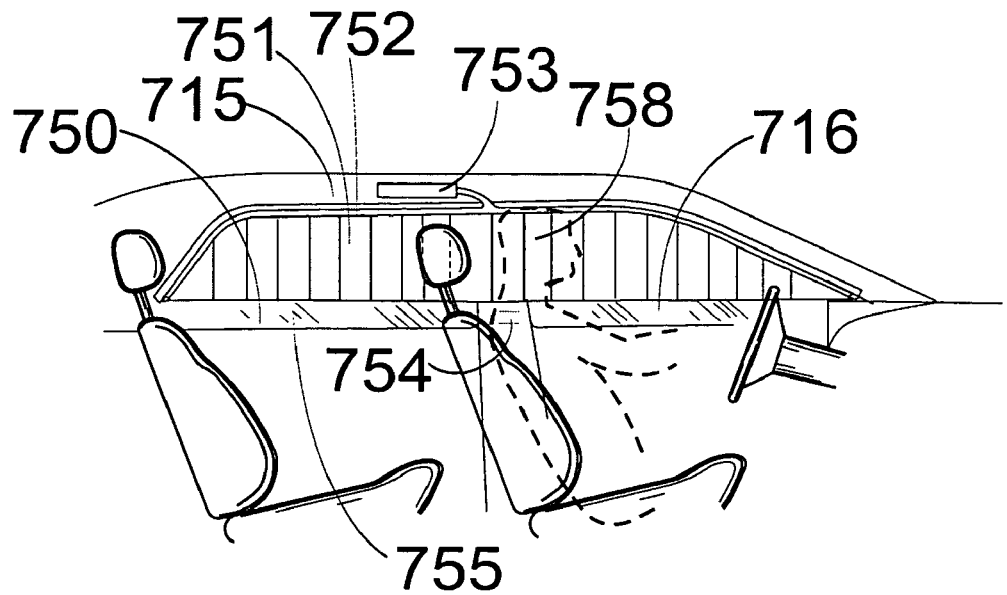
FIG. 21 illustrates the vehicle of FIG. 20 when the safety device is in the operative state.

FIGS. 20 and 21 illustrate another embodiment of the invention intended to provide protection from side impacts and rollover accidents not only for a person in the front seat of a motor vehicle such as a motor car, but also for a person in the rear seat of the vehicle which is similar to that shown in FIGS. 15, 16 and 16A.

Referring to FIG. 20, the housing 715 is provided over both the front door 716 and the rear door 750. The airbag or other type of inflatable element 751 is shown in the inflated state in FIG. 21. The inflatable element 751 has its top edge 752 secured to a part of the housing 715 or ceiling of the passenger compartment that extends above the doors 716, 750 of the motor vehicle (see, e.g., FIG. 16A). The design of the inflatable element is similar to that shown in. FIG. 14 or 16A, with the inflatable element including a plurality of parallel cells or compartments 755, which when inflated are substantially cylindrical. A gas generator 750 is provided which is connected to the inflatable element 751 in such a way that when the gas generator 750 is activated by a sensor 754, it supplies gas to the cells 755. Sensor 754 may be separate as shown or formed integrally with the gas generator 750, or which is otherwise associated with the gas generator 750, and responds to a crash condition requiring deployment of the inflatable element 751 to activate the gas generator 750. Thus, as the inflatable element 751 inflates, the cells 755 inflate in a downward direction until the inflatable element 751 extends across the windows in the doors 716, 750 of the motor vehicle (see FIG. 16). As the inflatable element 751 inflates, the length of the lower edge thereof decreases by as much as 30% as a consequence of the inflation of the cells 755. This reduction in the length of the lower edge ensures that the inflated element 751 is retained in position as illustrated in FIG. 21 after it has been inflated. Although shown as parallel tubes, other geometries are of course possible such as illustrated in FIGS. 28A-28L.

The inflatable element 751 described above incorporates a plurality of parallel substantially vertical, substantially cylindrical cells 755. The inflatable element 751 may be made of interwoven sections of a material such as film or other material such as woven fabric. Such a interweaving of material comprises a first layer that defines the front of the inflatable element 751, i.e., the part that is visible in FIGS. 20 and 21, and a second layer that defines the back part, i.e., the part that is adjacent the window in FIGS. 20 and 21, whereby selected parts of the first region and the second region are interwoven to define links in the form of lines where the front part and the back part of the inflatable element are secured together. A technique for making an inflatable element of inter-woven sections of material is described in International Patent Publication No. WO 90/09295.

Figure 22:
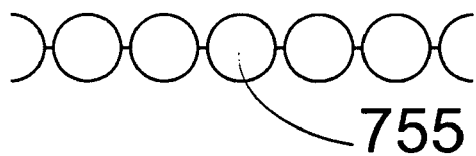
FIG. 22 is a sectional view of one form of safety device as shown in FIGS. 20 and 21 in a plane perpendicular to the vertical direction.
Figure 22A:
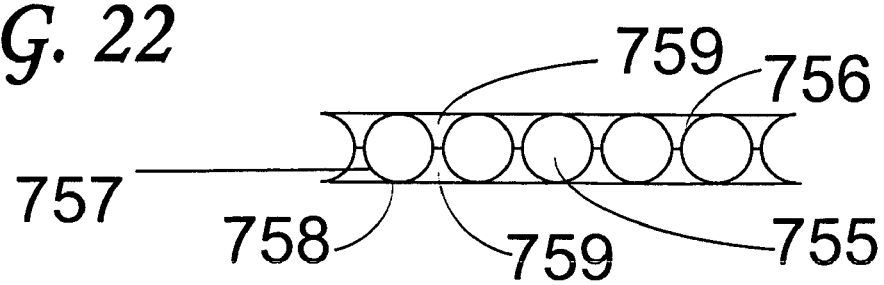
FIG. 22A is a view as in FIG. 22 with additional sheets of material attached to span the cells.

The tubes or cells 755 can be further joined together as illustrated in FIG. 22A by any method such as through the use of an additional sheet of material 758 which joins the front and back edges 756 and 757 of the adjacent cells 755 in order to render the inflatable element 751 more resistant to impacts from parts of the body of an occupant. The additional chambers 759 formed between the additional sheet of material 758 and the front and back edges of the cells 755 can either be pressurized at the same pressure as the tubes or cells 755 or they can be left exposed to the atmosphere, as is preferred. Although illustrated as joining adjacent cells of the inflatable element 751, they can alternatively be arranged to join nonadjacent cells. Although the cells are illustrated as parallel tubes, any geometry of chambers, cells or tubes can benefit from this improvement including those as illustrated in FIGS. 28A-28L.

FIG. 22 is a cross section showing the nature of the cells 755 of the inflatable element 751 of FIGS. 20 and 21. It can be seen that the cells 755 are immediately adjacent to each other and are only separated by narrow regions where the section of material, e.g., film, forming the front part of the inflatable element 751 has been woven or otherwise attached by heat sealing or adhesive with the section of material forming the back part of the inflated element.

Also, as noted throughout this application, inflatable element 751 may have any of the disclosed airbag constructions. For example, inflatable element 751 may comprise one or more sheets of film and the tear propagation arresting mechanism or a net may be provided to tension or constrict the deployment of the inflatable element 751. The film surface facing the occupant need not be the same as the film facing the side window, for example. In order to prevent broken glass, for example, from cutting the airbag, a thicker film, a lamination of a film and a fabric or a film and a net can be used.

There are of course many ways of making ceiling-mounted frontal protection airbags using chambers without departing from the teachings of this invention such as disclosed in published patent applications WO03093069, 20030234523 and 20030218319. Such airbags can be made from tubular sections or sections of other shapes and the amount of deployment of such airbags can be determined by occupant sensors as disclosed in other patents assigned to the assignee of this patent. Such airbags can be flat as disclosed herein or other shapes.

1.5.3 Other Compartmentalized Airbags

As mentioned above, anticipatory crash sensors based on pattern recognition technology are disclosed in several of assignee's patents and pending patent applications. The technology now exists based on research by the assignee to permit the identification and relative velocity determination to be made for virtually any airbag-required accident prior to the accident occurring. This achievement now allows airbags to be reliably deployed prior to the accident. The implications of this are significant. Prior to this achievement, the airbag system had to wait until an accident started before a determination could be made whether to deploy one or more of the airbags. The result is that the occupants, especially if unbelted, would frequently achieve a significant velocity relative to the vehicle passenger compartment before the airbags began to interact with the occupant and reduce his or her relative velocity. This would frequently subject the occupant to high accelerations, in some cases in excess of 40 Gs, and in many cases resulted in serious injury or death to the occupant especially if he or she is unrestrained by a seatbelt or airbag. On the other hand, a vehicle typically undergoes less than a maximum of 20 Gs during even the most severe crashes. Most occupants can withstand 20 Gs with little or no injury. Thus, as taught herein, if the accident severity could be forecast prior to impact and the vehicle filled with plastic film airbags that freeze the occupants in their pre-crash positions, then many lives will be saved and many injuries will be avoided.

One scenario is to use a camera, or radar-based or terahertz-based anticipatory sensor to estimate velocity and profile of impacting object. From the profile or image, an identification of the class of impacting object can be made and a determination made of where the object will likely strike the vehicle. Knowing the stiffness of the engagement part of the vehicle allows a calculation of the mass of the impacting object based on an assumption of the stiffness impacting object. Since the impacting velocity is known and the acceleration of the vehicle can be determined, we know the impacting mass and therefore we know the severity or ultimate velocity change of the accident. From this, the average chest acceleration that can be used to just bring the occupant to the velocity of the passenger compartment during the crash can be calculated and therefore the parameters of the airbag system can be set to provide that optimum chest acceleration. By putting an accelerometer on the airbag surface that contacts the occupant, the actual chest acceleration can be measured and the vent size can be adjusted to maintain the calculated optimum value. With this system, neither crush zone or occupant sensors are required, thus simplifying and reducing the cost of the system and providing optimum results even without initiating the airbag prior to the start of the crash.

There is of course a concern that if the airbags are inflated too early, the driver may lose control of the vehicle and the accident would be more severe than in the absence of such early inflation. To put this into perspective, experiments and calculations show that a reasonable maximum time period to inflate enough airbags to entirely fill a normal sedan is less than 200 ms. To protect the occupants of such a vehicle by filling the vehicle with airbags before the accident would require initiating deployment of the airbags about 200 ms prior to the accident which corresponds to a distance of vehicle travel of approximately 15 feet for the case where two vehicles are approaching each other with a closing velocity of about 60 MPH. It is unlikely that any action taken by the driver during that period would change the outcome of the accident and when the sensor signals that the airbags should be deployed, a control system can take control of the vehicle and prevent any unstable motions.

Figure 23:
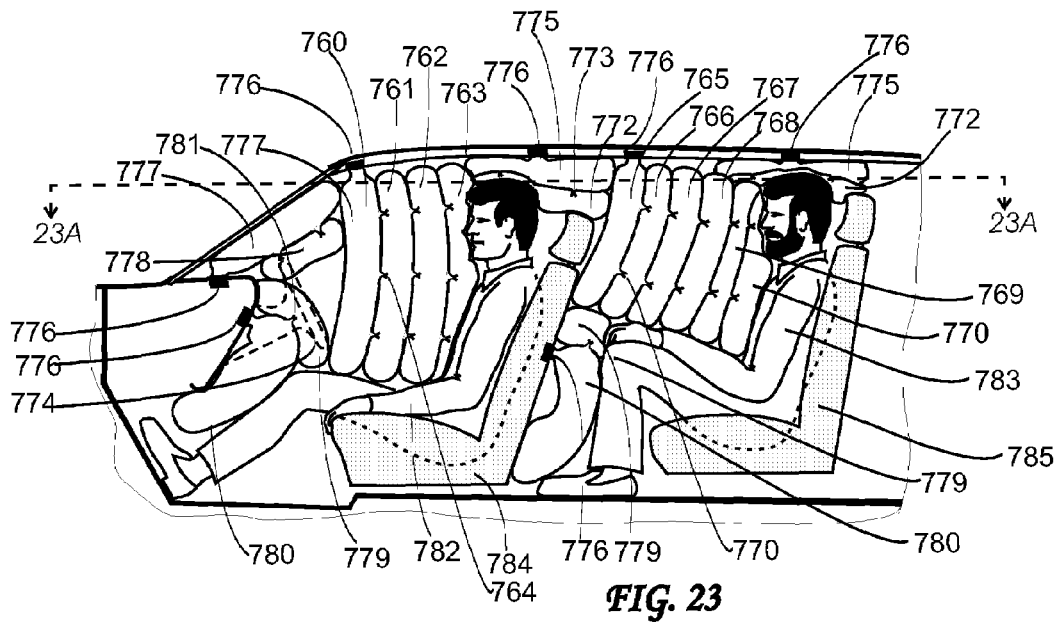
FIG. 23 is a side view of the passenger compartment of a vehicle showing the compartment substantially filled with layers of tubular film airbags some of which are interconnected.

FIG. 23 illustrates one preferred method of substantially filling the passenger compartment with airbags. Primary airbag 760 along with secondary airbags 761, 762, and 763 prior to inflation are attached to one or more aspirated inflators 776 and stored, for example, within the headliner or ceiling of the vehicle. When the anticipatory or other crash sensor, not shown, determines that deployment is necessary, primary airbag 760 deploys first and then secondary airbags 761-763 deploy from gas that flows through airbag 760 and through one-way valves 764. Inflation continues until pressure builds inside the airbags 760-763 indicating that they have substantially filled the available volume. This pressure buildup reduces and eventually stops the aspiration and the remainder of the gas from the gas generator flows either into the airbags 760-763 to increase their pressure or into the passenger compartment. Since the pumping ratio of the aspirated inflators 776 (a ratio of the amount of gas coming from the passenger compartment to the amount of gas coming from the gas generator which is processed by the aspirated inflator 776) is typically above 4, approximately 75% of the gas in the airbags 760-763 comes from the passenger compartment thus minimizing the pressure increase in the passenger compartment and injuries to the ears of the occupants. This also permits the substantial filling of the passenger compartment without the risk of breaking windows or popping doors open. If additional pressure relief is required then it can be achieved, for example, by practicing the teachings of U.S. Pat. No. 6,179, 326.

In a similar manner, primary airbag 765 inflates filling secondary airbags 766-770 through one-way valves 771. Additionally, airbags 775 mounted above the heads of occupants along with secondary airbags 772 can be inflated using associated inflators 776 to protect the heads of the occupants from impact with the vehicle roof or headliner. If occupant sensors are present in the vehicle, then when the rear seat(s) is (are) unoccupied, deployment of the rear-seat located airbags can be suppressed.

The knees and lower extremities of the occupants can be protected by knee airbags 780 and secondary airbags 779 in a similar manner. The design of these airbags will depend on whether there is a steering wheel 774 present and the design of the steering wheel 774. In some cases, for example, a primarily airbag may deploy from the steering wheel 774 while in other cases, when drive-by-wire is implemented, a mechanism may be present to move the steering wheel 774 out of the way permitting the secondary airbag(s) 779 to be deployed in conjunction with the knee airbag 780. The knee airbag deployment will be discussed in more detail below.

FIG. 23A illustrates a view from the top of the vehicle with the roof removed taken along line 23A-23A in FIG. 23 with the vehicle unoccupied. As can be seen, primary airbag 760, for example, is actually a row of tubular structures similar to that shown in FIG. 14. Additionally, curtain airbags 786 are present only in this implementation and they also comprise several rows of tubes designed to contact the occupants and hold them away from contacting the sides of the vehicle. Airbags 787 are also advantageously provided down the center of the vehicle to further restrain the occupants and prevent adjacent occupants from impacting each other.

In the preferred design, support for the airbags relies of substantially filling the vehicle and therefore loads are transferred to the walls of the vehicle passenger compartment. In many cases, this ideal cannot be completely achieved and straps of tethers will be required to maintain the airbags in their preferred locations. Again, this will depend of the design and implementation of this invention to a particular vehicle.

The particular designs of FIGS. 23 and 23A are for illustrative purposes only and the particular method of substantially filling a portion of the passenger compartment with airbags will depend substantially on the vehicle design.

Figure 24:
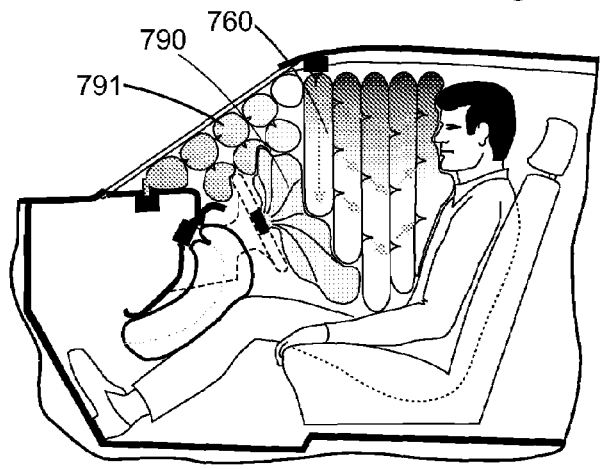
FIG. 24 is a similar but alternate arrangement of FIG. 23.

An alternate design is illustrated in FIG. 24 where a cellular airbag 790 deploys from the steering wheel in a somewhat conventional manner and additional lateral tubes 791 deploy between the occupant and the windshield. These airbags also provide added support for the steering wheel airbag for those cases where drive-by-wire has been implemented and the heavy structural steering wheel and column has been replaced by a lighter structure.

Figure 25:
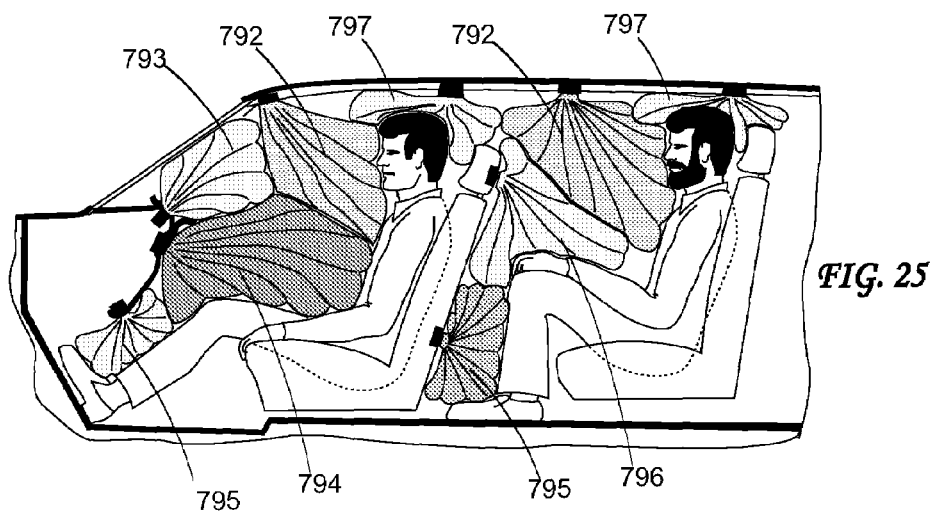
FIG. 25 is another alternate arrangement to FIG. 23 using airbags that expand radially from various inflators.

FIG. 25 illustrates an example wherein cellular tubular airbags made from thin plastic film, for example, expand in a flower pattern to engage the occupants and receive support from the walls, ceiling etc. of the passenger compartment. The airbags deform and interact with each other and the occupants to conform to the available space and to freeze the occupants in their pre-crash positions. Airbags 792 come from the ceiling for upper body protection. Airbags 793 deploy from the upper instrument panel for upper body protection and airbags 794 deploy for lower body protection. Airbags 795 protect the knees and lower extremities and airbags 796 protect the rear seated occupants. Finally, airbags 797 again provide protection for the tops of the heads of the occupants. Although not shown in this drawing, additional airbags may be provided to prevent the lateral movement of the occupants such as curtain and center-mounted airbags. Again, the intent is to fill as much of the vehicle passenger compartment surrounding the occupant as possible. If occupant sensors are present and the absence of a rear-seated occupant, for example, can be detected, then the rear seat airbags need not be deployed.

Figure 26:
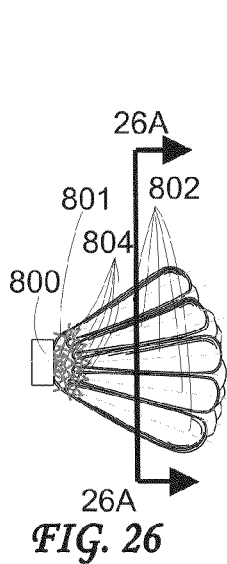
FIG. 26 is a detail of the radial expanding tubular airbags of FIG. 25.
Figure 26A:
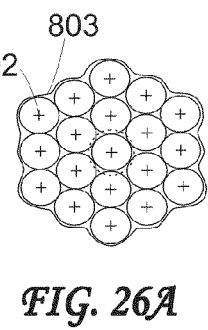
FIG. 26A is an end view of the airbags of FIG. 26 taken along line 26A-26A.

FIGS. 26 and 26A illustrate an example of a flower-type airbag design. The inflator 800, preferably an aspirated inflator, discharges into a common distribution volume or manifold 801, which can be made from the plastic film, which distributes the gas to the cells or tubes 802 of the airbag assembly through one-way valves 804, formed in the sheet of the tubes 802, in a manner similar to the tubular airbags of FIG. 23. An envelope 803 of plastic film is provided to contain the tubes 802. Alternately, the tubes 802 can be connected together along their adjacent edges and the envelope 803 eliminated.

Figure 27:
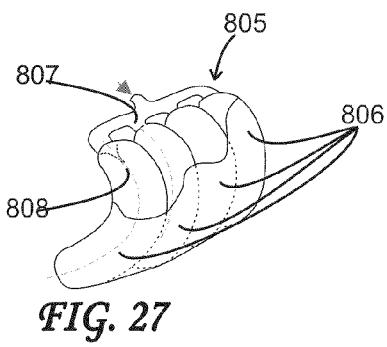
FIG. 27 is a detailed view of a knee bolster arrangement in accordance with the invention.
Figure 27A:
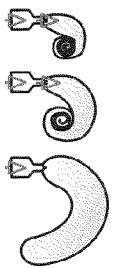
FIG. 27A illustrates the deployment stages of the knee bolster arrangement of FIG. 27.

FIGS. 27 and 27A illustrate an example of a knee bolster airbag 805 and its inflation sequence. Only four tubes are illustrated although frequently, a larger number will be used. The inflation gas comes from the inflator, not shown, into a manifold 807 which distributes the gas into the tubes 806 through one-way valves 808 formed in the material of the airbag 805. During inflation, the airbag 805 unrolls in a manner similar to a Chinese whistle.

In some of the implementations illustrated here, the airbags do not have vent holes. At the end of the crash, the gas in the airbags should be allowed to exhaust, which generally will occur through the inflator housing. Vents in the airbags for the purpose of dissipating the kinetic energy of the occupants can, in many cases, be eliminated since the philosophy is to freeze the occupant before he or she has achieved significant velocity relative to the passenger compartment. In other words, there will be no "second collision", the term used to describe the injury producing impact of the occupant with the walls of the passenger compartment. The occupants will, in general, experience the same average deceleration as the vehicle which in a 30 mph barrier crash is significantly less than 20 Gs.

Figure 28A:
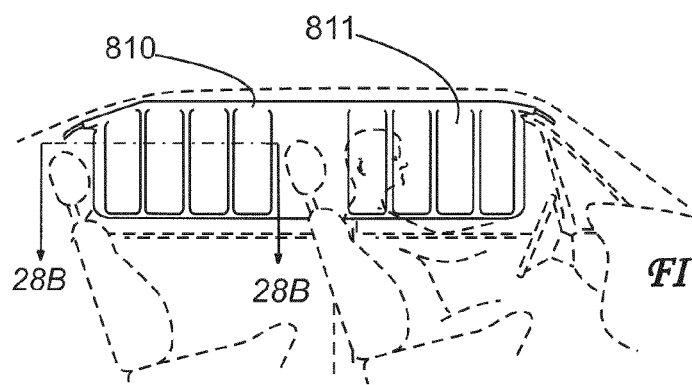
FIGS. 28A, 28D, 28F, 28H, 28J and 28L illustrate various common fabric airbag designs that have been converted to film and have additional film layers on each of the two sides of the airbag.
Figure 28B:
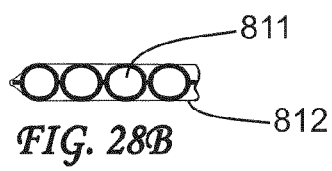
FIGS. 28B, 28C, 28E, 28G, 28I, 28K and 28M are cross-sectional views of FIGS. 28A, 28D, 28F, 28H, 28J and 28L.
Figure 28C:
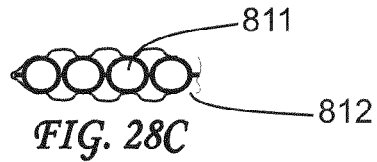

FIGS. 28A, 28D, 28F, 28H, 28J and 28L illustrate six related prior art curtain airbag designs that have been modified according to teachings of this invention to include the use of an envelope or a material sheet that spans the cells or tubes that make up the curtain airbag. The curtain airbag of FIG. 28A, designated 810, is a design based on parallel vertical tubes 811 and can be made from fabric or plastic film. Sheets of fabric or film material 812 are attached to the outer edges of tubes 81 so as to span from one tube to the adjacent tubes as illustrates in FIG. 28B which is a view of FIG. 28A taken along line 28B-28B. The volumes created between the tubes 811, i.e., cells, can be pressurized as illustrated in FIG. 28C or left exposed to the atmosphere as illustrated in FIG. 28B. The particular geometry that the cells will acquire is shown simplified here. In reality, the cell geometry will depend on the relative lengths of the various material sections, the thickness of the material and the relative inflation pressures of each cell. Care must be exercised in the design to assure that resulting airbag will fold properly into the storage area. The presence of the envelope of spanning sheets renders the curtain airbag 810 significantly more resistant to deformation on impact from the head of the occupant, for example. This improves the ability of the airbag to retain the occupant's head within the vehicle during a side impact or rollover. The main function of the curtain airbag 810 is to prevent this partial ejection which is the major cause of injury and death in side impact and rollover accidents. Although the envelope or spanning sheets 812 add additional material to the airbag 810, the added stiffness created actually permits the use of thinner materials for the entire airbag 810 and thus reduces the total weight and hence the cost of the airbag 810.

Figure 28D:
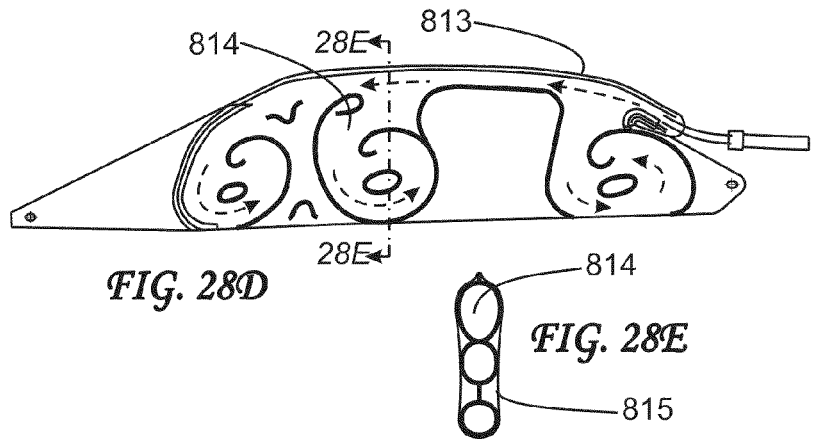
Figure 28E:
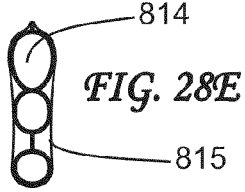
Figure 28F:
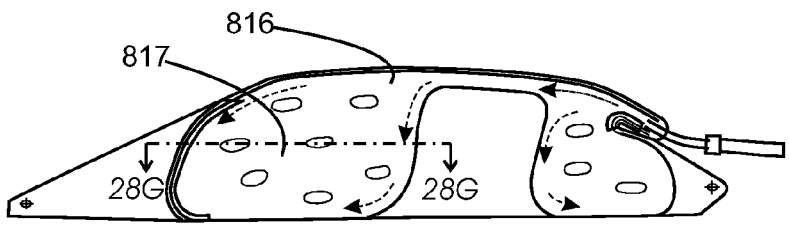
Figure 28G:
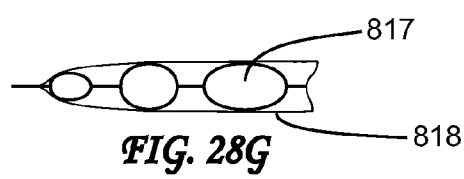

FIGS. 28D and 28E illustrate an alternate geometry of a side curtain airbag where the tubes acquire a varying thickness and shape. Curtain airbag 813 has tubes 814 and an envelope or spanning sheet 815. FIGS. 28F and 28G illustrate still another geometry of a side curtain airbag where the tubes 817 are formed by joining islands between the opposing sheets of material. As in all of the cases of FIGS. 28A, 28D, 28F, 28H, 28J and 28L, various manufacturing processes can be used to join the opposing sheets of material including sewing, heat sealing, adhesive sealing and interweaving where the entire bag is made in one pass through the loom, among others. Curtain airbag 816 has tubes 817 and an envelope or spanning sheet 818 (FIGS. 28F and 28G).

Figure 28H:
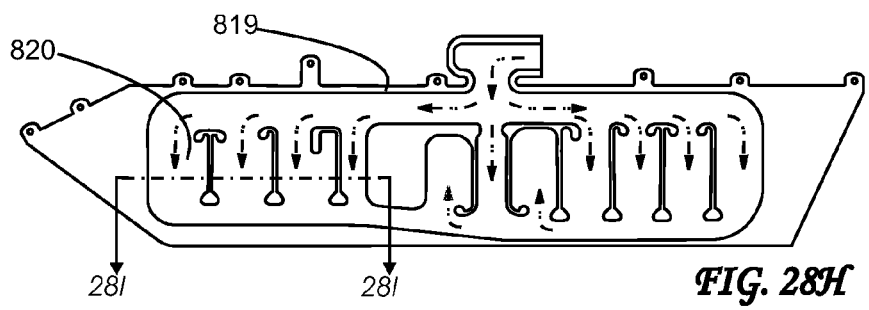
Figure 28I:
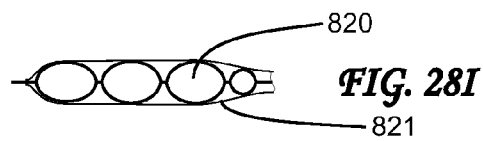
Figure 28J:
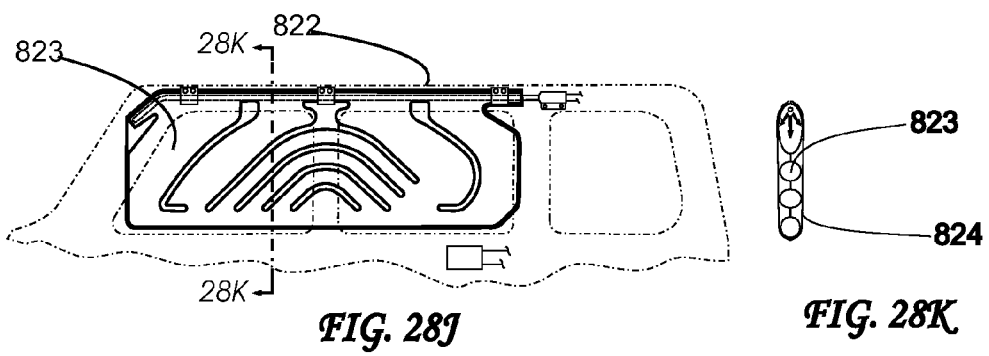
Figure 28K:
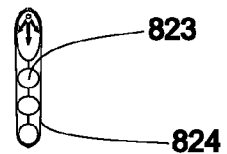

FIGS. 28H and 28I illustrate another geometry of a side curtain airbag where the tubes again acquire a roughly rectangular shape. Curtain airbag 819 has tubes 820 and an envelope or spanning sheet 821. FIGS. 28J and 28K illustrate yet another alternate geometry of a side curtain airbag where the tubes are slanted but still retain a roughly rectangular shape. Curtain airbag 822 has tubes 823 and an envelope or spanning sheet 824.

Figure 28L:
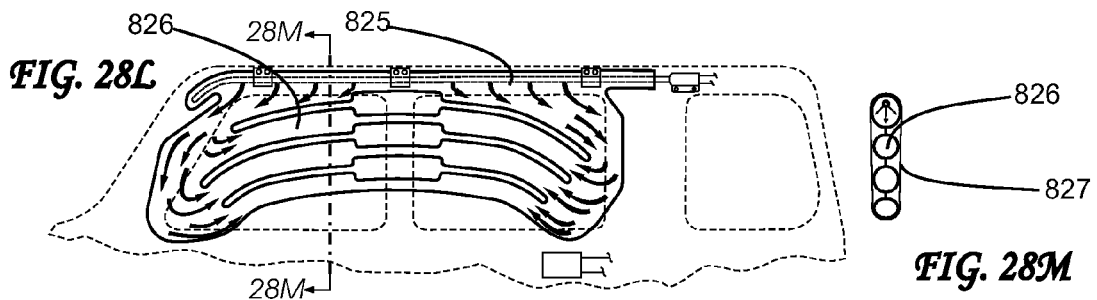
Figure 28M:
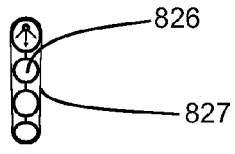

Finally, FIGS. 28L and 28M illustrate still another geometry of a side curtain airbag where the tubes again acquire a roughly rectangular shape with the tubes running roughly fore and aft in the vehicle. Curtain airbag 825 has tubes 826 and an envelope or spanning sheet 827.

Deployment of an airbag from the vehicle trim such as the headliner, A-Pillar, B-Pillar, C-Pillar was believed to be first disclosed in the current assignee's patents referenced above. As airbags begin to fill more and more of the passenger compartment as taught here and in other patents to the current assignee, the edges of the passenger compartment or the locations where the walls of the passenger compartment join become attractive locations for the deployment of airbags. This is especially the case when the airbags are made from thin plastic film that can be stored at such locations since they occupy a minimum of space. Thus, storage locations such as disclosed in U.S. Patent Application Publication No. 20030178821 are contemplated by this and previous inventions by the current assignee. For some applications, it is possible to put the entire airbag system in the headliner if knee protection is not required. This is a problem for convertible vehicles where the edges of the passenger compartment become more important.

The size of the cells or tubes in the various airbag designs discussed above can vary according to the needs of the particular application. For a given internal pressure, the thickness of the film material decreases as the diameter of the tubes decreases. Since the thickness determines the weight of the airbag and thus the potential to cause injury on impact with an occupant, in general, an airbag made from multiple smaller tubes will cause less injury than a single-chambered airbag of the same size. Therefore, when possible the designs should use more smaller cells or tubes. In the extreme, the vehicle can be filled with a large number of small airbags each measuring three inches or less in diameter, for example, and as long as the passenger compartment is substantially filled at least between the occupant and the compartment in the direction of the crash, the exact positioning of a particular airbag becomes less important as each one will receive support from others and eventually the passenger compartment walls.

Through the implementation of the ideas expressed herein, the airbag system becomes truly friendly. It can deploy prior to the accident, freeze the occupant in his or her pre-crash position, impact the occupant without causing injury, and gradually deflate after the accident. Inflators would preferably be aspirated to draw most of the required gas from the passenger compartment. Since an aspirated inflator automatically adjusts to provide just the right amount of gas, only single stage pyrotechnic systems would be required. Occupant sensors would not be necessary as the system would adjust to all occupants regardless of whether they were seated in a rear-facing child seat, belted, unbelted, out-of-position, lying down, sleeping, had their feet in the dashboard, etc. By eliminating the dual stage inflator, using aspiration thereby greatly reduces the amount of propellant required and by using thin plastic film, this airbag system is not only by far the best performing system it is also potentially the least expensive system.

Figure 29:
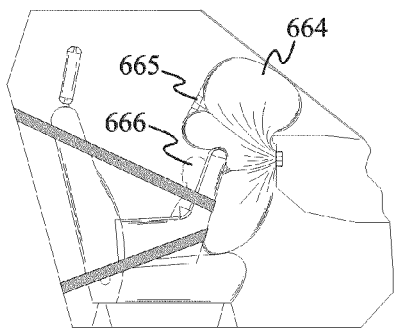
FIG. 29 is a perspective view of a self limiting airbag system including a multiplicity of airbags surrounded by a net, most of which has been cutaway and removed, designed to not cause injury to a child in a rear-facing child seat.

In FIG. 29, the advantages of the self-limiting airbag system disclosed herein and in U.S. Pat. No. 5,772,238 and with reference to FIG. 15, when used with a rear-facing child seat, are illustrated. In this case, where multiple film airbags are illustrated, the airbags deploy but the deployment process stops when each of the film airbags interacts with the child seat and the pressure within each bag rises to where the flow is stopped. In this case, the child 666 is surrounded by airbags 664 and further protected from the accident rather than being injured as is the case with current design airbags. The airbags 664 can be additionally surrounded by a net or other envelope 665 most of which has been cutaway and removed in the figure. In other implementations, a single airbag will be used in place of the multiple airbags illustrated here or multiple attached airbags can be used eliminating the need for the net.

The self-limiting feature is illustrated here by either a variable orifice exhaust port in the airbag, discussed in more detail below, or, preferably, provision is made in the airbag inflator itself as illustrated in the referenced '238 patent where a close-down of the aspiration system is used during the deployment portion of the process and a smaller variable orifice is used during the deflation portion. The aspiration cutoff can be designed so that the airbag deploys until the pressure begins to rise within the bag which then stops the inflation process, closes the aspiration ports and the airbag then becomes stiffer to absorb the kinetic energy of the impacting occupant. Thus, during the deployment phase, very little force is exerted on the occupant, or the child seat, but as the occupant begins to move into and load the airbag, substantial force is provided to limit his or her motion.

1.6 Rear of Seat Mounted Airbags

FIG. 25, discussed above, illustrates airbags that deploy from the rear of the front seat to protect rear seat occupants of a vehicle in a crash. These airbags also provide protection for front seat occupants to help prevent unbelted occupants in the rear seat from moving into the front seat during a crash and causing injury to those occupants seated in the front seat.

1.7 Exterior Airbags

Airbags that deploy outside of the vehicle have been disclosed primarily for side impact in the current assignee's patents. Generally, these externally deployed airbags are based on the use of an anticipatory sensor that identifies that an accident is about to occur using, for example, pattern recognition technologies such as neural network. Normally, these airbags are made from fabric but as the properties of films improve, these fabric airbags will be replaced by film airbags. In particular, using technology available today, the combination of a film and a reinforcing net can now be used to construct externally deployed airbags that are both stronger and lighter in weight than fabric. U.S. Patent Publication No. 20030159875 discloses the use of a resin for a pedestrian protection airbag. All of the film airbag constructions illustrated herein for interior use are also applicable for external use with appropriate changes in dimensions, material properties etc. as needed to satisfy the requirements of a particular application.

Particular mention should be made of pedestrian protection since this is rapidly becoming a critical safety issue primarily in Japan and Europe where the percentage of people killed in automobile accidents that are pedestrians is greater than in North America. Although many patents have now issued and are pending relating to pedestrian airbags, none, except those of the current assignee, are believed to make use of an anticipatory sensor that can identify that the vehicle is about to impact with a pedestrian. See, e.g., U.S. Patent Publication No. 20030159875 and EP01338483A2. Since this technology has been developed by the current assignee, the technology is now available to identify that a pedestrian is about to be struck by the vehicle. This technology uses a camera or other imaging system and a pattern recognition system such as a neural network or combination network as defined in the above-referenced current assignee's patents.

Exterior airbags can require a substantial amount of gas for inflation and thus are candidates for aspirated inflators such as disclosed in U.S. Patent Application Publication No. 20020101067 and above herein. Exterior airbags can get quite large and thus require a substantial amount of gas. Also they frequently require a high pressure. Aspirated inflators can economically satisfy both of these requirements. Such exterior airbags can also be of the shape and construction as disclosed herein and illustrated, for example, in U.S. Patent Application Publication No. 20040011581. Such exterior airbags can be made from plastic film.

1.8 Variable Vent

A great deal of effort has gone into the design on "smart" inflators that can vary the amount of gas in the airbag to try to adjust for the severity of the crash. The most common solution is the dual stage airbag where either of two charges or both can be initiated and the timing between the initiation can be controlled depending on the crash. Typically, one charge is set off for low speed crashes and two for higher speed crashes. The problem, of course, is to determine the severity of the crash and this is typically done by a passenger compartment-mounted crash sensor. This is relatively easy to do for barrier crashes but the crashes in the real world are quite different. For example, some pole crashes can appear to be mild at the beginning and suddenly become severe as the penetrating pole strikes the engine. In this case, there may not be time to initiate the second charge. An alternate solution, as reported in current assignee's patents listed above, is to use a single stage inflator but to control the flow of gas into and/or out of the airbag. If this is an aspirated inflator, this control happens automatically and if the airbag is a film airbag, it can be designed to interact with any occupant and thus inflator control is not required.

In an alternate situation where either a conventional inflator is used or an aspirated inflator is used, the flow out of the airbag can be managed to control the acceleration of the chest of the occupant. Most airbags have a fixed vent hole. As an alternate to providing a fixed vent hole as illustrated in the previous examples, a variable vent hole can be provided as shown in FIGS. 30 and 30A, where FIG. 30 is a partial cutaway perspective view of a driver side airbag made from film having a variable vent in the seam of the airbag. In this embodiment of an airbag, a hinged elastic member or flap 835 is biased so that it tends to maintain vent 830 in a closed position. As pressure rises within the airbag, the vent 830 is forced open as shown in FIG. 30 and FIG. 30A, which is a detail of the vent 830 shown in FIG. 30 taken along line 30A-30A of FIG. 30. This construction enables the use of a smaller inflator and also reduces the maximum chest acceleration of the occupant in a crash and more accurately controls the deceleration of the occupant. In FIGS. 30 and 30A, vent 830 contains an opening 833 formed between film layer 834 and reinforcement member 832. Film layer 831 is also sealed to reinforcing member 832. Member 835 is attached to reinforcing member 832 (via portion 837) through film 834. A weakened section 836 is formed in member 835 to act as a hinge. The elasticity of the material, which may be either metal or fiber reinforced plastic or other suitable material, is used to provide the biasing force tending to hold the variable opening closed. The variable vent can also be accomplished through controlling the flow back through the inflator assembly. This latter method is particularly useful when aspirated inflators and self limiting airbags are used. For other variable vent designs, see the discussion about FIGS. 33-42.

Figure 31:
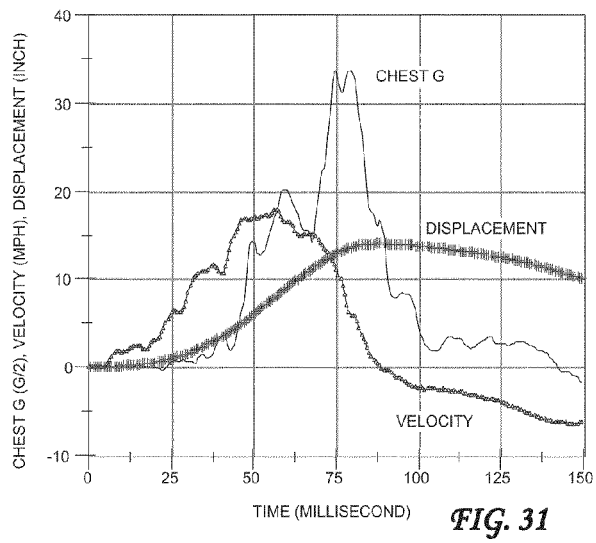
FIG. 31 shows a plot of the chest acceleration of an occupant and the occupant motion using a conventional airbag.
Figure 32:
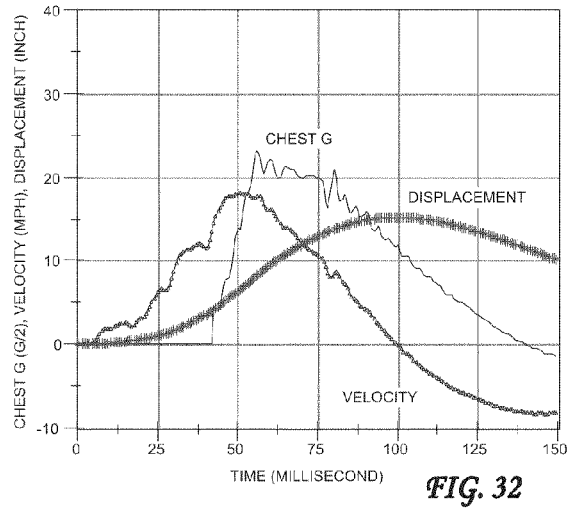
FIG. 32 shows the chest acceleration of an occupant and the resulting occupant motion when the variable orifice of this invention is utilized.

FIG. 31 shows a typical chest G pulse experienced by an occupant and the resulting occupant motion when impacting an airbag during a 35-MPH frontal impact in a small vehicle. When the variable orifice airbag is used in place of the conventional airbag, the chest acceleration curve is limited and takes the shape similar to a simulation result shown in FIG. 32. Since it is the magnitude of the chest acceleration that injures the occupant, the injury potential of the airbag in FIG. 32 is substantially less than that of FIG. 31.

Since the variable exhaust orifice remains closed as long as the pressure in the airbag remains below the set value, the inflator need only produce sufficient gas to fill the airbag once. This is approximately half of a gas which is currently produced by standard inflators. Thus, the use of a variable orifice significantly reduces the total gas requirement and therefore the size, cost and weight of the inflator. Similarly, since the total amount of gas produced by all inflators in the vehicle is cut approximately in half, the total amount of contaminants and irritants is similarly reduced or alternately each inflator used with the variable orifice airbag is now permitted to be somewhat dirtier than current inflators without exceeding the total quantity of contaminants in the environment. This in turn, permits the inflator to be operated with less filtering, thus reducing the size and cost of the inflator. The pressure buildup in the vehicle is also substantially reduced protecting the occupants from ear injuries and permitting more or larger airbags to be deployed.

Characteristics of inflators vary significantly with temperature. Thus, the mass flow rate of gas into the airbag similarly is a significant function of the temperature of the inflator. In conventional fixed orifice airbags, the gas begins flowing out of the airbag as soon as positive pressure is achieved. Thus, the average pressure in the airbag similarly varies significantly with temperature. The use of a variable orifice system as taught by this invention however permits the bags to be inflated to the same pressure regardless of the temperature of the inflator. Thus, the airbag system will perform essentially the same whether operated at cold or hot temperature, removing one of the most significant variables in airbag performance. The airbag of this invention provides a system which will function essentially the same at both cold and hot temperatures.

The variable orifice airbag similarly solves the dual impact problem where the first impact is sufficient to trigger the crash sensors in a marginal crash where the occupant is wearing a seatbelt and does not interact with the airbag. A short time later in a subsequent, more serious accident, the airbag will still be available to protect the occupant. In conventional airbags using a fixed orifice, the gas generator may have stopped producing gas and the airbag may have become deflated.

Since the total area available for exhausting gas from the airbag can be substantially larger in the variable orifice airbag, a certain amount of protection for the out-of-position occupant is achieved even when the aspiration system of the referenced '238 patent is not used. If the occupant is close to the airbag when it deploys, the pressure will begin to build rapidly in the airbag. Since there is insufficient time for the gas to be exhausted through the fixed orifices, this high pressure results in high accelerations on the occupant's chest and can cause injury. In the variable orifice embodiment, however, the pressure will reach a certain maximum in the airbag and then the valve would open to exhaust the gas as fast as the gas generator is pumping gas into the airbag thus maintaining a constant and lower pressure than in the former case. The airbag must be sufficiently deployed for the valve to be uncovered so that it can operate. Alternately, the valving system can be placed in the inflator and caused to open even before the cover opens thereby handling the case where the occupant is already against the deployment door when the airbag deployment is initiated.

Many geometries can be used to achieve a variable orifice in an airbag. These include very crude systems such as slits placed in the bag in place of round exhaust vents, rubber patches containing one or more holes which are sewn into the bag such that the hole diameter gets larger as the rubber stretches in response to pressure in the bag, plus a whole variety of flapper valves similar to that disclosed herein. Slit systems, however, have not worked well in experiments and rubber patches are affected by temperature and thus are suitable only for very crude systems. Similarly, the bag itself could be made from a knitted material, which has the property that its porosity is a function of the pressure in the bag. Thus, once again, the total amount of gas flowing through the bag becomes a function of the pressure in the bag.

Although the case where the pressure is essentially maintained constant in the bag through the opening of a valve has been illustrated, it is possible that for some applications, a different function of the pressure in the bag may be desirable. Thus, a combination of a fixed orifice and variable valve might be desirable. The purpose of adjusting the opening area of an airbag vent hole is to control the gas flow rate out of the vent hole according to the pressure inside the airbag. If the pressure is higher, then the area of the vent hole becomes larger and allows more gas to flow out. By regulating the pressure inside an airbag, the force applied on an occupant is minimized.

A superior solution to the problem is to place an acceleration sensor on the surface to the airbag that contacts the chest of the occupant, or is expected to contact the chest of the occupant or the forwardmost part of the occupant. An electronic controlled valve can then be coupled to the accelerometer and the acceleration of the chest of the occupant can be controlled to limit this acceleration below some value such as 40 Gs. Alternately, if the severity of the crash has been accurately forecast, then the airbag can provide the minimum deceleration to the occupant's chest to bring the occupant to the same speed as the vehicle passenger compartment at the time the airbag has become deflated.

When airbags are used in conjunction with an anticipatory sensor to inflate and hold occupants in their pre-crash position, they usually will not have vents for dissipating the kinetic energy of the occupants since the occupants will never attain a significant velocity relative to the vehicle. Usually, it will be desirable to retain such airbags in their inflated state for several seconds and then to deflate them to permit the occupants to egress from the vehicle. There are several methods of permitting such airbags to deflate including: opening the aspiration vent when aspirated inflators are used; electrically and/or mechanically opening the airbags when the pressure drops below atmospheric pressure; chemically, thermally melting or burning or otherwise opening a hole in such an airbag after a predetermined time period or perhaps two seconds (for example) after the vehicle motion has stopped; etc.

1.8.1 Discharge Valves for Airbags

FIG. 33 shows an airbag 841 equipped with a discharge valve 842 in accordance with a first embodiment of the invention. The discharge valve 842 is interposed between the gas-filled interior of the airbag and an atmosphere exterior of the airbag 841 so as to enable gas or other fluid from the airbag to the outlet from the interior of the airbag to the exterior atmosphere. Discharge valve 842 is situated separate and apart from an opening in the airbag 841 through which gas flows into the interior of the airbag 841.

The airbag 841 may be any airbag arranged on or in a vehicle, including but not limited to, a frontal airbag, a side airbag, a knee bolster and an externally deployed airbag.

As shown in FIG. 33A, discharge valve 842 comprises a fixed, bottom plate 843 arranged in connection with or associated with the airbag 841, e.g., on an outer layer of the material of the airbag or arranged in conjunction with the inflator, and has a pattern of openings. Bottom plate 843 may overlie one or more openings in the airbag 841. A top plate 844 is arranged over the bottom plate 843 and is movable relative to the bottom plate 843. Top plate 844 has the same pattern of openings as the bottom plate 843. Top plate 844 is mounted to a fix component in the vehicle by a spring 845 to allow for movement relative to the bottom plate 843 to thereby vary the correspondence between the openings in the top plate 844 and the bottom plate 843.

When the phrase "pattern of openings" is used to refer to the arrangement of openings in the bottom plate 843 and top plate 844, it must be understood that the openings are not required to be arranged in any discernible or specific geometric pattern. Rather, the pattern may simply be the overall arrangement of the openings.

Gas from the airbag 841 flows through the openings in the bottom plate 843 and then through the openings in the top plate 844 with the volume and/or flow rate of the gas being determined by the degree of correspondence between the openings in the top plate 844 and the openings in the bottom plate 843. That is, in a maximum gas outflow position, the top plate 844 will be in a position so that openings in the top plate 844 correspond exactly with the openings in the bottom plate 843. On the other hand, in a minimum gas outflow position, the top plate 844 will be in a position so that the openings in the top plate 844 will overlie solid portions of the bottom plate 843. Any position between these extreme positions is also possible so that the gas outflow rate is controlled by the variable position of the top plate 844 relative to the bottom plate 843.

A movement mechanism is provided to move the top plate 844 relative to the bottom plate 843 and is generally effective to move the top plate 844 to multiple positions relative to the bottom plate 843 and for variable, adjustable durations. That is, the top plate 844 can be moved from one position to another position during the discharge of gas from the airbag 841 to vary the outflow of gas during the discharge. Movement of the top plate 844 and timing of the movement of the top plate 844 may be controlled by an appropriate control system to obtain the desired outflow rate, duration and/or volume of gas from the airbag 841. The control system can be designed to consider the properties of the occupant to be protected by the airbag 841, e.g., the occupant's position, morphology, type and identification.

One embodiment of the movement mechanism comprises a piezo-electric bi-morph crystal arrangement, including a piezo-electric crystal 846, which shakes the top plate 844 back and forth (the directions of movement being indicated by A) to thereby modulate the valve openings defined by the openings in the bottom plate 843 and top plate 844. The piezo-electric crystal 846 is driven by a drive signal and associated electronics 847. The electronics 847 can be connected to or incorporated into a vehicle occupant sensor capable of determining an optimum discharge rate of the airbag 841 so that the top plate 844 is moved to achieve the optimum discharge rate.

Another movement mechanism could be an inductive actuator or motor arrangement with a cam offset (represented by motor 847A in FIG. 33B). In this case, the motion could be started during a pre-crash period and engaged with a magnetic clutch or piezo-electric clutch thereafter. A motor can also be used which is offset by the pitch of the openings and thereby achieve the possibility of regulating the valve openings defined by the openings in the top plate 844 and fixed bottom plate 843.

Referring now to FIG. 34, another embodiment of a discharge valve is shown designated generally as 848. In this embodiment, an indent or groove 849 is formed in a metal foil diaphragm 850 in a peripheral surface of the airbag 841 (see FIG. 34A), or in a surface against which the pressure in the airbag 841 is effective. A signal is fed to a circuit formed by the groove 849 so that there is a large impedance ($I^2R$) drop across the groove that melts the metal foil and thereby weakens the diaphragm 850. The pressure of the gas in the airbag 841 will then cause the weakened region to break and open a passage between the interior of the airbag 841 and the exterior. A 12 V firing signal may be preferably used.

Several grooves can be provided on the metal foil diaphragm 850 to enable different size openings to be formed. Instead of metal foil, the diaphragm may be made of any material which melts upon the formation of an electric circuit. The grooves 849 can be annular and concentric.

When multiple annular grooves or rings 849 are provided, with an associated circuit formed for each groove 849, a signal can be sent to a particular circuit to cause an opening having a pre-determined size to be formed, i.e., the weakened region will be at a set diameter from a center of the diaphragm 850. In this manner, a logic input can be used to determine what size opening is needed to provide for a controlled, appropriate discharge and then generate a signal to cause the annular groove 849 which will provide for that size opening to weaken and subsequently break upon exertion of the pressure from the gas in the airbag 841.

Referring now to FIGS. 35 and 35A, another embodiment of a discharge valve is shown. In this embodiment, the discharge valve 851 comprises an elastomer diaphragm 852 with apertures 853 therein. In a rest condition, the diaphragm 852 is flat and the apertures 853 are relatively small. However, when pressure is applied, the diaphragm 852 expands to the condition shown in FIG. 35 and the apertures 853 become larger. Gas from the interior of the airbag 841 flows to the exterior through the enlarged apertures 853. The expansion of the diaphragm 852 depends on the magnitude of the pressure of the gas in the airbag 841.

The edges of the diaphragm 852 are preferably fixed relative to the airbag 841 and may even be attached to the airbag 841. For example, the edges of the diaphragm 852 may be attached to the outer material layer of the airbag 841.

Control of the flow rate and/or volume of gas from the airbag 841 can be achieved through appropriate determination of the size and/or number of the apertures 853.

The material from which the diaphragm 852 is made is preferably pre-stretched and then die cut. Instead of an elastomer, other resilient and/or flexible materials may be used.

Referring now to FIGS. 36, 36A and 36B, in this embodiment, a discharge valve for an airbag is represented generally as 854. The discharge valve includes a fixed aperture disk 855 arranged in connection with or associated with the airbag 841 and a movable aperture disk 856 mounted over the fixed disk 855. Fixed disk 855 may overlie one or more openings in the airbag 841. Movable disk 856 has alternating solid sections 858 and open sections 857 and is connected to an arm 859. The center of disk 856 is mounted through the fixed disk 855 by a mounting pin 860, although this mounting arrangement can be eliminated and other devices for mounting the movable disk 856 relative to the fixed disk 855 employed in the invention. Arm 859 is associated with a rotation mechanism 861 to enable the arm 859 to be moved in the directions of arrow B. Movement of the arm 859 results in movement of the movable disk 856 relative to the fixed disk 855 so that the correspondence between the apertures in the fixed disk 855 and the apertures in the movable disk 856 is varied (to thereby adjust valve openings defined by the apertures in the fixed disk 855 and movable disk 856). This variation enables the discharge flow to be controlled.

The rotation mechanism 861 may be a solenoid, bi-morph piezo-electric element, ferromagnetic arrangement or drive, ferroelectric arrangement or drive or a thermal-based arrangement, e.g., a phase change metal. That is, almost any type of controllable mechanism for moving the arm 859 can be used in the invention. When a solenoid is used, application of alternating electrical current causes forward and reverse motions of the arm 859.

FIGS. 37, 37A and 37B show another embodiment of a discharge valve in accordance with the invention and is designated generally as 862. Discharge valve 862 includes a valve seat 863 formed in connection with or associated with the airbag 841 and arranged to enable flow of gas from the interior of the airbag 841 therethrough. Valve seat 863 may overlie one or more openings in the airbag 841. A valve member 864 engages with the valve 863 and a valve spring 865 is arranged to provide a biasing force to press the valve member 864 toward the airbag 841 to close the opening(s) formed by the valve seat 863 and valve member 864.

FIGS. 38, 38A and 38B show another embodiment of a discharge valve for an airbag in accordance with the invention which is designated generally as 866. Discharge valve 866 includes a substrate 867 having three or more spiral cuts 868 arranged to form cantilevered arms 869 that will deflect under pressure. The cantilevered arms 869 may be die cut into the material of the airbag 841. Multiple spiral arms thus form a plurality of springs. In operation, the pressure of the gas in the interior of the airbag 841 will urge the arms 869 upward (from the position as shown in FIG. 38 to the position as shown in FIG. 38A) thereby opening the cuts to form passages at the locations of the cuts 868.

Instead of die cutting the cantilevered arms 869 into the material of the airbag 841, a dedicated diaphragm may be provided in connection with an outer material layer of the airbag 841 and cuts made in this diaphragm.

FIGS. 39, 39A and 39B show another embodiment of a discharge valve for an airbag in accordance with the invention which is designated generally as 870. Discharge valve 870 includes a substrate 871 cut in a specific manner to define a square cantilevered spring matrix having a central region 872 and cantilevered arms 873 that will deflect under pressure. The cantilevered arms 873 may be die cut into the material of the airbag 841. Multiple spiral arms thus form a large spring valve. In operation, the pressure of the gas in the interior of the airbag 841 will urge the arms 873 upward from the position as shown in FIG. 39 to the position as shown in FIG. 39A) thereby raising the central region 872 and opening passages between the interior of the airbag 841 and the exterior.

Instead of die cutting the cantilevered arms 873 into the material of the airbag 841, a dedicated diaphragm may be provided in connection with an outer material layer of the airbag 841 and cuts made in this diaphragm.

Referring now to FIGS. 40A and 40B, instead of plates having a pattern of openings interposed between the airbag interior and airbag exterior, a pair of cylinders could be used.

As shown in FIGS. 40A and 40B, an inner cylinder 874 has a pattern of openings and is positionable inside an outer cylinder 875 such that the pattern of openings in the outer cylinder 875 are in alignment with the pattern of openings in the inner cylinder 874. Outer cylinder 875 is coupled to a motor 876 or other actuating device for moving the outer cylinder 875 in a stroked manner in the direction of arrow A, in which case, the outer cylinder 875 is moved up and down relative to the inner cylinder 874 (FIG. 40A). The pattern of openings in the inner cylinder 874 may completely align with the pattern of openings in the outer cylinder 875 when the outer cylinder 875 is fully in the up position.

The motor 876 is controlled by a gas discharge rate determination unit 880, e.g., a processor containing an algorithm relating the desired gas discharge rate to the required action of the motor 876 to move the outer cylinder 875 to provide for the desired gas discharge rate. Such an algorithm may be determined experimentally or empirically. The gas rate determination unit 880 is provided with or determines the desired gas discharge rate through input from a detection unit 881 which detects, measures or determines the morphology of the occupant to be protected by the airbag, the type of occupant, the identification of the occupant, the position of the occupant and/or the severity of the crash. Any of these factors, or combinations of these factors, may be used in the determination of the discharge rate to optimally protect the occupant in a crash. The discharge rate determination unit 880 and detection unit 881 may be used in any of the embodiments described herein.

As shown in FIG. 40B, a motor or other actuating device 876 may rotate the outer cylinder 875 in the direction of arrow B relative to the inner cylinder 874, in which case, the inner cylinder 875 is situated within the outer cylinder 875. The openings in the outer cylinder 875 may align fully with the openings in the inner cylinder 874 (in which case the valve is in the full discharge position) or align with material between the openings in the inner cylinder 874 (in which case the valve is in the full blocked-discharge position). Between these extreme positions is a wide range of variations in the discharge of the gas in the airbag.

Instead of having the outer cylinder 875 move relative to the inner cylinder 874, the reverse situation could also be used, i.e., move the inner cylinder relative to the stationary outer cylinder, in which case, the outer cylinder would be fixed to the airbag since the stationary cylinder is preferably fixed to the airbag. Also, as shown, the airbag interior is on the side of the outer cylinder 875 and the airbag exterior is on the side of the inner cylinder 874 so that gas is discharged from the airbag first through the openings in the outer cylinder 875 and then through the openings in the inner cylinder 874. The reverse situation could also be used. Thus, in general, the set of openings of one cylinder is in flow communication with the interior of the airbag and the set of openings in the other cylinder is in flow communication with the exterior of the airbag so that the degree of registration or alignment between the openings determines the discharge rate of gas from the airbag.

Figure 41A:
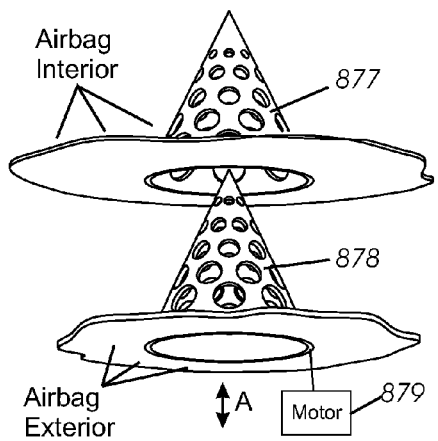
FIGS. 41A and 41B are sketches of variations of a valve in accordance with the invention showing the use of a cone-shaped valve.
Figure 41B:
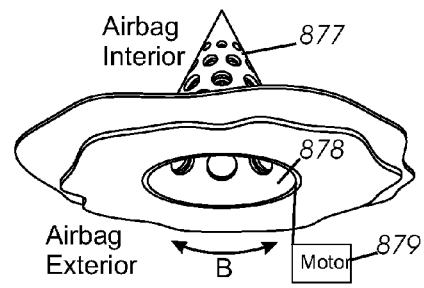

Referring now to FIGS. 41A and 41B, instead of plates or cylinders having a pattern of openings interposed between the airbag interior and airbag exterior, a pair of cones could be used.

As shown in FIGS. 41A and 41B, an outer cone 878 has a pattern of openings and is positionable inside an inner cone 877. Outer cone 878 is coupled to a motor 879 or other actuating device for moving the outer cone 878 in a stroked manner (the directions of movement being indicated by A), in which case, the outer cone 878 is moved up and down relative to the inner cone 877 (FIG. 41A). The pattern of openings in the outer cone 878 may completely align with the pattern of openings in the inner cone 877 when the outer cone 878 is fully in the up position.

In the alternative, as shown in FIG. 41B, the motor or other actuating device 879 may rotate the outer cone 878 (the directions of rotation being indicated by B) relative to the inner cone 877, in which case, the outer cone 878 is situated almost entirely within the inner cone 877. The openings in the outer cone 878 may align fully with the openings in the inner cone 877 (in which case the valve is in the full discharge position) or align with material between the openings in the inner cone 877 (in which case the valve is in the full blocked-discharge position). Between these extreme positions is a wide range of variations in the discharge.

Instead of having the outer cone 878 move relative to the inner cone 877, the reverse situation could also be used, i.e., have the inner cone move relative to the outer cone, in which case, the outer cone would be fixed to the airbag since the stationary cone is preferably fixed to the airbag. Also, as shown, the airbag interior is on the side of the inner cone 877 and the airbag exterior is on the side of the outer cone 878 so that gas is discharged from the airbag first through the openings in the inner cone and then through the openings in the outer cone. The reverse situation could also be used. Thus, in general, the set of openings of one cone is in flow communication with the interior of the airbag and the set of openings in the other cone is in flow communication with the exterior of the airbag so that the degree of registration or alignment between the openings determines the discharge rate of gas from the airbag.

Figure 42:
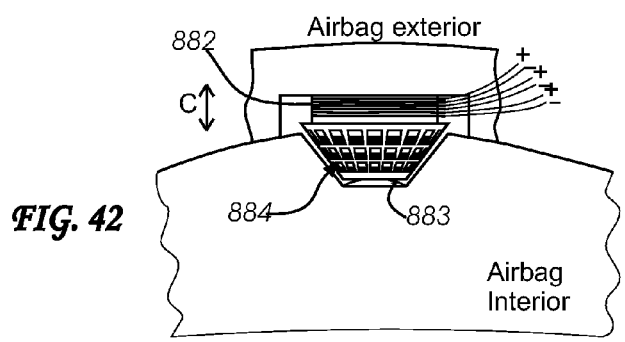
FIG. 42 is an illustration of a discharge valve including stacked drive elements.

FIG. 42 is an illustration of a discharge valve including stacked drive elements. A spring 883 biases the cone 884 to the open discharging position. A stack of bimorph piezoelectric washers 882 when activated close the valve shutting off the flow out of the airbag.

The discharge valves described above can be used individually or in combination in a single airbag. To the extent possible, the discharge valves can also be connected and controlled by a control system which tailors the outflow rate through the discharge valve to the properties of the occupant. That is, an occupant sensor is provided in the vehicle to measure or determine one or more properties of an occupant and then the control system considers the measured or determined properties when determining the desired, optimum gas outflow rate and controls the discharge valve accordingly. The control system may also consider the properties of the crash as determined by one or more crash sensors and associated circuitry. Such properties include the velocity change of the crash, the acceleration of the crash and the direction of impact.

The examples shown generally illustrate the placement of the valve in association with the fabric of the airbag, i.e., at a location on or against the fabric of the airbag over a discharge opening different from the inlet opening of the airbag which is coupled to the inflator structure or inflation mechanism of the airbag. Alternately, the valve can be placed on other structure that is in fluid communication with the interior of the airbag. Such structure can be part of, for example, the inflator structure or inflator of the airbag.

With respect to the drive elements which move one member having openings relative to another, e.g., a plate, cylinder and cone, stacked drive elements could be used. That is, a stack of piezoelectric, ferroelectric or phase change alloy elements may be used to provide a short stroke with a high modulation force and millisecond response time. Also, to increase response time into the millisecond range, a high force pre-load with a mechanical spring and an escarpment mechanism for triggering the discharge valve could be used. A poppet-type valve that uses the available air pressure to obtain gain over a single stage valve may be also be used in accordance with the invention Any of the valves described in International Patent Publication No. PCT/RU02/00225 could also be used in accordance with the invention in its various forms. This publication describes a safety device installed inside a vehicle having an inflatable airbag having an inlet for receiving gas filling the airbag to its ready state, and a system for supplying gas to the airbag, including a gas source, a valve device, and a triggering unit. The valve device is formed by a pneumatic distributor having two stable positions: an open position wherein gas from the gas source is fed to the airbag through its inlet, and a closed position wherein the gas flow through the airbag inlet is interrupted.

Although multiple embodiments of discharge valves are described above, features of each can be used in the other embodiments. Also, a vehicle can be manufactured with different discharge valves for different airbags. Airbags including any of the discharge valves described above, or any combinations of the discharge valves described above, are also within the purview of the invention.

The discharge valve of an airbag in accordance with the invention can be controlled based on any number of criteria, including but not limited to the morphology of the occupant to be protected by the airbag (e.g., weight, height, etc.), the position of the occupant (either the current position or an extrapolated future position at which the occupant will be at the time of airbag deployment), the severity of the crash requiring airbag deployment, the type of occupant (i.e., adult, occupied or unoccupied child seat, rear-facing child seat, front-facing child seat, child, pet, etc.), the direction of the crash, the position of the seat or any part thereof, and the identification of the occupying items in the vehicle. These criteria may be used individually or in combination to determine the appropriate control of the gas discharge rate of the airbag.

The gas discharge rate of the airbag is controlled by controlling the motor or other actuating device. To this end, the operation of the motor is studied to determine the degree of alignment of the openings in the movable member and the fixed member and thus the gas flow through the openings, if any, for different positions of the movable plate. Then, in operation, the motor is controlled to move the plate in the required manner to provide for the desired gas discharge rate.

1.9 Airbags with a Barrier Coating

Note most of the following section was taken from U.S. Pat. No. 6,087,016 and U.S. Pat. No. 6,232,389 which describe barrier coatings in general but not for application to airbags. Quotation marks have been omitted for easier reading.

I. Barrier Coating Mixtures

A barrier coating mixture according to this invention includes the following components in a carrier liquid (i.e., aqueous or solvent):

(a) an elastomeric polymer;

(b) a dispersed, exfoliated layered platelet filler having an aspect ratio greater than 25; and (c) at least one optional surfactant, wherein the solids content is desirably below 30% solids and the ratio of polymer (a) to filler (b) is between about 20:1 and 1:1. These barrier coating mixtures result in films with reductions in permeability of 5 times to 2300 times relative to the unfilled polymer. These results are substantially higher than the prior art on other platelet filled barrier coatings.

The barrier coating mixtures used in the invention are selected by balancing several critical features, i.e., appropriate dispersion of the filler in the elastomeric polymer, orientation of the filler platelets in the elastomeric polymer, as well as high aspect ratio of the filler, in order to achieve the desired permeability reductions and flexibility in the dried barrier coating and in the airbags. These characteristics are demonstrated by the data shown in FIG. 43. The barrier coating mixture of this invention desirably contains an unusually low solids content, i.e., between about 1% and about 30% solids. A more desirable range of solids content is between about 5% to about 17% solids.

The solids content is an important consideration in the barrier coatings compositions and performance of the dried coatings because the solids content effects the dispersion of the high aspect ratio filler. If a high total solids content is used in the barrier coating composition, one would not achieve well-dispersed filler, e.g., vermiculite, and the permeability reductions characteristic of the coatings of this invention are not achieved. The preferred range of solid content (5%-17%) is unexpectedly well below that typically used in the coating industry and therefore not predicted by the prior art teachings concerning barrier coatings formulations. This is especially true of the airbag industry where no such fillers are used prior to the teachings of this invention.

The relationship between the percentage of solids in the coating composition to the weight percent of filler in the resulting dried coating is an unexpectedly important issue in obtaining desired barrier coatings of this invention. For example, in embodiments in which the barrier coating composition contains as the elastomeric polymer, butyl rubber (Lord Corporation), and as the filler, MICROLITE® 963++ vermiculite solution (W.R. Grace & Co.), FIG. 44 illustrates a range of maximum total solids that can be used in the coatings formulation of this invention without resulting in agglomeration and other negative effects on the dried coating (i.e., film) properties as a function of the fraction of the total solids made up by the filler.

In one embodiment, where the MICROLITE® filler is at 5%, the maximum solids is about 16%; in another wherein the filler is 25%, the maximum solids is about 9%. In still another embodiment, where the filler is about 50%, the maximum solids is about 5%. Other examples fall within those ranges, as indicated in FIG. 44. The results shown in FIG. 44 are based on the formulations used in Examples 9-12 set forth in U.S. patent application Ser. No. 10/413,318 incorporated by reference herein.

Figure 44:
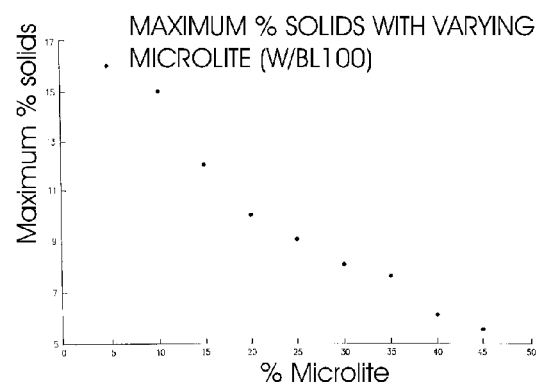
FIG. 44 is a graph illustrating the maximum percentage solids and butyl latex (BL100™) to filler ratio vs. percentage by weight of MICROLITE® vermiculite in coating compositions of the invention.
Figure 45:
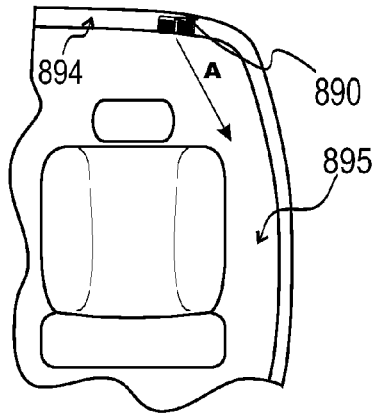
FIG. 45 is a partial cross section of a vehicle passenger compartment illustrating a curtain airbag in the folded condition prior to deployment.
Figure 46:
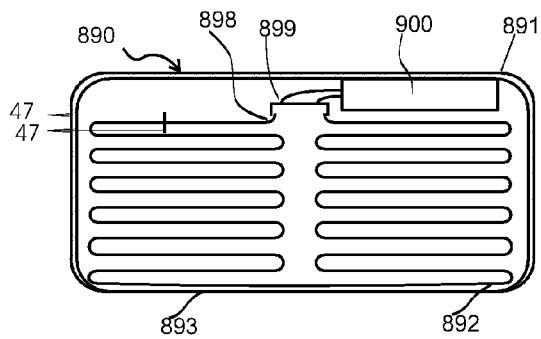
FIG. 46 is an enlarged view of airbag module shown in FIG. 45.

The unusually low solids contents described in FIG. 44 for a butyl-containing polymer latex are also applicable to other elastomeric polymer latexes, as well as to elastomeric polymers in carrier liquids which also contain other solvents or co-solvents. One of skill in the art will understand the need to make some alterations in the maximums provided by FIG. 44 for other formulations of barrier coatings of this invention taking into account changes in electrolyte concentration, surfactants, grade and composition of vermiculite or other filler, and grade and composition of polymeric latex or other elastomeric polymer in a carrier as described herein.

If desired, the solids content of the barrier coating mixtures can be further adjusted to levels below the maximums shown in FIG. 44 using thickeners, in order to adjust the final film thickness, as well as to adjust the suspension rheology. See, for example, Examples 14-15 of the '318 application which demonstrate the increase in viscosity from 4.5 cP to 370 cP using PVOH terpolymer; and Example 16 of the '318 application which similarly increases viscosity using lithium chloride as a thickener. Other conventionally used thickeners may also be useful.

The solids content of the coating mixtures of this invention is preferably based upon a preferred polymer to filler ratio of between about 20:1 to about 1:1, more preferably 9:1 to 1:1, particularly when the polymer is a butyl-containing polymer such as a butyl latex, and the filler is a vermiculite solution. Examples 9-12 of the '318 application indicate a variety of desirable compositions of this invention characterized by a polymer to filler ratios within the above range, over a range of solids contents, polymer contents by weight and filler contents by weight.

Preferably, in the dried barrier coating (film), the polymer is present at between about 45 to about 95 by weight and the dispersed layered filler is present at between about 5 to about 55% by weight.

A. The Elastomeric Polymer

Elastomeric polymers useful in forming coating mixtures of this invention include polymers selected generally from among many classes. The selected polymers may be curable polymers, partially cured polymers, or uncured polymers, and may be soluble in water or a solvent. Such polymers include, without limitation, olefinic thermoplastic elastomer (TPO); polyamide thermoplastic elastomer (Polyamide TPE); polybutadiene thermoplastic elastomer, e.g., syndiotactic 1,2-polybutadiene thermoplastic elastomer (polybutadiene TPE); polyester thermoplastic elastomer (Polyester TPE); polyurethane thermoplastic elastomer (TUPR), for example, thermoplastic polyester-polyurethane elastomer (TPAU), and thermoplastic polyether-polyurethane elastomer (TPEU); styrenic thermoplastic elastomer (Styrenic TPE); vinyl thermoplastic elastomer, e.g., polyvinyl chloride polyol (pPVC).

A variety of rubbery polymers (curable, partially cured, or uncured) may also be employed as the polymer component of the present invention, including acrylic rubber, such as ethylene-acrylate copolymer (EACM); and butadiene rubber, such as polybutadiene. Butyl-containing polymers useful in forming coating mixtures of this invention include, without limitation, curable, partially cured, or uncured polymers: butyl rubber, such as isobutylene-isoprene copolymer (IIR); bromobutyl rubber, e.g., bromoisobutylene-isoprene copolymer (BIIR); chlorobutyl rubber, e.g., chloroisobutylene-isoprene copolymer (CIIR); and isobutylene rubber. Butyl rubber is defined as a poly(isobutylene) homopolymer or a copolymer of poly(isobutylene) with isoprene. Modified butyl rubbers include halogenated poly(isobutylene) and its copolymers and isoprene. Additional polymers or copolymers that contain more than 50% isobutylene are also useful in the practice of this invention, for example, poly(isobutylene-co-acrylonitrile), etc. Other butyl-containing polymers which are curable, partially cured or uncured, may be readily selected by one of skill in the art.

Still other useful elastomeric polymers are chlorosulfonated polyethylene rubber, e.g., chlorosulfonated polyethylene (CSM); epichlorohydrin rubber, such as polyepichlorohydrin (CO), polyepichlorohydrin copolymer (CO copolymer); ethylene-propylene rubber (EPR), such as ethylene-propylene copolymer (EPM), ethylene-propylene-diene copolymer (EPDM).

Other polymers for such use include fluoroelastomers, such as vinylidene fluoride-hexafluoropropylene copolymer (FKM); natural rubber (NR); neoprene rubber such as polychloroprene (CR); nitrile rubber, such as acrylonitrile-butadiene copolymer (NBR); polyisoprene rubber (PI); polysulfide rubber; polyurethane, such as polyester urethane (AU), and polyether urethane (EU); propylene oxide rubber; silicone rubber, such as silicone (MQ), and methylvinyl-fluorosilicone (FVMQ) and styrene-butadiene rubber, such as styrene-butadiene copolymer (SBR).

The polymer is preferably capable of forming a solution, dispersion, latex, suspension or emulsion in water or a solvent, or a mixture thereof. Specifically exemplified below is a coating mixture of the invention employing as the elastomeric polymer, butyl latex. A suitable commercially available butyl latex for use in the compositions of this invention is Lord® BL-100 butyl latex, which is a 62% by weight aqueous butyl latex solution [Lord Corporation]. Another suitable butyl latex, the use of which is illustrated in Example 10 of the '318 application, is Polymer Latex ELR butyl latex, a 50% butyl latex solution (Polymer Latex). Still another suitable polymer is a 51.7% bromo-butyl latex solution available from Polymer Latex (see Examples 11-12 of the '318 application). These latexes contain an ionic surfactant package which stabilizes the latex and effects the performance of the barrier formulation. Other butyl latexes are anticipated to be similarly useful if combined with similar ionic surfactants. Preferably, the selected polymer is present in the dried coating mixture at a minimum of about 45% by weight of the dried compositions.

B. The Filler

Figure 43:
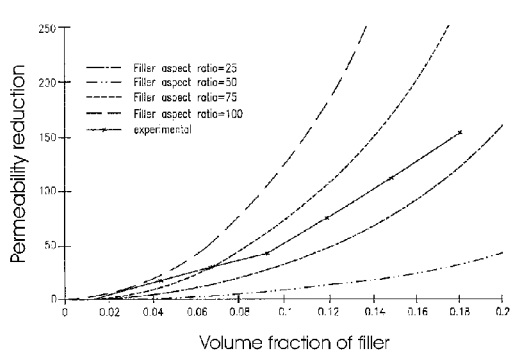
FIG. 43 is a "Cussler" model graph indicating the effective aspect ratios achieved by compositions of this invention. The graph plots reduction of permeability vs. volume percentages of filler in barrier coating mixtures of the present invention. Cussler describes several models for the permeability reduction due to oriented layered fillers, which depend on the microstructure expected. For simplicity, this invention employs the equation: $Pu/P=[1+(a2\times2)/(1-X)]/(1-X)$, where P is the permeability of the filled material, Pu is the permeability of the unfilled material; a is the aspect ratio of the filler particles; X is the volume fraction of the filler particles in the coating. Cussler's theoretical curves for fillers with aspect ratios of 25, 50, 75, and 100 are present on the graph. The thick "experimental" data line records the experimental data points for the barrier coating mixtures. Effective aspect ratios can be estimated from the position of the data relative to the theoretical curves.

The coating mixtures of this invention as described above also include a dispersed layered filler which, upon mixture, has an inherently high aspect ratio, which can range from about 25 to as high as about 30,000. The presently preferred filler is vermiculite. More particularly, a desirable vermiculite is MICROLITE® 963++water-based vermiculite dispersion (W. R. Grace) [see, EP Application No. 601,877, published Jun. 15, 1994] which is a 7.5% by weight aqueous solution of dispersed mica. One novel aspect of the mixtures of the present invention is the effective aspect ratio of the selected filler in the dried coating. According to this invention, in the dried coating, the filler remains substantially dispersed, thereby having a "high effective aspect ratio", as shown in FIG. 43. FIG. 43 assumes high levels of orientation.

Preferably, the effective aspect ratio of the filler in the compositions of this invention is greater than 25 and preferably greater than about 100, although higher ratios may also be obtained. In embodiments in which orientation is not high, the effective aspect ratio required for large reductions in permeability will be higher than 100. In the coating mixtures (the liquid), the layered filler is present at between about 1 to about 10% by weight of the total mixture. In the dried coatings of this invention, the layered filler is present at a minimum of about 5% by weight to a maximum of about 55% of the dried coating. The compositions of the present invention, when dried, retain the filler in well-dispersed form, resulting in a high effective aspect ratio of the dried coating, and greatly increased reduction in permeability, as illustrated in FIG. 43.

MICROLITE® vermiculite is the preferred filler because of its very high aspect ratio. The vermiculite plates have an average lateral size of between 10 and 30 microns. The plates are largely exfoliated in water, and thus their thickness is 1-2 nm. The aspect ratio of the filler in water dispersion is an average of 10,000-30,000. It is clear that many plates reassemble during the coating and drying process of the present invention, thus reducing the effective aspect ratio achieved in the final coating. However, it is a great advantage to start with as large an aspect ratio as possible.

Although MICROLITE® 963++vermiculite (W. R. Grace) is preferred, good results may also be achieved with less exfoliated grades of MICROLITE® vermiculite (i.e., grades 963, 923, and 903). Other layered silicates are also useful in the barrier coatings and films of this invention. The effectiveness of other silicates in the barrier coating of this invention depends upon the lateral size of the platelets, the degree of exfoliation in water, and the degree to which they reassemble to form larger particles during the coating and drying process. Examples of other layered silicates include bentonite, vermiculite, montmorillonite, nontronite, beidellite, volkonskoite, hectorite, saponite, laponite, sauconite, magadite, kenyaite, ledikite and mixtures of the above silicates. The selection and use of other known silicates which have properties similar to those of MICROLITE® vermiculite, as well as sufficiently high aspect ratios, are expected to be obvious to one of skill in the art following the teachings of this invention.

C. Surfactants and Other Additives

Coating mixtures used in the invention, particularly those useful on surfaces and interfaces according to this invention, also preferably contain at least one or more suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant.

Preferably, the surfactant(s) useful in the methods and solutions of this invention are nonionic, particularly useful with a highly charged filler, such as vermiculite. In the event of an unfavorable interaction of the anionic emulsifier present in the butyl latex dispersion [Lord], which is a presently preferred source of the butyl-containing polymer, any additional ionic additives must be kept to a minimum. This variable is eliminated where the surfactant or emulsifier is non-ionic. Increase in ionic concentration of the compositions containing vermiculite, such as by the addition of a base to adjust pH, e.g., LiOH, $NH_4OH$, and NaOH can cause agglomeration of the filler, which adversely affects permeability reduction.

Some embodiments of this invention include at least two surfactants, which include preferably both a wetting agent and an anti-foaming agent. Still other compositions may have additional surfactants to perform additional effects. Desirable surfactants employed in the examples of the '318 application are the non-ionic siloxane-based, Silwet® L-77 wetting agent [OSI Specialties, Inc.], the BYK®-306 wetting/leveling agent [BYK Chemie], FOAMASTER® VL defoamer (Henkel), and the DC200® anti-foaming agent [Dow Corning], among others. As exemplified below, an antifoaming agent may be predispersed in solution with, e.g., 1-methyl-2-pyrrolidinone (NMP) because some antifoaming agents are not soluble in the barrier coating.

Other suitable surfactants may also be selected. The amount and number of surfactants added to the coating solution or composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 10% by weight of the dried coating.

In another embodiment, thickeners may be used in the coating formulations to adjust viscosity. Such thickeners may include, without limitation, a polyvinyl alcohol (PVOH) terpolymer, e.g., polyvinylbutyral/polyvinylacetate/polyvinylalcohol or a lithium chloride thickener. In one embodiment, the viscosity of the coating mixture can be increased from 4.5 cP to 370 cP with the addition of the PVOH terpolymer to the formulation as illustrated in Examples 14-15 of the '318 application. For example, for a coating mixture containing 10% total solids with 2% MICROLITE® vermiculite formulation, a thickener such as PVOH terpolymer can be added in an amount of between about 3% to about 5.5% by weight. Desirably the thickener is added in an amount of greater than 3.5% by weight. A preferred range of thickener is between about 5 and 5.5% by weight.

It has been noted that greater than 5.5% by weight of PVOH terpolymer thickener can cause agglomeration of the filler platelets. As another example, the viscosity of the coating mixture can also be increased with the addition of lithium chloride as a thickener to the coating mixture, (See e.g., Example 16 of the '318 application). For example, for a coating mixture containing 10% total solids with 2% MICROLITE®, the thickener is employed in an amount between about 3% to about 5% by weight. Desirably greater than 4% thickener is employed, and more desirably 5% thickener is employed. Greater than 5% by weight of the lithium chloride thickener produces poor barrier properties. One of skill in the art would readily determine and adjust the type and amounts of thickener depending on the type and amount of filler employed in the coating mixture based on the teachings contained herein.

Still other optional components of the barrier coating are components which effect curing of the coating. For example, one type of cure "package" contains about 10 to about 30% by weight zinc oxide, about 5 to about 20% by weight sulfur, about 30 to about 60% by weight water, about 0.1 to about 10% of a dispersing agent, about 5 to about 20% of zinc dibutyldithio-carbamate and about 1 to about 10% zinc 2-mercaptobenzothiazole. The amount of cure package added to the coating mixture is based on the amount of butyl rubber in the coating mixture.

In one embodiment, greater than 10 parts dried cure package is added per 100 parts butyl rubber in the coating mixture. A desirable amount of dried cure package is about 15 parts cure package per 100 parts butyl rubber in the mixture. One of skill in the art can readily design a cure "package" to enhance the curing of a butyl latex barrier coating mixture of this invention, and select a desirable amount to be added to the coating mixture, based on the teachings of this specification combined with the knowledge of the art. See, e.g., U.S. Pat. No. 4,344,859.

D. The Carrier Liquid

The coating mixtures of this invention are present in a suitable carrier liquid. Carriers which are suitable for use in the composition of this invention include, without limitation, water and solvents such as hexane, heptane, toluene, 1 methyl-2-pyrrolidinone, cyclohexanone, ethanol, methanol, and other hydrocarbons. Combinations of water with an organic carrier may also be used as the carrier liquid. Selection of a suitable organic solvent carrier is within the skill of the art.

E. Specific Embodiments of Barrier Mixtures

One example of a barrier coating mixture useful for application to substrates such as a fabric portion of an airbag and in particular a side curtain airbag according to this invention comprises coating formed by a barrier coating mixture comprising in a carrier liquid: (a) an elastomeric polymer; (b) a dispersed exfoliated layered platelet filler preferably having an aspect ratio greater than 25; and optionally (c) at least one surfactant. The elements are selected so that the solids content of the mixture is less than about 30% and the ratio of the polymer to the filler is preferably between about 20:1 and about 1:1. These barrier coating mixtures result in films with reductions in permeability of 5 times to 2300 times relative to the unfilled polymer. These results are substantially higher than the prior art on other platelet filled barrier coatings or any airbag coatings.

Another barrier coating mixture which is desirable for application to a fabric portion of an airbag according to this invention includes the following components in a carrier liquid, (a) a butyl-containing polymer latex; (b) a dispersed exfoliated layered vermiculite filler preferably having an aspect ratio about 1000 or greater; and optionally (c) at least one surfactant. The components are selected such that the solids content of the mixture is less than abut 17% and the ratio of the polymer to the filler is between about 20:1 and about 1:1.

In a preferred embodiment, the coating mixtures described above have solids contents of between about 5% to about 15% by weight, and form dried coatings on the airbag surface that comprise between about 45% to about 95% by weight of the polymer, between about 5% to about 55% by weight of the filler, and between about 1.0% to about 10% by weight of the surfactant(s). The dried coatings of the mixtures described above, contain fillers which preferably exhibit an effective aspect ratio of greater than about 25, reduces the gas, vapor or chemical permeability greater than 5-fold that of the dried, unfilled polymer alone. Preferably, the effective aspect ratio of the dried coatings is greater than about 50, and even greater than about 100.

One preferred coating mixture useful in this invention has a solids contents of between about 5% to about 15% by weight and the dried coating comprises between about 65% to about 90% by weight of a butyl-containing polymer latex, between about 10% to about 35% by weight of a vermiculite filler, between about 0.1% to about 0.10% by weight an anti-foaming agent as surfactant, with the total surfactant weight percent up to about 15%. As described in examples in the '318 application, the selected polymer is the elastomer butyl rubber or butyl latex, e.g., Lords BL-100 butyl latex in a 62% by weight aqueous butyl latex solution [Lord Corporation]. Additional preferred barrier coating mixtures useful in this invention may be prepared by methods described in detail in Examples 1-12 and 14-16 of the '318 application.

2. The Coated Article

Once prepared as described in detail in the Examples in the '318 application, the coating mixtures may be applied to a portion of fabric which will be incorporated into or sewn to form an airbag of a vehicle, to reduce the permeability of the fabric to gas, vapor (moisture) or chemicals. The dried coating, in which the filler exhibits an effective aspect ratio of greater than about 25, reduces the gas, vapor or chemical permeability greater than 5-fold that of the dried, unfilled polymer alone. In the dried coating, more preferably, the polymer is present in the mixture when dried at a weight percent of at least about 45%. The filler is preferably present in the mixture when dried at greater than about 5% by weight. These barrier films achieve reductions in permeability of 5 times to 2300 times relative to the unfilled polymer. These results are substantially higher than the prior art on other platelet filled elastomers.

Preferably, the effective aspect ratio of the dried coating is greater than about 50, and even greater than about 100. As indicated in Examples 1-12 of the '318 application, reductions in permeability attributed to compositions of this invention can range from approximately 5 times to 2300 times that of unfilled polymer alone.

The coating compositions used in the invention may be applied on the inside of the fabric, i.e., on a portion of the fabric which, once the airbag is formed, will face the interior gas-receiving compartment of the airbag. The coating is applied by standard techniques, with spray coating and dip coating likely to be the most effective.

The present invention substantially reduces the weight of a side curtain airbag, for example, by providing equivalent sealing of the fabric thereby reducing the flow of the inflation gas through the material using substantially less sealing material. Typically, the weight of the sealant is reduced by a factor of five or more. However, much of the leakage occurs through the seams and sealing the fabric will not reduce this leakage. Most side curtain airbags are currently sealed at the edges by sewing or interweaving where the entire airbag is woven at once. In the first case, the sewing threads make holes in the fabric and serve as a path for gas leakage. In the second case, interweaving results in a leakage path since when the airbag is pressurized the stresses in the seams separate the threads at the joints again creating leakage paths. A preferred method is to heat or adhesive seal the pieces of fabric together and to do so over an extended seam width thereby eliminating the leakage paths. Since such seals are often weaker than a sewn or woven seam, careful attention must be given to the design of the airbag chambers to prevent stress concentrations in the seams. This frequently requires a finite analysis and redesign of the individual chambers in order to eliminate such stress concentrations.

The airbag may be formed completely by interweaving, heat sealing or sewing of the layers before the barrier coating is applied. Currently, airbags are often formed this way but without a barrier coating. In general, any known technique for manufacturing an airbag can be applied to make an airbag in accordance with the invention, i.e., an airbag made of one or more substrates and a barrier coating.

A selected barrier coating mixture, such as those described above may be applied to a surface or interface of a fabric section to be incorporated into an airbag to accomplish a variety of purposes in the airbag manufacturing industries to reduce the permeability of the airbag to gas, vapor or chemicals.

3. Methods of Coating a Substrate or Forming a Film

The fabric sections to be coated by the compositions of the invention may be previously untreated or may have a variety of pre-treatments to their surfaces. For example, the fabric sections may have on at least one side a heat seal layer. Such heat seal layers may be made of an ethylene-propylene copolymer or ethylene-propylene-butylene terpolymer. Thus, the coating solution is applied on the surface of the heat seal layer. Alternatively, the fabric sections may comprise a protective topcoat layer, such as polyurethane or Teflon®-type materials [DuPont] for abrasion resistance, etc. Such topcoats may be selected by one of skill in the art. The coatings of this invention may be applied over or under the topcoat layer.

Alternatively, the article may be cured prior to application of the coating, or it may be cured following application of the coating on the appropriate surface.

To form the coated article of this invention, the application of the selected barrier coating mixture may be accomplished by techniques including, without limitation, roller transfer or paint coating, spray coating, brush coating and dip coating. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a fabric substrate, such as an exterior or interior surface, an interface, or component of the airbag, at any desired thickness. Thus, for example, the coating mixtures of the present invention may be applied to the surface of fabric sections by the methods described above to form a dried coating of a thickness between about 0.1 (m to about 100 (m of dry coating. Such adjustments to thickness are well within the skill of the art [see, e.g., Canadian Patent No. 993,738].

After coating, the coated airbag, may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. After drying, the exfoliated silicate filler particles are oriented within the elastomeric latex (solution, emulsion, etc.) to a high degree parallel to each other and to the airbag substrate surface. One of skill in the art can readily adjust the drying conditions as desired. The performance of the dried barrier coating is insensitive to drying temperatures over the range 25-160° C.

The dried coatings exhibit a surprising reduction in permeability compared to the prior art and particularly compared to unfilled polymers.

The dried coating preferably maintains its low permeability after repeated mechanical loading and elongation up to about 10% of the airbag. The evaluation of the coating integrity after exposure to repeated loading and elongation was examined as described in Example 17 of the '318 application.

The coatings and methods of the present invention described above may be applied to the manufacture or repair of airbags to improve air or gas retention. The barrier coatings may allow reduced mass, reduced gas permeability resulting in better air retention, reduced thermo-oxidative degradation, and enhanced wear and elongation of the useful life of the article.

Referring now to FIGS. 45, 46, 47A and 47B, an airbag module in accordance with the invention is designated generally as 890 and comprises a module housing 891 in which an airbag 892 is folded. The housing 891 may be arranged in any vehicle structure and includes a deployment door 893 to enable the airbag 892 to deploy to protect the occupants of the vehicle from injury. Thus, as shown, the housing 891 may be mounted in the ceiling 894 of the vehicle passenger compartment 895 to deploy downward in the direction of arrow A as a side curtain airbag to protect the occupants during the crash.

Figure 47A:
FIGS. 47A and 47B are cross-sectional views taken along the line 47-47 in FIG. 46.

As shown in FIG. 47A, one embodiment of the airbag 892 comprises a substrate 896 and a barrier coating 897 formed on the substrate 896, either on the inner surface which will come into contact with the inflation fluid or on an outer surface so that the barrier coating 897 will come into contact only with inflation fluid passing through the substrate 896. The airbag 892 may be formed with any of the barrier coatings described herein. In one embodiment, a flat sheet of the substrate 896 would be coated with the barrier coating 897 and then cut to form airbags having an edge defining an entry opening for enabling the inflation of the airbag. The edge 898 of the airbag 892 would then be connected, e.g., by sealing, to a part 899 of the housing 891 which defines a passage through which the inflation fluid can flow into the interior of the airbag 892 (see FIG. 46). The inflation fluid may be generated by an inflator 900 possibly arranged in the module housing 891.

Figure 47B:
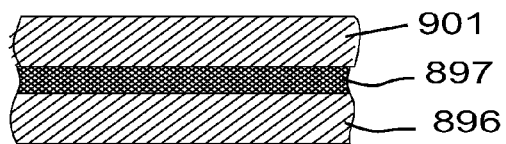

In the embodiment shown in FIG. 47B, the barrier coating 897 is placed between two substrates 896, 901. Any number of substrates and barrier coatings can be used in the invention. Also, the number of substrates and barrier coatings can be varied within a single airbag to provide additional substrates and/or barrier coatings for high stresses areas.

Figure 48:
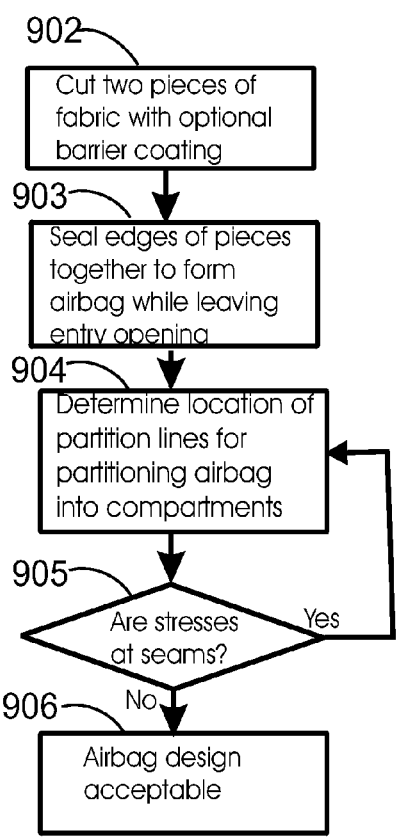
FIG. 48 is a flow chart of a method for designing a side curtain airbag in accordance with the invention.

Referring now to FIG. 48, a method for designing a side curtain airbag in accordance with the invention will now be described. It is a problem with side curtain airbags that since they are usually formed of two pieces of material, the manner of connecting the pieces of material results in leakage at the seams.

To avoid this problem, in the invention, two pieces of material, for example, a piece of fabric with a barrier coating as described herein, are cut (step 902) and edges of the two pieces are sealed together to form an airbag while leaving open an entry opening for inflation fluid (step 903). The location of partition lines for partitioning the airbag into a plurality of compartments, e.g., a plurality of parallel compartments each of which is receivable of inflation fluid and adapted to extend when inflated vertically along the side of the vehicle, is determined (step 904) and it is determined whether the stresses are at the seams (step 905). If not, the design is acceptable (step 906). Otherwise, the airbag is re-designed until stresses are not created at the seams during inflation or a minimum of stress is created at the seams during inflation. The determination of the location of the partition lines may involve analysis of the airbag using finite element theory.

This embodiment of the invention is illustrated by non-limiting examples (Examples 1-17) set forth in U.S. patent application Ser. No. 10/413,318, which is incorporated by reference herein.

2. SUMMARY

Disclosed is above a method for manufacturing an airbag for a vehicle in which a plurality of sections of material are joined together to form a plurality of interconnected compartments, e.g., by applying an adhesive between opposed surfaces of the sections of material to be joined together or heating the sections of material to be joined together. The sections of material may be joined together along parallel or curved lines to form straight or curved, elongate interconnected compartments which become tubular or cellular when inflated with a gas.

The tear propagation arresting structure for the film sheets may be (i) the incorporation of an elastomeric film material, a laminated fabric, or net, which are connected to each of the pieces of plastic film (e.g., the inelastic film which provides the desired shape upon deployment of the airbag), or (ii) structure incorporated into the formulation of the plastic film material itself. Also, the two pieces of film may be formed as one integral piece by a blow molding or similar thermal forming or laminating process.

In accordance with another embodiment of the invention, an airbag has a coating composition which contains substantially dispersed exfoliated layered silicates in an elastomeric polymer. This coating, when dry, results in an elastomeric barrier with a high effective aspect ratio and improved permeability characteristics, i.e., a greater increase in the reduction of permeability of the coating. Drying may occur naturally over time and exposure to air or through the application of heat. This is a further use of a plastic film where although the mechanical properties of the base material are not altered the flow properties through the material are.

The airbag is optionally made of fabric and can take any form including those in the prior art. For example, if a side curtain airbag, then the airbag can define a series of tubular gas-receiving compartments, or another series of compartments. The side curtain airbag can be arranged in a housing mounted along the side of the vehicle, possibly entirely above the window of the vehicle or partially along the A-pillar of the vehicle.

The side curtain airbag includes opposed sections or layers of material, either several pieces of material joined together at opposed locations or a single piece of material folded over onto itself and then joined at opposed locations. Gas is directed into the compartments from a gas generator or a source of pressurized gas. Possible side curtain airbags include those disclosed in the current assignee's U.S. Pat. No. 5,863,068, U.S. Pat. No. 6,149,194 and U.S. Pat. No. 6,250,668.

The invention is not limited to side curtain fabric airbags and other fabric airbags are also envisioned as being encompassed by the invention. Also, it is conceivable that airbags may be made of materials other than fabric and used with a barrier coating such as any of those disclosed herein and other barrier coatings which may be manufactured using the teachings of this invention or other inventions relates to barrier coatings for objects other than airbags. Thus, the invention can encompass the use of a barrier coating for an airbag, regardless of the material of the airbag and its placement on the vehicle.

In one aspect, the present invention provides a side curtain airbag including one or more sheets of fabric that contains air or a gas under pressure, and having on an interior or exterior surface of the fabric sheet(s) a barrier coating formed by applying to the surface a mixture comprising in a carrier liquid an elastomeric polymer, a dispersed exfoliated layered platelet filler preferably having an aspect ratio greater than about 25 and optionally at least one surfactant. The solids content of the mixture is optionally less than about 30% and the ratio of polymer to the filler is optionally between about 20:1 and about 1:1. The coating may be dried on the coated surface, wherein the dried barrier coating has the same polymer to filler ratio as in the mixture and provides an at least 5-fold greater reduction in gas, vapor, moisture or chemical permeability than a coating formed of the unfilled polymer alone.

In a preferred embodiment, the fabric is coated with a barrier coating mixture, which contains the polymer at between about 1% to about 30% in liquid form and between about 45% to about 95% by weight in the dried coating. The dispersed layered filler is present in the liquid coating mixture at between about 1% to about 10% by weight, and in the dried coating formed thereby, at between about 5% to about 55% by weight. The dried coating, in which the filler exhibits an effective aspect ratio of greater than about 25, and preferably greater than about 100, reduces the gas, vapor or chemical permeability greater than 5-fold that of the dried, unfilled polymer alone.

In another preferred embodiment, the invention provides a fabric side curtain airbag coated with a preferred barrier coating mixture which has a solids contents of between about 5% to about 15% by weight, and comprises in its dried state between about 65% to about 90% by weight of a butyl rubber latex, between about 10% to about 35% by weight of a layered filler, desirably vermiculite, and between about 0.1% to about 15% by weight of a surfactant.

In another embodiment, the invention provides a fabric side curtain airbag on a surface or at the interface of two surfaces therein a dried barrier coating formed by a barrier coating mixture comprising in a carrier liquid, an elastomeric polymer, a dispersed exfoliated layered platelet filler preferably having an aspect ratio greater than about 25 and optionally at least one surfactant, wherein the solids content of the mixture may be less than about 30% and the ratio of polymer to the filler is optionally between about 20:1 and about 1:1. When dried, the coating optionally comprises about 45% to about 95% by weight of the polymer, between about 5% to about 55% by weight the dispersed layered filler; and between about 1.0% to about 15% by weight the surfactant. The coating on the article, in which the filler exhibits an effective aspect ratio of greater than about 25, preferably greater than about 100, reduces the gas, vapor or chemical permeability of the airbag greater than 5-fold the permeability of the airbag coated with the polymer alone.

In still another embodiment, the invention provides a fabric side curtain airbag having on a surface or at the interface of two surfaces therein a dried barrier coating formed by a barrier coating mixture comprising in a carrier liquid, a butyl-containing polymer latex, a dispersed exfoliated layered vermiculite filler preferably having an aspect ratio about 1000 or greater; and optionally at least one surfactant. The solids content of the mixture may be less than about 17% and the ratio of the polymer to the filler may be between about 20:1 and about 1:1.

In a preferred embodiment, the coating mixture has a solids content of between about 5% to about 15% by weight, and forms a dried coating on the surface that comprises between about 65% to about 90% by weight the butyl-containing polymer, between about 10% to about 35% by weight the vermiculite filler, and between about 1.0% to about 15% by weight the surfactant. The coating on the inflated product in which the filler exhibits an effective aspect ratio of greater than about 25, preferably greater than about 100, reduces the gas, vapor or chemical permeability of the airbag greater than 5-fold the permeability of the article coated with the polymer alone.

In still a further embodiment, the invention provides a method for making a fabric side curtain airbag, the method involving coating a surface of the fabric airbag with, or introducing into the interface between two surfaces of the fabric airbag, an above-described barrier coating mixture.

One method for manufacturing an airbag module including an airbag in accordance with the invention entails applying to a surface of a substrate a solution comprising an elastomeric polymer and a dispersed exfoliated layered filler and causing the solution to dry to thereby form a barrier coating on the substrate, forming an airbag having an edge defining an entry opening for enabling the inflation of the airbag from the substrate having the barrier coating thereon, arranging the airbag in a housing, sealing the edge of the airbag to the housing and providing a flow communication in the housing to allow inflation fluid to pass through the entry opening into the airbag. The airbag is preferably folded in the housing. The airbag may be formed by cutting the substrate to the desired shape and size.

Another method for manufacturing an airbag module entails applying to a surface of a first substrate a solution comprising an elastomeric polymer and a dispersed exfoliated layered filler, covering the solution with a second substrate, causing the solution to dry to thereby form a barrier coating between the first and second substrates, forming an airbag having an edge defining an entry opening for enabling the inflation of the airbag from the first and second substrates having the barrier coating therebetween, arranging the airbag in a housing and sealing the edge of the airbag to the housing. Further, a flow communication is provided in the housing to allow inflation fluid to pass through the entry opening into the airbag. The airbag may be folded in the housing. The formation of the airbag may involve cutting the first and second substrates having the barrier coating therebetween.

Another method for forming an airbag, in particular a side curtain airbag or another type of airbag made of a first piece for fabric constituting a front panel of the airbag and a second piece of fabric constituting a rear panel of the airbag, entails heat or adhesive sealing the first and second pieces of fabric together over an extended seam width to form an airbag while maintaining an entry opening for passage of inflation fluid into an interior of the airbag and partitioning the airbag along partition lines into a plurality of chambers each receivable of the inflation fluid. The location of the partition lines is determined to prevent concentration of stress in the seams, e.g., by analyzing the airbag using finite element analysis as described in Appendix 1 of the '919 application and Appendices 1-6 of the '379 application. The first and second pieces of fabric may be coated with a barrier coating.

Still another method for forming an airbag in accordance with the invention comprises the steps of providing a plurality of layers of material, interweaving, heat sealing or sewing the layers together to form the airbag while maintaining an entry opening for passage of inflation fluid into an interior of the airbag and coating the airbag with a barrier coating. The airbag may be a side airbag with front and rear panel joined together over an extended seam width. As such, it is possible to partition the airbag along partition lines into a plurality of chambers each receivable of the inflation fluid and determine the location of the partition lines to prevent concentration of stress in the seams.

There has thus been shown and described an airbag system with a self-limiting and self-shaping airbag which fulfills all the objects and advantages sought after. Further, there has been shown and described an airbag system with a film airbag utilizing a film material which comprises at least one layer of a thermoplastic elastomer film material which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different airbag constructions as well as different methods for fabricating airbags. It is within the scope of the invention that all of the disclosed airbags can, for the most part, be made by any of the methods disclosed herein. Thus, in one typical process for constructing a film airbag having at least two compartments, either isolated from one another, within one another or in flow communication with each other, at least one flat panel of film airbag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

With respect to the construction of the airbag as shown in FIGS. 4C and 4D, another method of obtaining the airbag with a variable thickness is to provide an initial, substantially uniformly thick film substrate (inelastic film) and thereafter applying a coating (a thermoplastic elastomer) thereon in predetermined locations on the substrate, preferably in an organized predetermined pattern, such that it is possible to obtain thicker portions in comparison to other uncoated portions. In this manner, the film airbag can be provided with distinct thicknesses at different locations, e.g., thicker portions which constitute rings and ribs (i.e., the polar symmetric pattern of FIG. 4C), or only at specific locations where it is determined that higher stresses arise during deployment for which reinforcements by means of the thicker film is desired. An alternative fabrication method would be to produce the airbag from thermoplastic elastomeric material with an initial varying thickness as well as a layer of inelastic film to provide the airbag with the desired shape. In this regard, plastic-manufacturing equipment currently exists to generate a plastic sheet with a variable thickness. Such equipment could be operated to provide an airbag having thicker portions arranged in rings and ribs as shown in FIG. 4C.

The limiting net described above may be used to limit the deployment of any and all of the airbags described herein, including embodiments wherein there is only a single airbag.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

The inventions described above are, of course, susceptible to many variations, modifications and changes, all of which are within the skill of the art. It should be understood that all such variations, modifications and changes are within the spirit and scope of the inventions and of the appended claims. Similarly, it will be understood that applicant intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, materials and different dimensions for the components and different forms of the neural network implementation that perform the same functions. Also, the neural network has been described as an example of one pattern recognition system. Other pattern recognition systems exist and still others are under development and will be available in the future. Such a system can be used to identify crashes requiring the deployment of an occupant restraint system and then, optionally coupled with additional information related to the occupant, for example, create a system that satisfies the requirements of one of the Smart Airbag Phases. Also, with the neural network system described above, the input data to the network may be data which has been pre-processed rather than the raw acceleration data either through a process called "feature extraction", as described in Green (U.S. Pat. No. 4,906,940) for example, or by integrating the data and inputting the velocity data to the system, for example. This invention is not limited to the above embodiments and should be determined by the following claims.

The invention claimed is:

1. An airbag deployment system for a vehicle having a passenger compartment, comprising:

a plurality of film airbags arranged to substantially fill the passenger compartment upon deployment;

a plurality of housings arranged around the passenger compartment, each of said housings including at least one of said airbags;

a plurality of inflator systems for inflating said airbags, at least one of said inflator systems being an aspirated inflator system, each of said at least one aspirated inflator system being associated with one of said housings and arranged to combine pressurized gas and gas from the passenger compartment and direct the combined gas into said at least one airbag of said housing; and an anticipatory crash sensor system coupled to said inflator systems for predicting impact of an object with the vehicle and directing said inflator systems to inflate at least some of said airbags based on the predicted impact, and wherein at least one of said airbags includes a plurality of cells or chambers which extend when deployed in a longitudinal row down a center of the vehicle between lateral sides of the vehicle.

2. The system of claim 1, wherein some of said airbags are interconnected to provide a primary airbag and at least one secondary airbag extending from said primary airbag.

3. The system of claim 1, further comprising one-way valves, each arranged between a pair of adjacent ones of said airbags and controlling flow of gas from one of said pair of adjacent airbags to the other of said pair of adjacent airbags.

4. The system of claim 1, wherein at least one of said airbags comprises:

a plurality of interconnected cells or chambers including a row of adjacent, primary cells or chambers and a secondary cell or chamber extending from each of said primary cells or chambers; and at least one one-way valve arranged between each of said primary cells or chambers and said secondary cell or chamber extending from said primary cell or chamber to control flow of gas between said primary and secondary cells or chambers.

5. The system of claim 4, wherein said at least one valve between each of said primary and secondary cells or chambers is arranged to close once a predetermined pressure differential exists between said primary and secondary cells or chambers to prevent gas outflow from said secondary cell or chamber to said primary cell or chamber.

6. The system of claim 4, wherein said at least one valve between each of said primary and secondary cells or chambers comprises a plurality of valves.

7. The system of claim 4, wherein said cells or chambers further include at least one additional cell or chamber extending from a respective one or each of said secondary cells or chambers such that each of said secondary cells or chambers is arranged entirely between said primary cell or chamber from which it extends and said at least one additional cell or chamber extending therefrom, further comprising at least one one-way valve arranged between each of said at least one additional cell or chamber and said secondary cell or chamber from which it extends.

8. The system of claim 4, wherein only said primary cells or chambers are in direct communication with said at least one aspirated inflator system.

9. The system of claim 4, wherein said secondary cells or chambers extend in the same direction from said primary cells or chambers.

10. The system of claim 1, wherein at least one of said airbags comprises a row of adjacent, primary airbag compartments and a plurality of additional, secondary airbag compartments, each of said secondary airbag compartments extending from one of said plurality of primary airbag compartments.

11. The system of claim 1, wherein at least one of said airbags comprises:

at least one section of material defining a plurality of cells or chambers; and one-way valves arranged in connection with said at least one material section between said cells to control flow of gas between said cells or chambers, said cells including a plurality of first cells or chambers in direct communication with one of said inflator system and a plurality of second cells or chambers each in communication with a respective one of said first cells or chambers via at least one of said valves.

12. The system of claim 1, wherein said anticipatory crash sensor system is arranged to obtain information about the object and direct said inflator systems to inflate said airbags based on the obtained information to provide a desired acceleration of a chest of an occupant of the vehicle during or after the impact of the object with the vehicle.

13. The system of claim 12, wherein said anticipatory crash sensor system obtains information about the object by applying pattern recognition to waves received from the object or to images including the object.

14. The system of claim 1, wherein said anticipatory crash sensor system is arranged to determine a velocity of the object and direct said inflator systems to inflate said airbags based on the velocity of the object.

15. The system of claim 1, wherein at least one of said housings includes a plurality of said airbags and said inflator system associated with said at least one housing is arranged to direct gas into said plurality of airbags.

16. The system of claim 1, further comprising an occupant sensor system for determining the presence of an occupant in a rear seat of the vehicle, inflation of said airbags for protecting the rear seated occupants being suppressed when the rear seat is unoccupied as determined by said occupant sensor system.

17. The system of claim 1, wherein at least one of said inflator systems is arranged to direct gas to a plurality of said airbags through a common distribution volume or manifold in which pressurized gas and gas from the passenger compartment is combined.

18. A vehicle comprising a front windshield and the system of claim 1, at least one of said housings being arranged such that said at least one airbag housed therein deploys along an inner side of said front windshield.

19. A vehicle comprising a headliner or ceiling defining a top of the passenger compartment and the system of claim 1, at least one of said housings being stored within said headliner or ceiling.

20. An airbag deployment system for a vehicle having a passenger compartment, comprising:

a plurality of film airbags arranged to substantially fill the passenger compartment upon deployment;

a plurality of inflator systems for inflating said airbags, at least one of said inflator systems being an aspirated inflator system, each of said at least one aspirated inflator system being associated with at least one of said airbags and arranged to combine pressurized gas and gas from the passenger compartment and direct the combined gas into said at least one airbag; and an anticipatory crash sensor system coupled to said inflator systems for predicting impact of an object with the vehicle and directing said inflator systems to inflate at least some of said airbags based on the predicted impact, said anticipatory crash sensor system being arranged to obtain information about the object by applying pattern recognition to waves received from the object or to images including the object and direct said inflator systems to inflate at least some of said airbags based on the obtained information and wherein at least one of said airbags includes a plurality of cells or chambers which extend when deployed in a longitudinal row between lateral sides of the vehicle.

21. The system of claim 20, wherein said anticipatory sensor system is arranged to determine a velocity of the object and direct said inflator systems to inflate at least some of said airbags based on the velocity of the object.

22. The system of claim 20, further comprising one-way valves, each arranged between a pair of adjacent ones of said airbags and controlling flow of gas from one of said pair of adjacent airbags to the other of said pair of adjacent airbags.

23. An airbag deployment system for a vehicle having a passenger compartment, comprising:
   a plurality of film airbags arranged to substantially fill the passenger compartment upon deployment;
   a plurality of inflator systems for inflating said airbags, at least one of said inflator systems being an aspirated inflator system, each of said at least one aspirated inflator system being associated with at least one of said airbags and arranged to combine pressurized gas and gas from the passenger compartment and direct the combined gas into said at least one airbag; and
   an anticipatory crash sensor system coupled to said aspirated inflator systems for predicting impact of an object with the vehicle and directing said inflator systems to inflate at least some of said airbags based on the predicted impact,
   said at least one aspirated inflator system being arranged to direct gas to a plurality of said airbags through a common distribution volume or manifold in which pressurized gas and gas from the passenger compartment is combined.

24. An airbag deployment system for a vehicle having a passenger compartment, comprising:
   a plurality of film airbags arranged to substantially fill the passenger compartment upon deployment, at least one of said airbags including a plurality of cells or chambers which extend when deployed in a longitudinal row parallel to lateral sides of the vehicle;
   a plurality of inflator systems for inflating said airbags, at least one of said inflator systems being an aspirated inflator system, each of said at least one aspirated inflator system being associated with at least one of said airbags and arranged to combine pressurized gas and gas from the passenger compartment and direct the combined gas into said at least one airbag; and
   an anticipatory crash sensor system coupled to said inflator systems for predicting impact of an object with the vehicle and directing said inflator systems to inflate at least some of said airbags based on the predicted impact.

25. The system of claim 24, wherein said cells or chambers of said at least one airbag extend when deployed down a center of the vehicle between the lateral sides of the vehicle.

26. An airbag deployment system for a vehicle having a passenger compartment, comprising:
   a plurality of film airbags arranged to substantially fill the passenger compartment upon deployment;
   a plurality of housings arranged around the passenger compartment, each of said housings including at least one of said airbags;
   a plurality of inflator systems for inflating said airbags, at least one of said inflator systems being an aspirated inflator system, each of said at least one aspirated inflator system being associated with one of said housings and arranged to combine pressurized gas and gas from the passenger compartment and direct the combined gas into said at least one airbag of said housing; and
   an anticipatory crash sensor system coupled to said inflator systems for predicting impact of an object with the vehicle and directing said inflator systems to inflate at least some of said airbags based on the predicted impact,
   said anticipatory crash sensor system being arranged to obtain information about the object and direct said inflator systems to inflate said airbags based on the obtained information to provide a desired acceleration of a chest of an occupant of the vehicle during or after the impact of the object with the vehicle.

27. An airbag deployment system for a vehicle having a passenger compartment, comprising:
   a plurality of film airbags arranged to substantially fill the passenger compartment upon deployment;
   a plurality of inflator systems for inflating said airbags, at least one of said inflator systems being an aspirated inflator system, each of said at least one aspirated inflator system being associated with at least one of said airbags and arranged to combine pressurized gas and gas from the passenger compartment and direct the combined gas into said at least one airbag; and
   an anticipatory crash sensor system coupled to said inflator systems for predicting impact of an object with the vehicle and directing said inflator systems to inflate at least some of said airbags based on the predicted impact,
   said anticipatory crash sensor system being arranged to obtain information about the object by applying pattern recognition to waves received from the object or to images including the object and direct said inflator systems to inflate at least some of said airbags based on the obtained information,
   said anticipatory crash sensor system being arranged to obtain information about the object and direct said inflator systems to inflate said airbags based on the obtained information to provide a desired acceleration of a chest of an occupant of the vehicle during or after the impact of the object with the vehicle.

* * * * *